(12) United States Patent
Horii

(10) Patent No.: US 9,807,514 B2
(45) Date of Patent: Oct. 31, 2017

(54) AUDIO APPARATUS, AUDIO SYSTEM, IMAGE DISPLAY APPARATUS, AND IMAGE PROJECTION APPARATUS

(71) Applicant: KYOCERA Corporation, Kyoto-shi, Kyoto (JP)

(72) Inventor: Seiji Horii, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/909,464

(22) PCT Filed: Aug. 20, 2014

(86) PCT No.: PCT/JP2014/004269
§ 371 (c)(1),
(2) Date: Feb. 2, 2016

(87) PCT Pub. No.: WO2015/029384
PCT Pub. Date: Mar. 5, 2015

(65) Prior Publication Data
US 2016/0192081 A1   Jun. 30, 2016

(30) Foreign Application Priority Data

Aug. 26, 2013 (JP) .................. 2013-174703
Aug. 26, 2013 (JP) .................. 2013-174737
Aug. 26, 2013 (JP) .................. 2013-174838

(51) Int. Cl.
H04R 25/00   (2006.01)
H04R 17/00   (2006.01)
(Continued)

(52) U.S. Cl.
CPC .............. *H04R 17/00* (2013.01); *H04M 1/03* (2013.01); *H04R 1/028* (2013.01); *H04R 29/001* (2013.01);
(Continued)

(58) Field of Classification Search
CPC .......... H04R 17/00; H04R 1/028; H04R 3/04; H04R 29/001; H04R 27/00; H04R 2400/03; H04R 2499/11; H04M 1/03
See application file for complete search history.

(56) References Cited

U.S. PATENT DOCUMENTS 6,148,089 A * 11/2000 Akino ............... H04R 5/02
381/355
7,663,604 B2   2/2010 Maruyama et al.
(Continued)

FOREIGN PATENT DOCUMENTS

JP   60-54577 A   3/1985
JP   5-85192 U   11/1993
(Continued)

OTHER PUBLICATIONS

International Search Report dated Nov. 11, 2014, corresponding to International Patent Application No. PCT/JP2014/004269.
(Continued)

*Primary Examiner* — Tuan D Nguyen
(74) *Attorney, Agent, or Firm* — Hauptman Ham, LLP

(57) ABSTRACT

An audio apparatus includes a housing, a piezoelectric vibration unit provided to the housing and having a piezoelectric element, and a communication unit for receiving an audio signal. When a received audio signal is applied to the piezoelectric element while a load of the audio apparatus is applied to the piezoelectric vibration unit, the piezoelectric element is deformed causing deformation of the piezoelectric vibration unit, whereby a contact surface in contact with the audio apparatus vibrates and generate a sound.

13 Claims, 41 Drawing Sheets

(51) Int. Cl.
*H04M 1/03* (2006.01)
*H04R 1/02* (2006.01)
*H04R 29/00* (2006.01)
H04R 3/04 (2006.01)
H04R 27/00 (2006.01)

(52) U.S. Cl.
CPC ............... *H04R 3/04* (2013.01); *H04R 27/00* (2013.01); *H04R 2400/03* (2013.01); *H04R 2499/11* (2013.01); *H04R 2499/15* (2013.01)

(56) References Cited

U.S. PATENT DOCUMENTS

| | | |
|---|---|---|
| 7,986,801 B2 | 7/2011 | Schobben et al. |
| 8,139,762 B2 | 3/2012 | Kuroda et al. |
| 8,630,428 B2 | 1/2014 | Yana et al. |
| 2006/0239479 A1 | 10/2006 | Schobben et al. |
| 2007/0080951 A1 | 4/2007 | Maruyama et al. |
| 2008/0216578 A1* | 9/2008 | Takashima .............. B06B 1/045 73/658 |
| 2008/0253591 A1 | 10/2008 | Schobben et al. |
| 2009/0003630 A1 | 1/2009 | Kuroda et al. |
| 2011/0025927 A1 | 2/2011 | Yana et al. |

FOREIGN PATENT DOCUMENTS

| | | |
|---|---|---|
| JP | 2004-94389 A | 3/2004 |
| JP | 2006-525734 A | 11/2006 |
| JP | 2007-520122 A | 7/2007 |
| JP | 2008-245250 A | 10/2008 |
| JP | 3164496 U | 12/2010 |
| JP | 2011-35552 A | 2/2011 |
| JP | 2011-182368 A | 9/2011 |
| JP | 2012-257301 A | 12/2012 |
| JP | 2013-9236 A | 1/2013 |
| WO | 2007/120125 A1 | 10/2007 |
| WO | 2013/093552 A1 | 6/2013 |

OTHER PUBLICATIONS

Written Opinion of International Searching Authority mailed Nov. 11, 2014, corresponding to International Application No. PCT/JP2014/004269, for which an explanation of relevance is attached.

Extended European Search Report in EP Application No. 14839522.1, mailed Mar. 23, 2017.

* cited by examiner

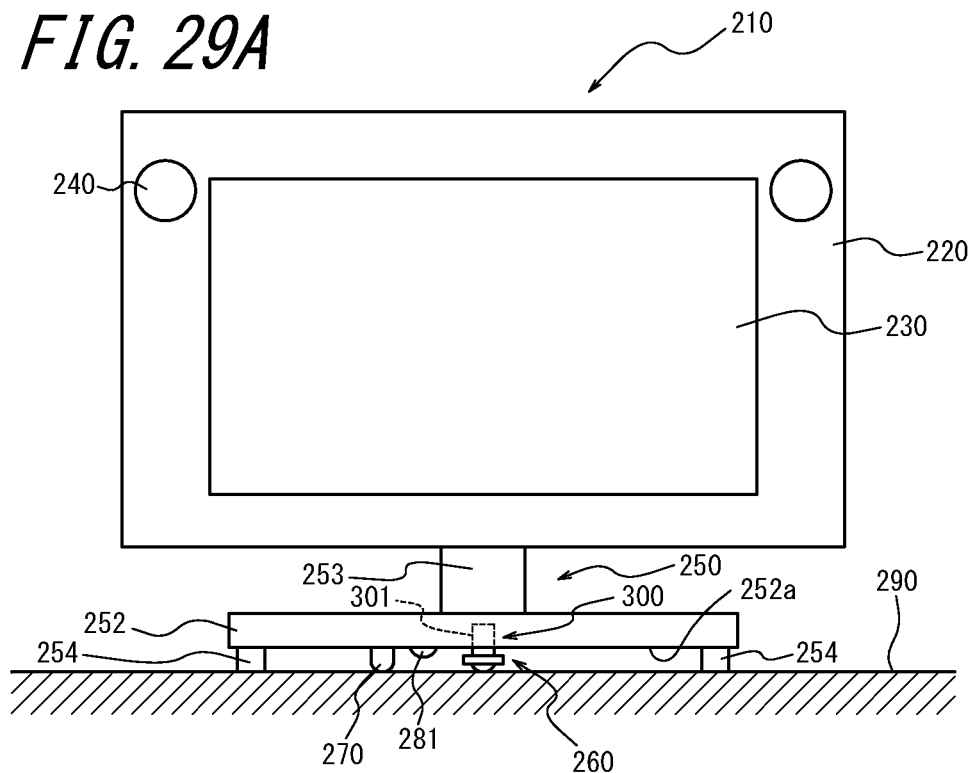
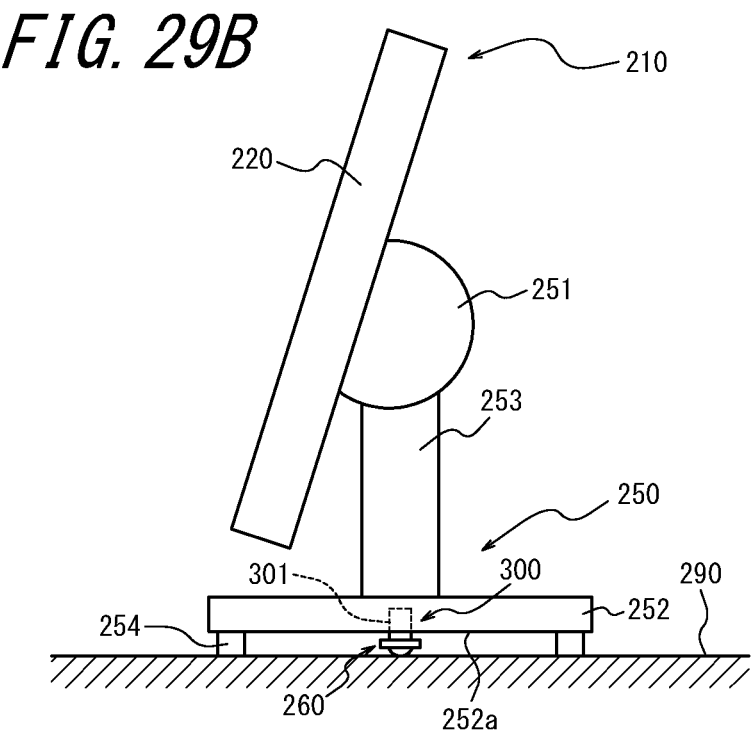

AUDIO APPARATUS, AUDIO SYSTEM, IMAGE DISPLAY APPARATUS, AND IMAGE PROJECTION APPARATUS

CROSS REFERENCE TO RELATED APPLICATION

This application is a National Phase of International Application Number PCT/JP2014/004269, filed Aug. 20, 2014, and claims priority to and the benefit of Japanese Patent Applications No. 2013-174703, No. 2013-174737, and No. 2013-174838 those filed on Aug. 26, 2013, the entire contents of which are incorporated herein by reference.

TECHNICAL FIELD

This disclosure relates to an audio apparatus, an audio system, an image display apparatus, and an image projection apparatus.

BACKGROUND

There have conventionally been proposed various audio apparatuses that allow a voice conference by connecting to a conference room at a remote location via a communication network (for example, see PLT 1). Such an audio apparatus is provided with a microphone and a speaker and, when being placed on a table or the like in a conference room, picks up a sound in the room with the microphone and transmits the sound as a transmission audio signal to another audio apparatus (the other party's audio apparatus) in the other party's conference room, as well as outputting, from the speaker, a received audio signal (a sound in the other party's conference room) transmitted from the other party's audio apparatus. As the speaker, a dynamic speaker is typically used.

Also, for example, a conventional television receiver (hereinafter, simply referred to as a "TV") generates a sound from a speaker provided to the TV. As the speaker of the conventional TV, the dynamic speaker is typically used and, for example, PLT 2 describes a TV using the dynamic speaker.

Further, for example, a conventional projection apparatus generates a sound from a speaker provided thereto. As the speaker of the conventional projection apparatus, the dynamic speaker is typically used. For example, PLT 3 describes a vibration generation apparatus having a structure of the dynamic speaker provided with a magnet, a voice coil, a diaphragm, and a casing for accommodating these components. Frequency characteristics of the sound generated from the dynamic speaker is affected by a size of the dynamic speaker. For example, in order to reproduce a low-pitched sound, a large dynamic speaker is required.

CITATION LIST

Patent Literatures

PLT 1: JP-A-2008-245250
PLT 2: JP-A-2011-35552
PLT 3: JP-UM-A-5-85192

SUMMARY

Technical Problem

However, since the dynamic speaker has poor sound diffusibility, depending on a positional relation with the speaker, it is difficult to hear the sound from the speaker, e.g., a volume of the sound becomes smaller in proportion to a distance from the speaker.

Also, since the dynamic speaker needs various members including the magnet, the voice coil, the diaphragm and the like, it is inevitable that the speaker includes a large number of components. Therefore, a large speaker leads to an increase in size of an apparatus and thus is difficult to handle. Especially, since the TVs of a recent trend have thin designs, it is difficult to mount a large speaker thereto. As a result, the TV and the projection apparatus are likely to have an insufficient sound pressure in a low frequency range. Such inconvenience is caused by the TV and the projection apparatus as well as various image display apparatuses and various image projection apparatuses those may generate a sound while displaying a still image or a video image.

Therefore, it could be helpful to provide an audio apparatus and an audio system those capable of acquiring sounds having a small volume difference over a wide range.

Further, it could be helpful to provide an image display apparatus and an image projection apparatus those capable of generating the sound in a preferable manner.

Solution to Problem

In order to achieve the above object, an audio apparatus disclosed herein includes:

a housing;

a piezoelectric vibration unit having a piezoelectric element provided to the housing; and a communication unit configured to receive an audio signal, wherein when a received audio signal is applied to the piezoelectric element while a load of the audio apparatus is applied to the piezoelectric vibration unit, the piezoelectric element is deformed causing deformation of the piezoelectric vibration unit, whereby a contact surface in contact with the audio apparatus is vibrated generating a sound.

Preferably, the piezoelectric vibration unit is arranged at a portion of the housing opposite to the contact surface.

The audio apparatus may include a microphone configured to pick up a sound and outputting the audio signal, and the communication unit may transmit the audio signal output from the microphone.

Preferably, the microphone is retained in the housing via a damper configured to reduce a vibration caused by the deformation of the piezoelectric vibration unit.

Preferably, a vibration direction of the piezoelectric element and a vibration direction of the microphone intersect with each other.

The microphone may be arranged separately from the housing.

The communication unit may receive the audio signal from another audio apparatus.

The audio apparatus may further include a speaker that is provided to the housing and amplifies the received audio signal;

a detection unit configured to detect a contact state between the contact surface and the piezoelectric vibration unit; and a controller configured to control the speaker and the piezoelectric vibration unit based on the contact state detected by the detection unit.

The piezoelectric element may be a laminated piezoelectric element and deformed extending and contracting along a lamination direction.

The piezoelectric vibration unit may include a cover member configured to deliver the vibration caused by the deformation of the piezoelectric element to the contact surface and thereby vibrating the contact surface.

The contact surface may be a placing surface having the audio apparatus placed thereon.

In order to achieve the above object, further, an audio system disclosed herein including a microphone unit and a speaker unit, wherein the microphone unit is provided with a microphone configured to pick up a sound and outputting an audio signal and a transmission unit configured to transmit the audio signal to the speaker unit, the speaker unit is provided with a housing, a piezoelectric vibration unit having a piezoelectric element provided to the housing, and a reception unit configure to receive the audio signal, and when the audio signal is applied to the piezoelectric element while a load of the audio apparatus is applied to the piezoelectric vibration unit, the piezoelectric element is deformed causing deformation of the piezoelectric vibration unit, whereby a contact surface in contact with the audio apparatus is vibrated generating a sound.

In order to achieve the above object, an image display apparatus disclosed herein includes:

a housing;

a display unit that is retained in the housing and displays an image; and a controller configured to control the piezoelectric element, wherein when the controller applies a sound signal to the piezoelectric element while a load of the image display apparatus is applied to the piezoelectric vibration unit, the piezoelectric element is deformed causing deformation of the piezoelectric vibration unit, whereby a contact surface in contact with the image display apparatus is vibrated generating a sound.

The piezoelectric vibration unit may be arranged at a portion of the housing opposite to the contact surface.

The image display apparatus may include a support member configured to support the housing, and the piezoelectric vibration unit may be arranged at a portion of the support member opposite to the contact surface.

The image display apparatus may include a detection unit configured to detect a contact state between the contact surface and the piezoelectric vibration unit, and the controller may control the piezoelectric element based on the contact state.

The image display apparatus may include a speaker, and the controller may drive the speaker and the piezoelectric element at the same time.

The image display apparatus may include a storage unit configured to store frequency characteristics of the speaker, and the controller may control the piezoelectric element based on the frequency characteristics of the speaker stored.

The controller may control a sound signal to be applied to the piezoelectric element in a manner compensating for the lack of a sound pressure of the frequency characteristics of the speaker stored.

The image display apparatus may include a recording unit configured to record frequency characteristics of a sound generated from the contact surface, and the controller may control the speaker based on the frequency characteristics recorded.

The controller may control the sound pressure of the frequency characteristics of the speaker in a manner compensating for the lack of the sound pressure of the frequency characteristics recorded.

The piezoelectric element may be a laminated piezoelectric element and deformed extending and contracting along a lamination direction.

The piezoelectric vibration unit may include a cover member configured to deliver the vibration caused by the deformation of the piezoelectric element to the contact surface and thereby vibrating the contact surface.

The contact surface may be a placing surface having the image display apparatus placed thereon.

The contact surface may be a wall surface having the image display apparatus hung thereon.

In order to achieve the above object, an image projection apparatus disclosed herein includes:

a housing;

a piezoelectric vibration unit having a piezoelectric element;

a projection unit retained in the housing configured to display an image on a projection screen; and a controller configured to control the piezoelectric element, wherein when the controller applies a sound signal to the piezoelectric element while a load of the image projection apparatus is applied to the piezoelectric vibration unit, the piezoelectric element is deformed causing deformation of the piezoelectric vibration unit, whereby a contact surface in contact with the image projection apparatus is vibrated and generates a sound.

The piezoelectric vibration unit may be provided at a position within a predetermined distance from a center of gravity of the image projection apparatus and opposite to the contact surface.

The image projection apparatus may include a support member configured to support the housing, and the piezoelectric vibration unit may be provided at a portion of the support member opposite to the contact surface.

The image projection apparatus may include a front support portion positioned on a front side from the center of gravity of the image projection apparatus where the projection screen is located and a rear support portion positioned on a rear side opposite to the front side having the projection screen, wherein the piezoelectric vibration unit may be arranged at the rear support portion.

The image projection apparatus may include a detection unit configured to detect a contact state between the contact surface and the piezoelectric vibration unit, and the controller controls the piezoelectric element based on the contact state.

The image projection apparatus may include a speaker, and the controller may drive the speaker and the piezoelectric element at the same time.

The image projection apparatus may include a storage unit configured to store frequency characteristics of the speaker, and the controller may control the piezoelectric element based on the frequency characteristics of the speaker stored.

The controller may control a sound signal to be applied to the piezoelectric element in a manner compensating for the lack of the sound pressure of the frequency characteristics of the speaker stored.

The image projection apparatus may include a recording unit configured to record frequency characteristics of a sound generated from the contact surface, and the controller may control the speaker based on the frequency characteristics recorded.

The controller may control the sound pressure of the frequency characteristics of the speaker in a manner compensating for the lack of the sound pressure of the frequency characteristics recorded.

The piezoelectric element may be a laminated piezoelectric element and deformed extending and contracting along a lamination direction.

The piezoelectric vibration unit may include a cover member configured to deliver the vibration caused by the deformation of the piezoelectric element to the contact surface and thereby vibrating the contact surface.

The contact surface may be a placing surface having the image projection apparatus placed thereon.

The contact surface may be a wall surface having the image projection apparatus hung thereon.

Advantageous Effect

According to the disclosure herein, an audio apparatus and an audio apparatus those capable of acquiring sounds having a small volume difference over a wide range may be provided.

According to the disclosure herein, further, an image display apparatus and an image projection apparatus those capable of generating the sound in an excellent manner may be provided.

BRIEF DESCRIPTION OF THE DRAWINGS

In the accompanying drawings:

FIG. 29A is an elevation view illustrating a schematic configuration of an image display apparatus according to a seventh embodiment;

FIG. 29B is a side view of the image display apparatus of FIG. 29A;

DETAILED DESCRIPTION

Hereinafter, embodiments of the disclosure will be described with reference to the accompanying drawings.

First Embodiment

Figure 1A:
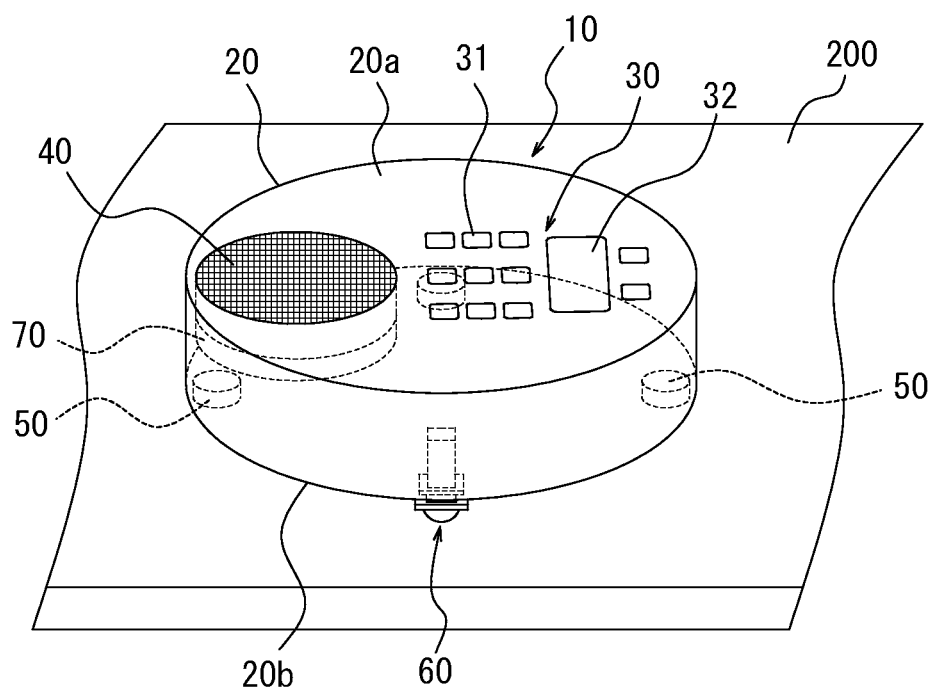
FIG. 1A is an external perspective view of an audio apparatus according to a first embodiment.
Figure 1B:
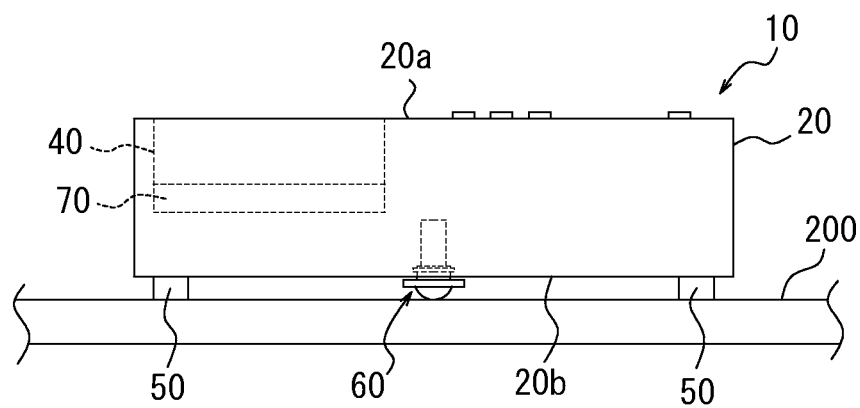
FIG. 1B is a side view of the audio apparatus of FIG. 1A.

FIGS. 1A and 1B are a perspective view and a side view, respectively, those illustrating a schematic configuration of an audio apparatus according to a first embodiment. An audio apparatus 10 according to the present embodiment includes a housing 20 in a shape allowing placement thereof on a table 200 set in a conference room. Although the housing 20 in FIGS. 1A and 1B takes a substantially disc-shape as an external shape thereof, the housing 20 may take any shape as long as allowing placement thereof on the table 200. The table 200 is an example of a contact surface in contact with the audio apparatus 10. In the following description, the table 200 is referred to as a contact surface 200 or a placement surface 200. The housing 20 includes an upper surface 20a having an operation unit 30 and a microphone 40 arranged thereon and a bottom surface 20b having legs 50 and a piezoelectric vibration unit 60 arranged thereon.

The operation unit 30 includes a known display unit 32 such as a liquid crystal display for displaying an operation key 31 such as a dial key and a function key for inputting a telephone number and the like of the other party of telephone conference, as well as for displaying information input with the operation key 31. The microphone 40 picks up a voice of a conference participant and the like therearound and outputs a transmission audio signal. The microphone 40 may be constituted by using a known microphone such as a capacitor microphone or a dynamic microphone. According to the present embodiment, the microphone 40 is retained by the housing 20 via, for example, a damper 70 made of rubber or the like. The legs 50 are made of an elastic material such as, for example, rubber, silicone, polyurethane and the like and provided to the bottom surface 20b in a manner supporting, together with the piezoelectric vibration unit 60, the housing 20 on the table 200.

Figure 2:
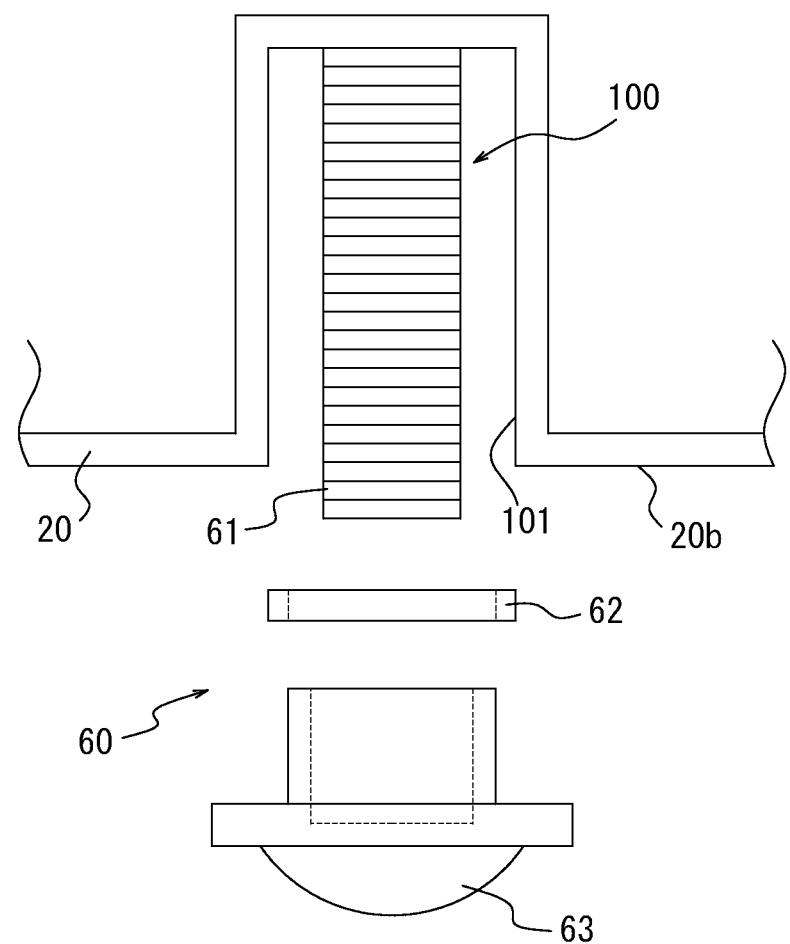
FIG. 2 is an explanatory view of a piezoelectric vibration unit and a holder portion therefor.

FIG. 2 is an explanatory view of the piezoelectric vibration unit 60 and a holder portion therefor. The piezoelectric vibration unit 60, as illustrated in a partial cross-section of a bottom portion of the housing 20 in FIG. 2, is accommodated and held in a holder portion 100 formed in the housing 20. The piezoelectric vibration unit 60 is disposed at a position opposed to the contact surface 200 of the housing 20. The holder portion 100 has a slit 101 with a uniform width opening to the bottom surface 20b of the housing 20 and extending in a direction perpendicular to the bottom surface 20b when the housing 20 is placed on a horizontal surface.

The piezoelectric vibration unit 60, as illustrated in an exploded diagram in FIG. 2, includes a piezoelectric element 61, an O-ring 62, and a cap 63 that serves as an insulating cover member. The piezoelectric element 61 is an element that, upon application of an electric signal (voltage) thereto, extends and contracts, or bends, in accordance with an electromechanical coupling coefficient of a constituent material. The piezoelectric element 61 is made of, for example, ceramic or crystal. The piezoelectric element 61 may be a unimorph, a bimorph, or a laminated piezoelectric element. The laminated piezoelectric element includes a laminated bimorph element formed with laminated bimorphs (for example, 8 to 40 layers thereof) and a laminated piezoelectric element of a stack type having a lamination structure formed with a plurality of dielectric layers made of, for example, PZT (lead zirconate titanate) and electrode layers disposed therebetween. The unimorph extends and contracts upon application of the electric signal thereto, and the bimorph bents upon application of the electric signal thereto. The laminated piezoelectric element of the stack type extends and contracts along a lamination direction upon application of the electric signal thereto.

According to the present embodiment, the piezoelectric element 61 is the laminated piezoelectric element of the stack type. The laminated piezoelectric element 61, as illustrated in an enlarged cross-sectional view in FIG. 3A and a plan view in FIG. 3B, for example, is formed by alternately laminating dielectrics 61a made of ceramics such as PZT and internal electrodes 61b with a comb-shaped cross-section. The internal electrode 61b electrically connected to a first side electrode 61*c* and the internal electrode 61*b* electrically connected to a second side electrode 61*d* are alternately laminated.

Figure 3A:
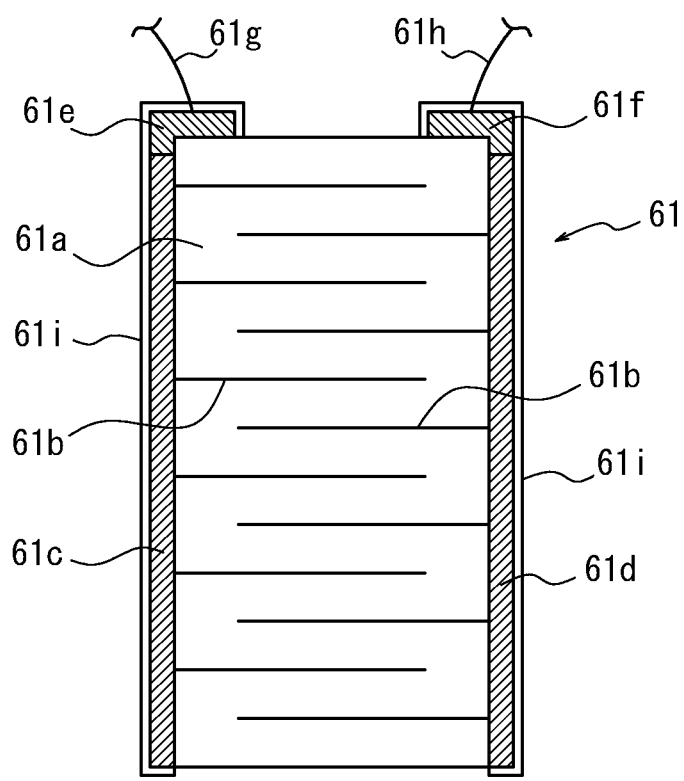
FIG. 3A is an enlarged cross-sectional view illustrating a structure of a laminated piezoelectric element.
Figure 3B:
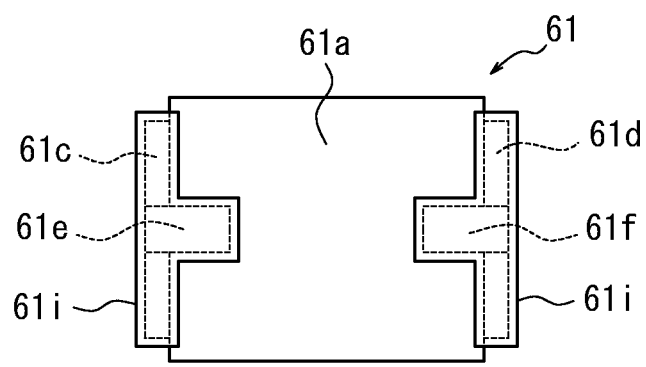
FIG. 3B is a plan view of the laminated piezoelectric element of FIG. 3A.

The laminated piezoelectric element 61 illustrated in FIGS. 3A and 3B includes one end portion having a first lead connection portion 61*e* electrically connected to the first side electrode 61*c* and a second lead connection portion 61*f* electrically connected to the second side electrode 61*d* formed thereon. To the first lead connection portion 61*e* and the second lead connection portion 61*f*, a first lead line 61*g* and a second lead line 61*h* are connected, respectively. Also, the first side electrode 61*c*, the second side electrode 61*d*, the first lead connection portions 61*e*, and the second lead connection portions 61*f* are covered with an insulating layer 61*i* in a state in which the first lead connection portion 61*e* and the second lead connection portion 61*f* are connected to the first lead line 61*g* and the second lead line 61*h*, respectively.

The laminated piezoelectric element 61 has a length of, for example, 5 mm to 120 mm in a lamination direction. A cross-sectional shape of the laminated piezoelectric element 61 orthogonal to the lamination direction may be a substantially square shape of 2 mm by 2 mm to 10 mm to 10 mm, or any shape other than the square shape. The number of layers and size of the cross-sectional area of the laminated piezoelectric element 61 are appropriately determined based on weight of the audio apparatus 10 in a manner sufficiently ensuring a sound pressure or sound quality of a sound generated from the contact surface such as the table in contact with the piezoelectric vibration unit 60.

To the laminated piezoelectric element 61, as described later, a received audio signal is supplied from the controller via a piezoelectric element drive unit. In other words, a voltage corresponding to the audio signal is applied to the laminated piezoelectric element 61 by the controller via the piezoelectric element drive unit. In the case that an AC voltage is applied as the voltage by the controller, when a positive voltage is applied to the first side electrode 61*c*, a negative voltage is applied to the second side electrode 61*d*, and, on the other hand, when the negative voltage is applied to the first side electrode 61*c*, the positive voltage is applied to the second side electrode 61*d*. When the voltages are applied to the first side electrode 61*c* and the second side electrode 61*d*, polarization occurs in the dielectric 61*a*, causing extension and contraction of the laminated piezoelectric element 61 from a state thereof with no voltage applied thereto. The laminated piezoelectric element 61 extends and contracts in a direction substantially along a lamination direction of the dielectric 61*a* and the internal electrode 61*b*. Or, the laminated piezoelectric element 61 extends and contracts in a direction substantially coincides with the lamination direction of the dielectric 61*a* and the internal electrode 61*b*. Since the laminated piezoelectric element 61 extends and contracts substantially along the lamination direction thereof, there is an advantage of offering excellent vibration transmission efficiency in the extending and contracting direction.

We have conceived that the laminated piezoelectric element 61 may effectively serve as a vibration element for generating a received voice from the contact surface 200 of the table or the like in contact with the audio apparatus 10.

Figure 4:
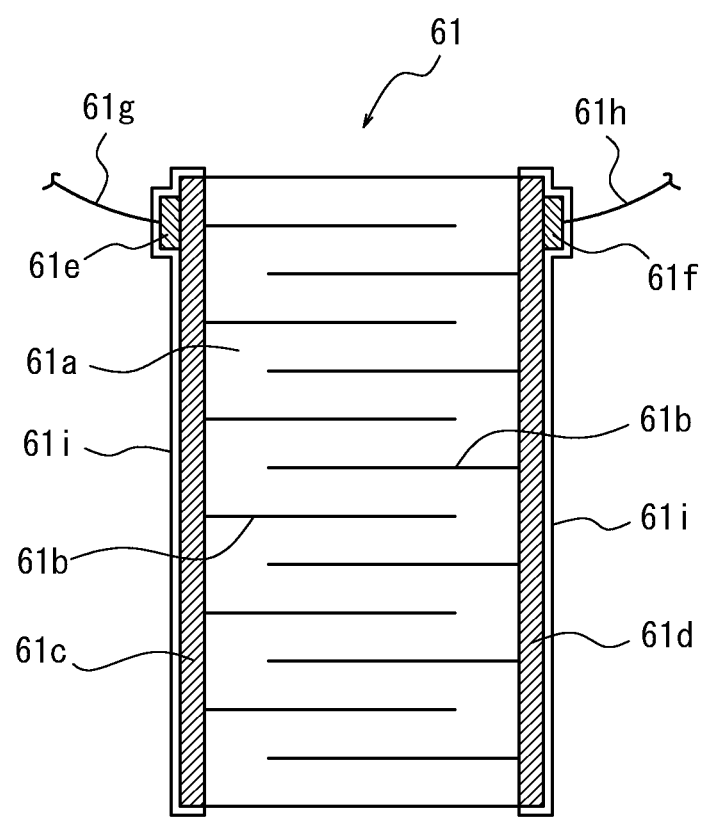
FIG. 4 is a diagram illustrating an example of variations of the laminated piezoelectric element.

In FIGS. 3A and 3B, the first side electrode 61*c* and the second side electrode 61*d* may have a through-hole connection alternately connected to the internal electrode 61*b* and also connected to the first lead connecting portion 61*e* and the second lead connecting portion 61*f*, respectively. Or, the first lead connecting portion 61*e* and the second lead connecting portion 61*f* of FIGS. 3A and 3B may be formed on the first side electrode 61*c* and the second side electrode 61*d*, respectively, at one end of the laminated piezoelectric element 61 as illustrated in FIG. 4.

Figure 5:
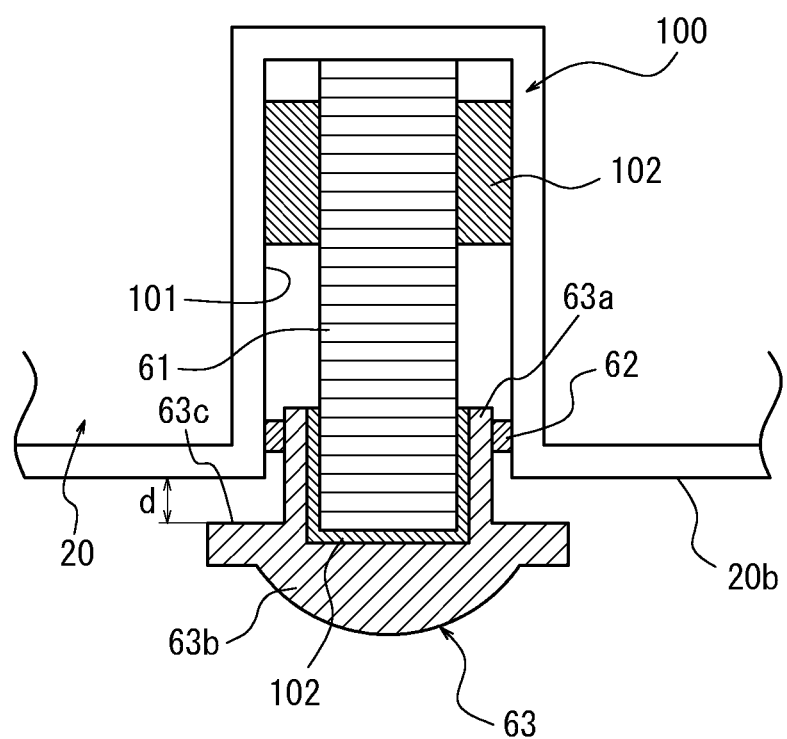
FIG. 5 is a partially enlarged cross-sectional view of the piezoelectric vibration unit.

The laminated piezoelectric element 61, as illustrated in a partially enlarged cross-sectional view in FIG. 5, includes one lateral end portion having the first lead connecting portion 61*e* and the second lead connecting portion 61*f* those fixed to the slit 101 of the holder portion 100 of the housing 20 via adhesive 102 (for example, epoxy resin). Also, the other end portion of the laminated piezoelectric element 61 is capped with a cap 63 and fixed by the adhesive 102.

The cap 63 is made of a material such as, for example, hard plastic or the like that may reliably deliver extending and contracting vibration of the laminated piezoelectric element 61 to the placing surface (the contact surface) such as the table. If it is desired to suppress damaging the placing surface, the cap 63 may be made of relatively soft plastic rather than the hard plastic. The cap 63 includes an entry portion 63*a* and a protrusion portion 63*b*. When the cap 63 is attached to the laminated piezoelectric element 61, the entry portion 63*a* is located inside the slit 101, and the protrusion portion 63*b* protrudes from the housing 20. An O-ring 62 is provided to a circumference of the entry portion 63*a* located inside the slit 101. The O-ring 62 is made of, for example, silicone rubber. The O-ring 62 movably supports the laminated piezoelectric element 61 and, simultaneously, prevents moisture and dust from entering the slit 101. The protrusion portion 63*b* is formed in a hemispherical shape at one end thereof. The end of the protrusion portion 63*b* is not limited to take the hemispherical shape but may take any shape as long as reliably point-contacting or surface-contacting the placing surface (the contact surface) of the table or the like and capable of delivering the extending and contracting vibration of the laminated piezoelectric element 61. When the piezoelectric vibration unit 60 is attached to the holder portion 100, the protrusion portion 63*b* of the cap 63 protrudes from the bottom surface 20*b* of the housing 20. The protrusion portion 63*b* of the cap 63 has a facing surface 63*c* opposite to the bottom 20*b* of the housing 20. As illustrated in FIG. 5, when the laminated piezoelectric element 61 has no voltage applied thereto and thus is not extending and contracting, the facing surface 63*c* is spaced apart from the bottom surface 20*b* by a distance d.

Figure 6:
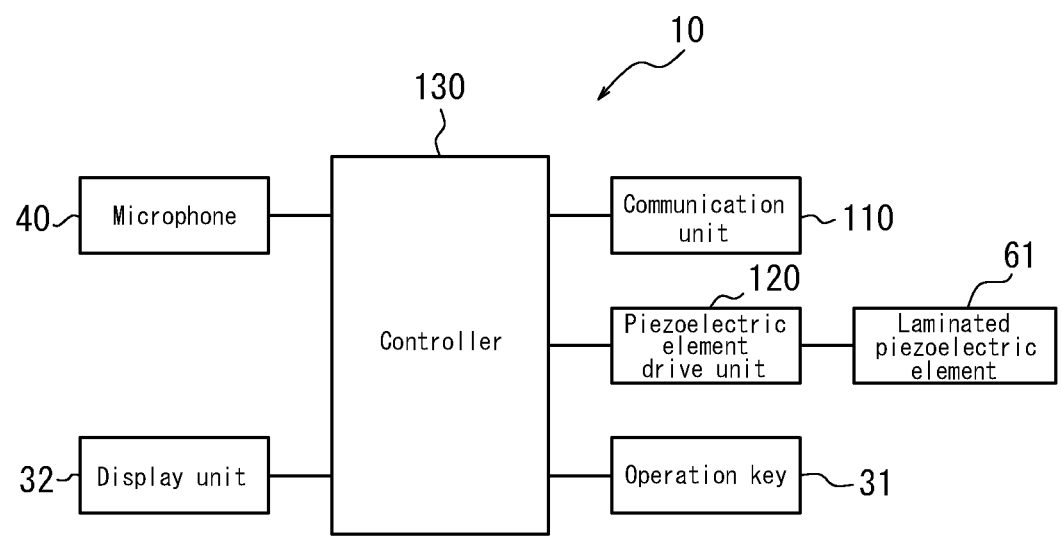
FIG. 6 is a functional block diagram of a section of the audio apparatus.

FIG. 6 is a functional block diagram of a section of the audio apparatus 10 according to the present embodiment. The audio apparatus 10 includes, in addition to the operation key 31, the display unit 32, the microphone 40, and the laminated piezoelectric element 61 those described above, a communication unit 110, a piezoelectric element drive unit 120, and a controller 130. The operation key 31, the display unit 32, the microphone 40, and the communication unit 110 are connected to the controller 130. The laminated piezoelectric element 61 is connected to the controller 130 via the piezoelectric element drive unit 120.

The communication unit 110 is connected, via a telephone line or a communication cable such as an Ethernet (registered trademark) cable, or in a wireless manner, to a communication network such as a public telephone line or IP network. The controller 130 is a processor for controlling the entire operation of the audio apparatus 10. The controller 130 applies the audio signal (for example, a voltage corresponding to the audio signal of the other party of the call) received by the communication unit 110 to the laminated piezoelectric element 61 via the piezoelectric element drive unit 120.

Figure 7:
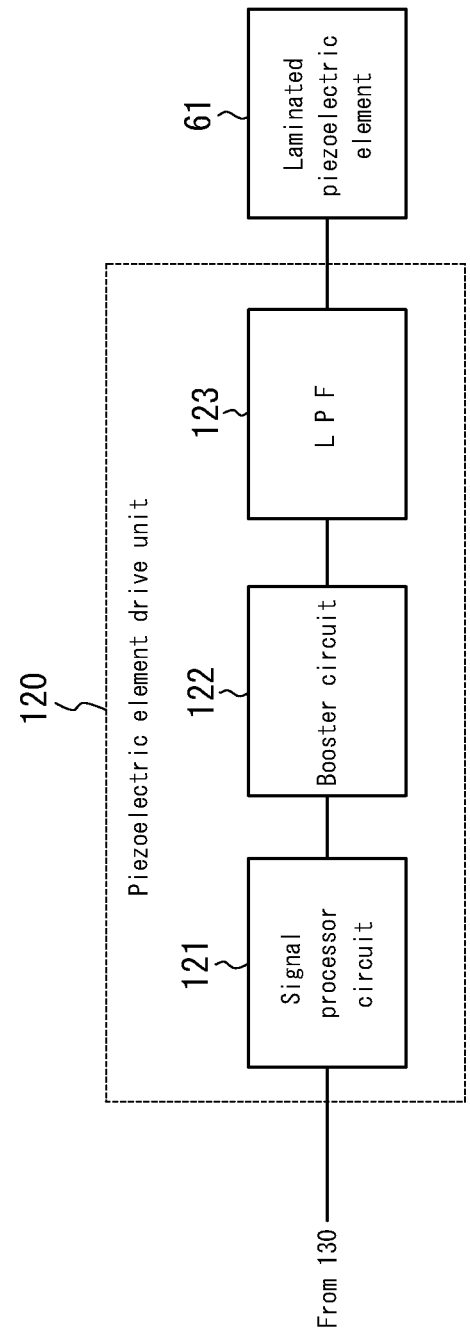
FIG. 7 is a functional block diagram illustrating an example of a configuration of a piezoelectric element drive unit.

The piezoelectric element drive unit 120, as illustrated in FIG. 7 by way of example, includes a signal processor circuit 121, a booster circuit 122, and a low-pass filter (LPF) 123. The signal processor circuit 121 is constituted by using, for example, a digital signal processor (DSP) or the like having an equalizer and an A/D conversion circuit. The signal processor circuit 121 carries out necessary signal processing such as equalization processing and D/A conversion processing on a digital signal received from the controller 130 and thus generates an analogue audio signal and outputs the analogue audio signal to the booster circuit 122. The function of the signal processor circuit 121 may be incorporated in the controller 130.

The booster circuit 122 boosts the voltage of the analog audio signal that has been input and applies thus obtained signal to the laminated piezoelectric element 61 via the LPF 123. A maximum voltage of the audio signal applied to the laminated piezoelectric element 61 by the booster circuit 122 may be, for example, in a range of 10 Vpp to 50 Vpp but not limited thereto. The maximum voltage may be appropriately adjusted based on the weight of the audio apparatus 10 and performance of the laminated piezoelectric element 61. The audio signal applied to the laminated piezoelectric element 61 may have a biased DC voltage having the maximum voltage set therearound.

Figure 8:
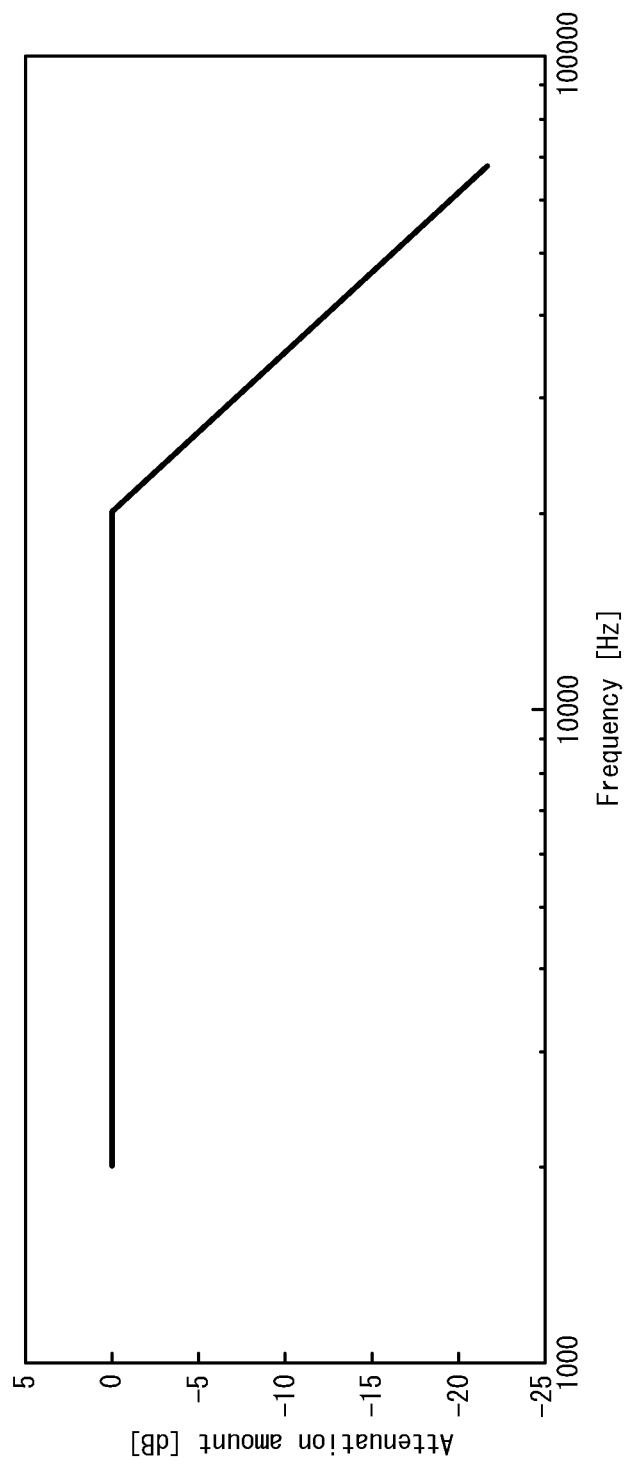
FIG. 8 is a diagram illustrating an example of frequency characteristics of an LPF.

Not only the laminated piezoelectric element 61 but the piezoelectric elements generally have more power loss in proportion to a frequency. Therefore, the LPF 123 is set to have frequency characteristics to attenuate or cut at least a portion of a frequency component at approximately 10 kHz to 50 kHz or higher, or frequency characteristics to increase an attenuation rate gradually or in stages. FIG. 8 illustrates the frequency characteristics of the LPF 123 having a cut-off frequency at approximately 20 kHz by way of example. Attenuation or cutting the high frequency component in this manner allows suppressing power consumption as well as heat generation by the laminated piezoelectric element 61.

Figure 9:
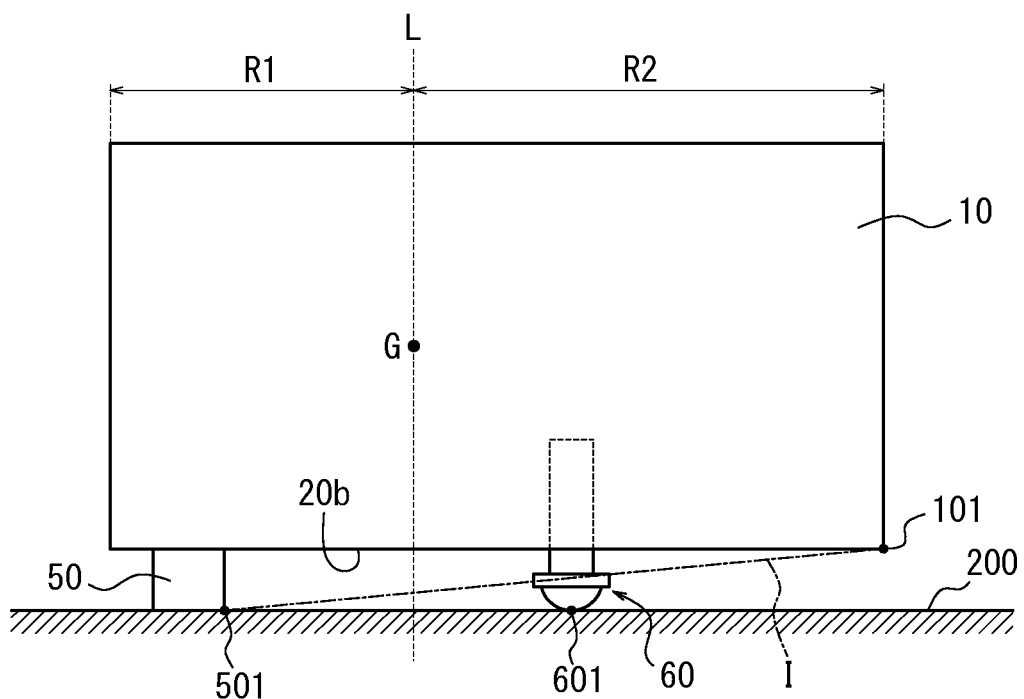
FIG. 9 is a diagram illustrating an example of arrangements of the piezoelectric vibration unit and legs.

Next, an example of arrangements of the piezoelectric vibration unit 60 and the legs 50 will be described. FIG. 9 illustrates a state in which the audio apparatus 10 is placed with the bottom surface 20b facing down on the placing surface 200 of the table or the like that is horizontal. The table is an example of a contact object of the audio apparatus 10, and the placing surface 200 is an example of the contact surface (placing surface) in contact with the audio apparatus 10. In the example of the arrangements illustrated in FIG. 9, the piezoelectric vibration unit 60 is disposed on the periphery of the bottom surface 20b and, together with a plurality of legs 50 arranged on the periphery of the bottom surface 20b in a similar manner, supports the audio apparatus 10 on the placing surface 200 at multiple positions (for example, four positions). A dot G represents a center of gravity of the audio apparatus 10.

In FIG. 9, the leg 50 includes a lowermost end portion 501, which is a portion in contact with the placing surface 200 when the audio apparatus 10 is placed with the bottom surface 20b facing down on the placing surface 200 of the table or the like that is horizontal.

The piezoelectric vibration unit 60 includes a lowermost portion 601, which is a portion in contact with the placing surface 200 when the audio apparatus 10 is placed with the bottom surface 20b facing down on the placing surface 200 of the table or the like that is horizontal. The lowermost end portion 501 is, for example, a tip of the cap 63.

The audio apparatus 10 includes a lowermost end portion 101. The lowermost end portion 101 of the audio apparatus 10 is a portion in contact with the placing surface 200 when the audio apparatus 10 is placed with the bottom surface 20b facing down on the placing surface 200 of the table or the like that is horizontal, assuming that there is no piezoelectric vibration unit 60. The lowermost end portion 101 of the audio apparatus 10 is, for example, an edge of the housing 20 but not limited thereto. When the bottom surface 20b has a protrusion portion protruding therefrom, the protrusion portion may serve as the lowermost end portion 101 of the audio apparatus 10.

In FIG. 9, a dotted line L represents a line (a virtual line) passing through the center of gravity G of the audio apparatus 10 and perpendicular to the placing surface 200 when the audio apparatus 10 is placed with the bottom surface 20b facing down on the placing surface 200 of the table or the like that is horizontal. A dashed line I represents a line (a virtual line) passing through the lowermost end portion 101 in contact with the placing surface 200 and the line L and parallel to the placing surface 200, assuming that there is no piezoelectric vibrating unit 60.

In FIG. 9, a region R1 is one of regions of the audio apparatus 10 separated by the line L, and a region R2 is the other. The legs 50 are provided on the bottom surface 20 in the region R1. The piezoelectric vibration unit 60 is provided on the bottom surface 20b in the region R2.

In this case, the piezoelectric vibration unit 60 is preferably positioned as close to the line L as possible on the bottom surface 20b in the region R2. Thereby, a load applied to the piezoelectric vibration unit 60 becomes larger than that when the piezoelectric vibration unit 60 is positioned remote from the line L on the bottom surface 20b in the region R2.

The legs 50 are preferably positioned as remote from the line L as possible on the bottom surface 20b in the region R1. Thereby, when the piezoelectric vibration unit 60 is positioned as close to the line L as possible, a sufficient distance is ensured between the legs 50 and the piezoelectric vibration unit 60, allowing stable placement of the audio apparatus 10 on the placing surface 200.

A lowermost portion 601 of the piezoelectric vibration unit 60, at the time of maximum extension of the laminated piezoelectric element 61 from a non-extending/contracting state thereof having no voltage applied thereto, or at the time of maximum amplitude of the laminated piezoelectric element 61, may position between the dotted line I and the placing surface 200. That is, the lowermost portion 601, at the time of maximum extension of the laminated piezoelectric element 61 from the non-extending/contracting state thereof with no voltage applied thereto, or at the time of maximum amplitude of the laminated piezoelectric element 61, may protrude from the dotted line I toward the placing surface 200. Thereby, the piezoelectric vibration unit 60 may appropriately vibrate the placing surface 200.

Also, the lowermost portion 601 of the piezoelectric vibration unit 60, at the time of maximum contraction of the laminated piezoelectric element 61 from the non-extending/contracting state thereof with no voltage applied thereto, or at the time of minimum amplitude of the laminated piezoelectric element 61, may position between the dotted line I and the placing surface 200. That is, the lowermost portion 601, at the time of maximum contraction of the laminated piezoelectric element 61 from the non-extending/contracting state thereof with no voltage applied thereto, or at the time of minimum amplitude of the laminated piezoelectric element 61, may protrude from the dotted line I toward the placing surface 200. Thereby, the lowermost portion 101 of the audio apparatus 10 becomes less likely to contact the placing surface 200 and, for example, depending on a type of coating of the housing 20, the coating becomes less likely to come off. Also, an abnormal noise is less likely to be generated between the lowermost portion 101 and the placing surface 200.

Figure 10A:
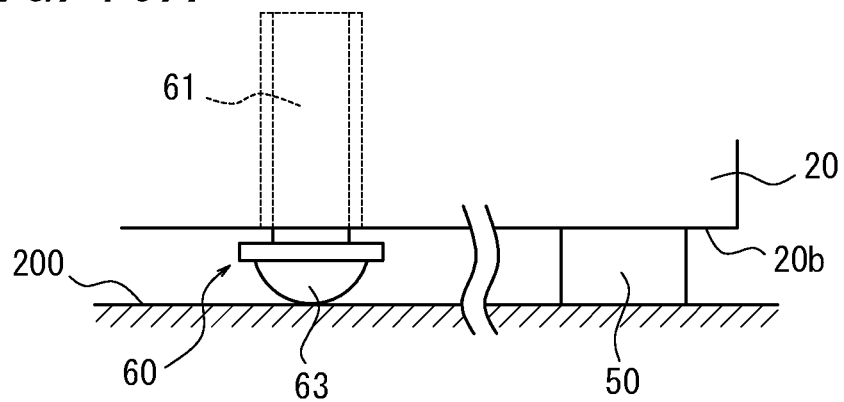
FIG. 10A is an explanatory diagram of a sound generating operation carried out by the audio apparatus.
Figure 10B:
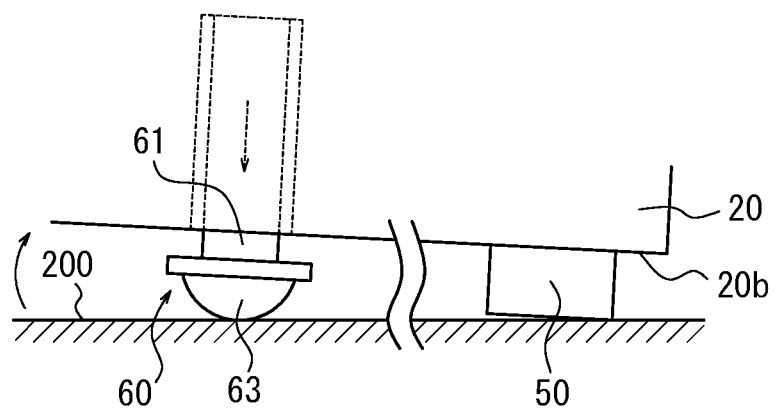
FIG. 10B is an explanatory diagram of the sound generating operation carried out by the audio apparatus.
Figure 10C:
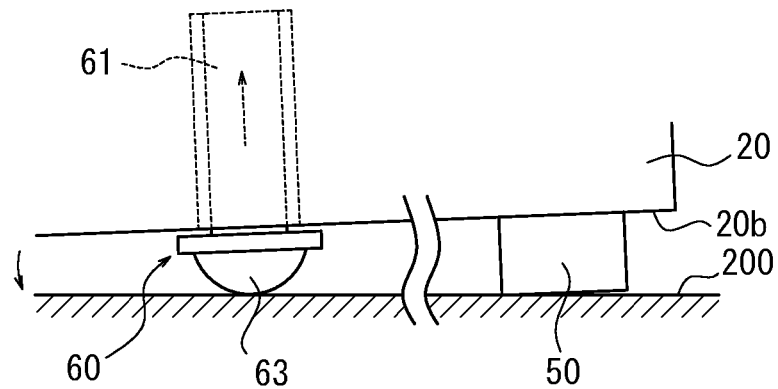
FIG. 10C is an explanatory diagram of the sound generating operation carried out by the audio apparatus.

FIGS. 10A, 10B, and 10C are explanatory diagrams of a sound generating operation of the audio apparatus 10 according to the present embodiment. The audio apparatus 10, as illustrated in FIG. 10A, is placed in such a manner that the bottom surface 20b of the housing 20 faces down and the cap 63 of the piezoelectric vibration unit 60 and the legs 50 contact the placing surface (contact surface) 200 of the table or the like. Thereby, the weight of the audio apparatus 10 is applied as a load to the piezoelectric vibration unit 60. In a state illustrated in FIG. 10A, the laminated piezoelectric element 61 has no voltage applied thereto and thus is not extending and contracting.

In this a state, when the laminated piezoelectric element 61 of the piezoelectric vibration unit 60 is driven upon the audio signal, the laminated piezoelectric element 61, as illustrated in FIGS. 10B and 10C, by using a portion (or portions) of any one or a plurality of legs 50 in contact with the placing surface (the contact surface) 200 as a support (supports), vibrates extending (FIG. 10B) and contracting (FIG. 10C) according to the audio signal, during which the cap 63 stays in contact with the placing surface (the contact surface) 200. Specifically, FIG. 10B shows a state when the piezoelectric vibration unit 60 is deformed in response to the audio signal and extends or projects (in comparison with FIG. 10A) outwardly from the housing 20, as indicated by the arrow in FIG. 10B. FIG. 10C shows another state when the piezoelectric vibration unit 60 is deformed in response to the audio signal and retracts or contracts (in comparison with FIG. 10A) inwardly into the housing 20, as indicated by the arrow in FIG. 10C. As far as not inducing a disadvantage such as generation of the abnormal noise caused by the lowermost portion 101 contacting the placing surface 200, the cap 63 may be slightly spaced apart from the placing surface (the contact surface) 200. A difference between a length of the laminated piezoelectric element 61 at the time of maximum extension and a length thereof at the time of maximum contraction is, for example, 0.05 μm to 50 μm. Thereby, the extending and contracting vibration of the laminated piezoelectric element 61 is delivered to the placing surface 200 via the cap 63, and the placing surface 200 vibrates and, serving as a vibration speaker, generates a sound. When the difference between the length of the laminated piezoelectric element 61 at the time of maximum extension and the length thereof at the time of maximum contraction is smaller than 0.05 μm, the placing surface 200 may possibly not be vibrated appropriately. On the other hand, when the difference is greater than 50 μm, the placing surface 200 vibrates too much, possibly rattling the audio apparatus 10.

As described above, the tip of the cap 63, at the time of maximum extension of the laminated piezoelectric element 61, may position between the dotted line I and the placing surface 200 in FIG. 9. Also, the tip of the cap 63, at the time of maximum contraction of the laminated piezoelectric element 61, may position between the dotted line I and the placing surface 200.

Also, the distance d between the bottom surface 20b and the facing surface 63c of the cap 63 may be longer than a displacement amount of the laminated piezoelectric element from the non-extending/contracting state thereof with no voltage applied thereto to the maximum contraction state. Thereby, when the laminated piezoelectric element 61 contracts maximum (a state illustrated in FIG. 10C), the bottom surface 20b of the housing 20 and the cap 63 becomes less likely to come into contact with each other. As a result, the cap 63 becomes less likely to come off the piezoelectric element 61.

A position of the piezoelectric element 60 on the bottom surface 20b, a length of the laminated piezoelectric element 61 in the lamination direction, a size of the cap 63 and the like are appropriately determined in a manner satisfying the above conditions.

Next, with reference to FIG. 11, another example of the arrangements of the piezoelectric vibration unit 60 and the legs 50 will be described. In the another example of the arrangements illustrated in FIG. 11, a plurality of (3 or more) legs 50 are disposed at the periphery of the bottom surface 20b of the housing 20 and, in a central portion of the bottom surface 20b, the piezoelectric vibration unit 60 is positioned on a vertical line passing through the center of gravity G when the audio apparatus 20 is placed on a horizontal surface. Accordingly, when four legs 50 are provided, the audio apparatus 10 is supported by four legs 50 and one piezoelectric element 60 on the placing surface 200.

Figure 11:
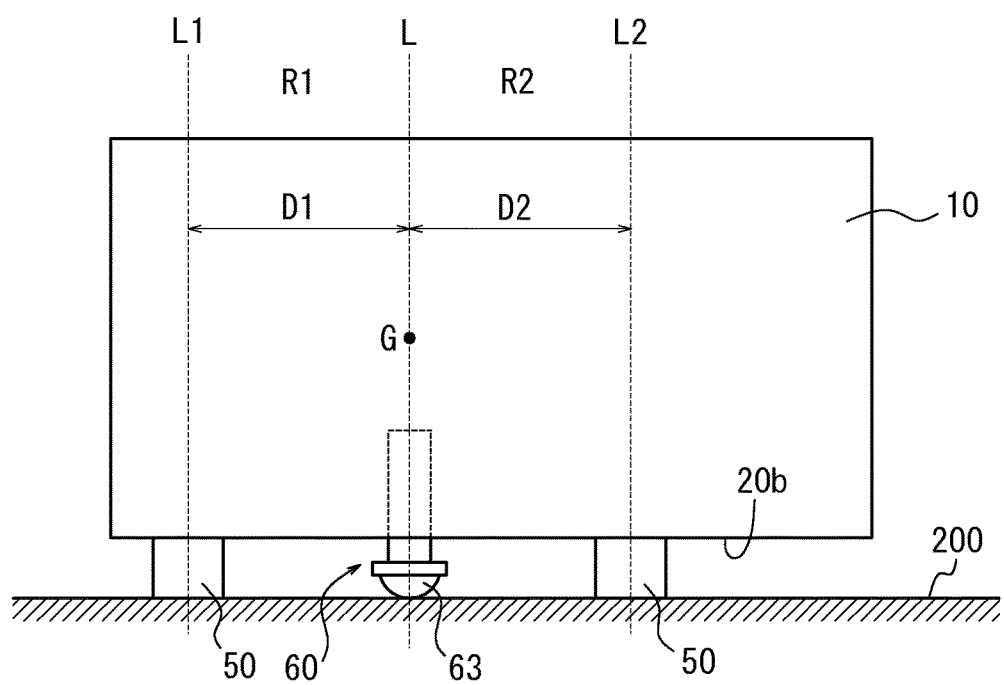
FIG. 11 is a diagram illustrating another example of the arrangements of the piezoelectric vibration unit and the legs.

In FIG. 11, the line L, similarly to that in FIG. 9, is a line (a virtual line) passing through the center of gravity G of the audio apparatus 10 and perpendicular to the placing surface 200 when the audio apparatus 10 is placed with the bottom surface 20b facing down on the placing surface 200 of the table or the like that is horizontal. In FIG. 11, pairs of legs 50 are provided across the dotted line L that passes through the center of gravity G of the audio apparatus 10. In this case, the number of the legs 50 is an even number of at least 4. A dotted line L1 is a line (a virtual line) passing through the legs 50 on one side and perpendicular to the placing surface 200. A dotted line L2 is a line (a virtual line) passing through the legs 50 on the other side and perpendicular to the placing surface 200. The dotted line L1 is spaced apart from the line L by a distance D1 in a horizontal direction. The dotted line L2 is spaced apart from the line L by a distance D2 in the horizontal direction.

In FIG. 11, a region R1 is one of regions separated by the dotted line L, and the region R2 is the other. The legs 50 on one side, on the bottom surface 20b, are arranged in the region R1 being spaced apart from the piezoelectric vibration unit 60 by a distance D1 in the horizontal direction. The legs 50 on the other side, on the bottom surface 20b, are arranged in the region R2 being spaced apart from the piezoelectric vibration unit 60 by a distance D2 in the horizontal direction.

The piezoelectric vibration unit 60 is provided on the dotted line L on the bottom surface 20b. That is, the piezoelectric vibration unit 60 is disposed on a line passing through the center of gravity G of the audio apparatus 10 and perpendicular to the placing surface 200 when the audio apparatus 10 is placed with the bottom surface 20b facing down on the placing surface 200 that is horizontal. Thereby, the weight of the audio apparatus 10 may be applied as the load to the piezoelectric vibration unit 60, and the extending and contracting vibration of the piezoelectric vibration unit 60 may be efficiently delivered to the placing surface (the contact surface) 200. When D1=D2 is satisfied, that is, when a pair of legs 50 are disposed in a symmetrical manner with respect to the piezoelectric vibration unit 60, the audio apparatus 10 may be stably placed on the placing surface 200.

The piezoelectric vibration unit 60, when the laminated piezoelectric element 61 is driven upon the audio signal, vibrates extending and contracting according to the audio signal, during which the cap 63 stays in contact with the placing surface (the contact surface) 200. As far as not inducing the disadvantage such as generation of the abnormal noise caused by the lowermost portions of the legs 51 contacting the placing surface 200, the lowermost portions of the legs 50 may be slightly spaced apart from the placing surface (the contact surface) 200 when the piezoelectric vibration unit 60 is driven.

The legs 50, when the audio apparatus 10 is placed with the bottom surface 20b facing down on the placing surface 200 of the table that is horizontal, receives the weight of the audio apparatus 10 as the load and thus is elastically deformed. That is, the legs 50, due to the weight of the audio apparatus 10, contracts in a direction perpendicular to the placing surface 200. In a state in which the laminated piezoelectric element 61 has no voltage applied thereto and thus is not extending and contracting, an elastic deformation amount of the legs 50 is preferably greater than the displacement amount of the laminated piezoelectric element 61 from no-extending/contracting state thereof with no voltage applied thereto to the maximum extension state. Thereby, at the time of maximum extension of the laminated piezoelectric element 61, the legs 50 are less likely to separate from the placing surface 200, allowing the stable placement of the audio apparatus 10 on the placing surface 200.

Figure 12:
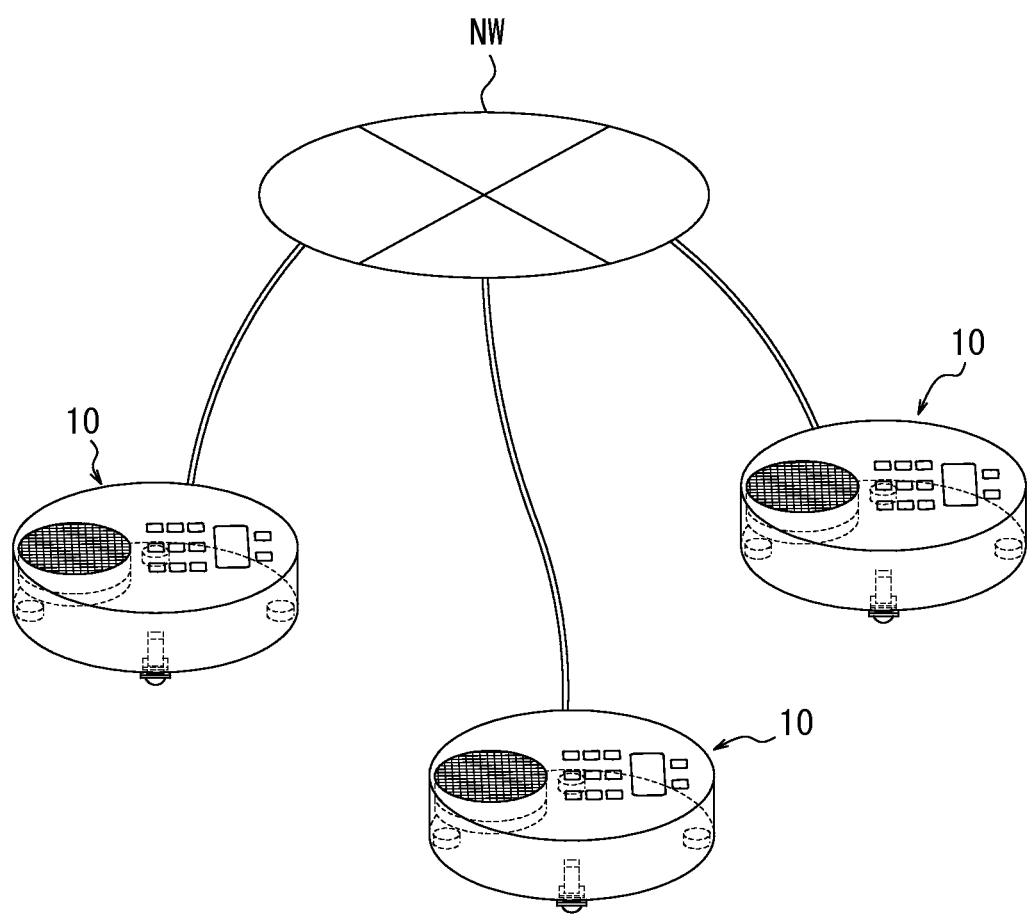
FIG. 12 is a diagram illustrating an example of a configuration of a voice conference system including the audio apparatus of FIG. 1.

FIG. 12 is a diagram illustrating an example of a configuration of a voice conferencing system (an audio system) having the audio apparatus 10 according to the present embodiment. The audio apparatus 10 is connected to the audio apparatus 10 of the other party at a remote location via communication network NW such as the public telephone line or the IP network. Each of the audio apparatuses 10 is connected to the communication network NW via the communication cable such as the telephone line or the Ethernet (registered trademark) cable, or in the wireless manner. An audio signal transmitted from the audio apparatus 10 on this side is sent to the audio apparatus 10 of the other party of the conference, and an audio signal from the audio apparatus 10 of the other party of the conference is output from the contact surface such as the table having the audio apparatus 10 on this side placed thereon. In this manner, the audio conferencing is performed. It is a matter of course that the other party of the conference may use an audio apparatus with a conventional structure.

Since the audio apparatus 10 according to the present embodiment uses the piezoelectric element as a vibration source, the audio apparatus 10 may be smaller and lighter than a conventional audio apparatus having a dynamic speaker. Also, since the audio apparatus 10 outputs a sound by vibrating the contact surface of the table or the like having the audio apparatus 10 placed thereon, regardless of a distance from the audio apparatus and without directivity, a sound may be output at homogeneous volume, providing homogeneous and excellent audio characteristics over a wide area in the conference room. Therefore, unlike the conventional audio apparatus having the dynamic speaker, there is no need to increase the sound around the audio apparatus. Moreover, since the microphone 40 is retained in the housing 20 via the damper 70, the vibration of the piezoelectric vibration unit 60 delivered to the microphone 40 may be efficiently attenuated. Therefore, a sneak sound to the microphone 40 may be reduced, whereby noise such as echo may be also reduced.

Also, since the laminated piezoelectric element 61 of the stuck type is used as the piezoelectric element and caused to vibrate extending and contracting along the lamination direction upon the audio signal and, also, the extending and contracting vibration is delivered to the placing surface (the contact surface) 200, the vibration in an extending and contracting direction may be efficiently delivered to the placing surface (the contact surface) 200, efficiently vibrating the placing surface (the contact surface) 200. Further, since the laminated piezoelectric element 61 is in contact with the placing surface (the contact surface) 200 via the cap 63, the laminated piezoelectric element 61 may be prevented from being damaged. Also, since the weight of the audio apparatus 10 is applied as the load to the cap 63, the cap 63 may reliably contact the placing surface (contact surface) 200 and efficiently deliver the extending and contracting vibration of the piezoelectric vibration unit 60 to the placing surface (contact surface) 200.

Second Embodiment

Figure 13:
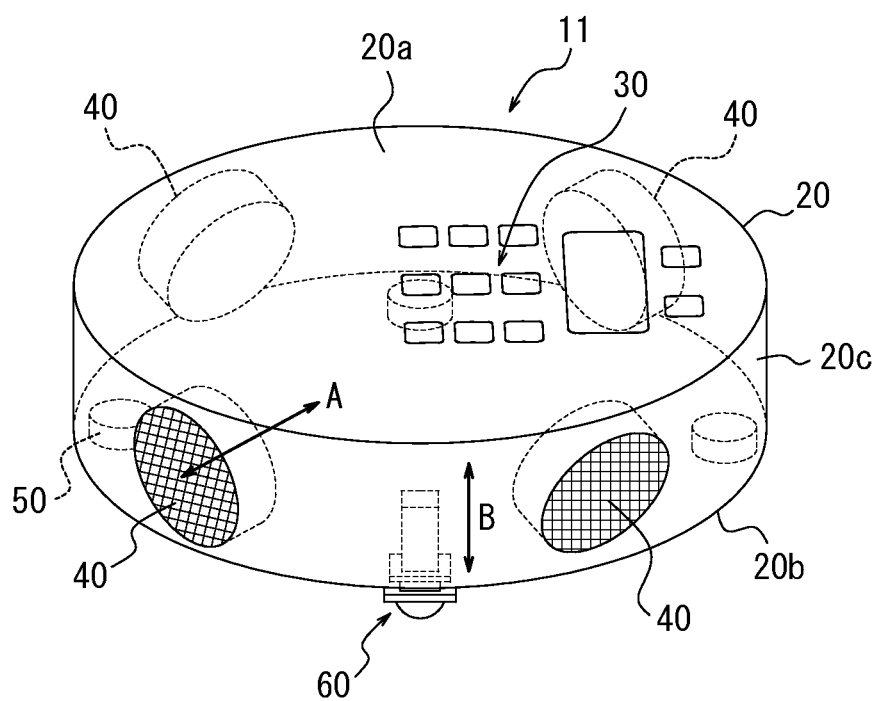
FIG. 13 is a perspective view illustrating a schematic configuration of an audio apparatus according to a second embodiment.

FIG. 13 is a perspective view illustrating a schematic structure of an audio apparatus according to a second embodiment. An audio apparatus 11 according to the present embodiment is composed of the audio apparatus 10 according to the first embodiment, to which a plurality of microphones 40 are provided (facing each of four directions of two lines orthogonal to each other in FIG. 13). The microphone 40 is arranged on a lateral side 20c of the housing 20 in such a manner that a vibration direction (indicated by a bidirectional arrow A) of a diaphragm constituting the microphone 40 intersects with, or preferably becomes orthogonal to, a vibration direction of the piezoelectric vibration unit 60 (indicated by a bidirectional arrow B). The microphones 40 may be attached to the housing 20 directly or via the damper similarly to the first embodiment. The other structures are similar to the first embodiment, and the same components are provided with the same reference numerals and descriptions thereof will be omitted.

According to the present embodiment, since a vibration direction A of the diaphragm of the microphone 40 intersects with a vibration direction B of the piezoelectric vibration unit 60, the vibration of the piezoelectric vibration unit 60 delivered to the microphone 40 may be more efficiently attenuated. Therefore, the sneak sound to the microphone 40 may be reduced, whereby noise such as echo may be also reduced. Such an effect is exhibited especially significantly when the microphone 40 is retained in the housing 20 via the damper.

Third Embodiment

Figure 14:
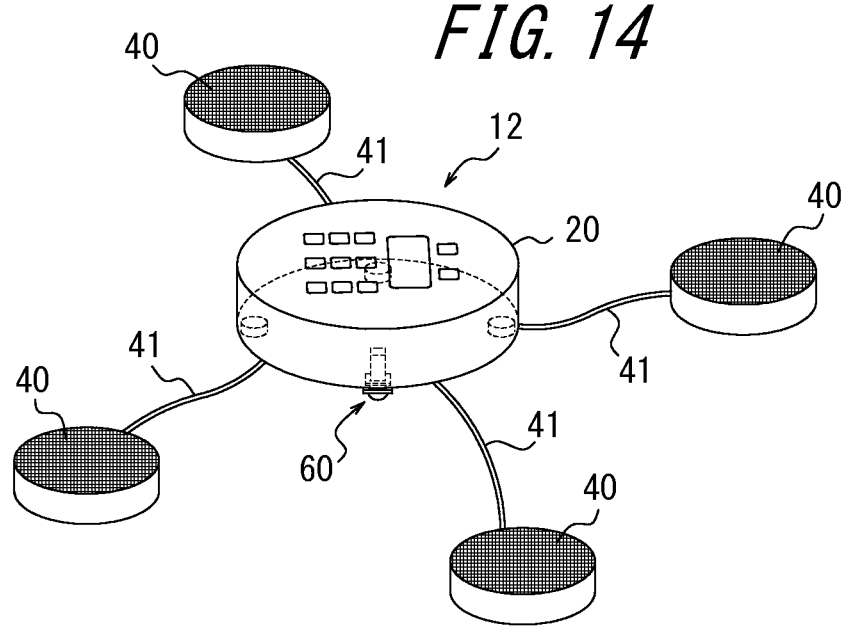
FIG. 14 is a perspective view illustrating a schematic configuration of an audio apparatus according to a third embodiment.

FIG. 14 is a perspective view illustrating a schematic structure of an audio apparatus according to a third embodiment. An audio apparatus 12 according to the present embodiment is composed of the audio apparatus 11 according to the second embodiment having each of the plurality of microphones 40 separated from the housing 20 serving as a body. The other structures are similar to the second embodiment, and the same components are provided with the same reference numerals and descriptions thereof will be omitted. The microphones 40, via cables 41 or in the wireless manner, are connected to a controller 130 arranged in the housing 20 (see FIG. 6). The microphones 40 may be used being placed on the contact surface of the table or the like having the housing 20 placed thereon, or being worn by conference participants in a manner of pin microphones.

Figure 15:
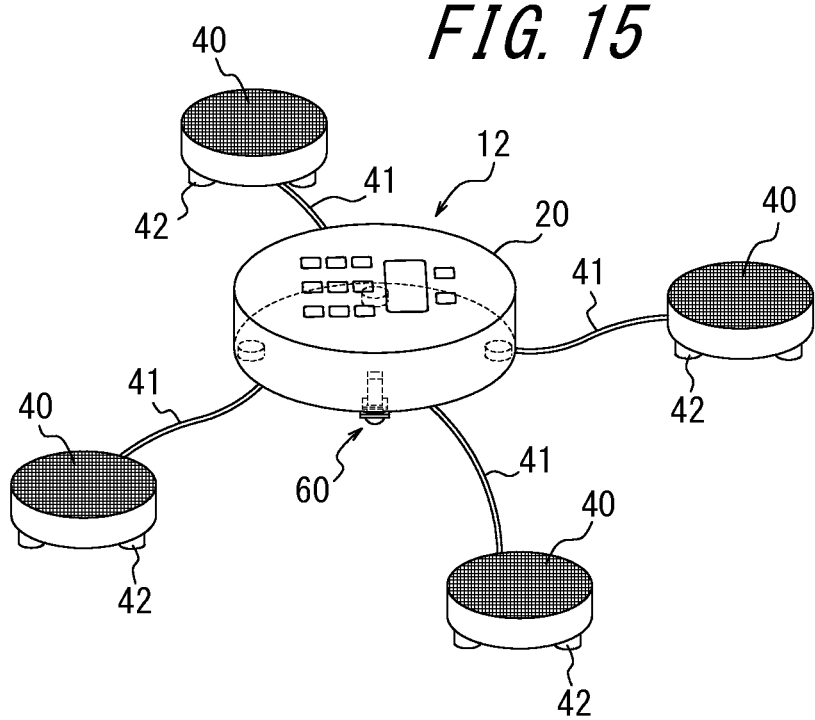
FIG. 15 is a perspective view illustrating an example of variations of the third embodiment.

Separation of the microphones 40 from the body in this manner allows the microphones 40 to be located close to the conference participants. Therefore, without enhancing microphone sensitivity, a transmission voice may be efficiently converted into the electric signal. Accordingly, the sneak sound of the output received voice to the microphone 40 may be reduced, whereby noise such as echo may be also reduced. When the microphone 40 is used being placed on the contact surface of the table or the like having the housing 20 placed thereon, as illustrated in FIG. 15, each of the microphones 40 are preferably provided with a plurality of legs 42 made of an elastic material similar to the legs 50 of the housing 20. Thereby, the legs 42 may attenuate the vibration of the contact surface delivered to the microphone 40, reducing the sneak sound to the microphone 40 and thus reducing the noise such as the echo.

Fourth Embodiment

Figure 16:
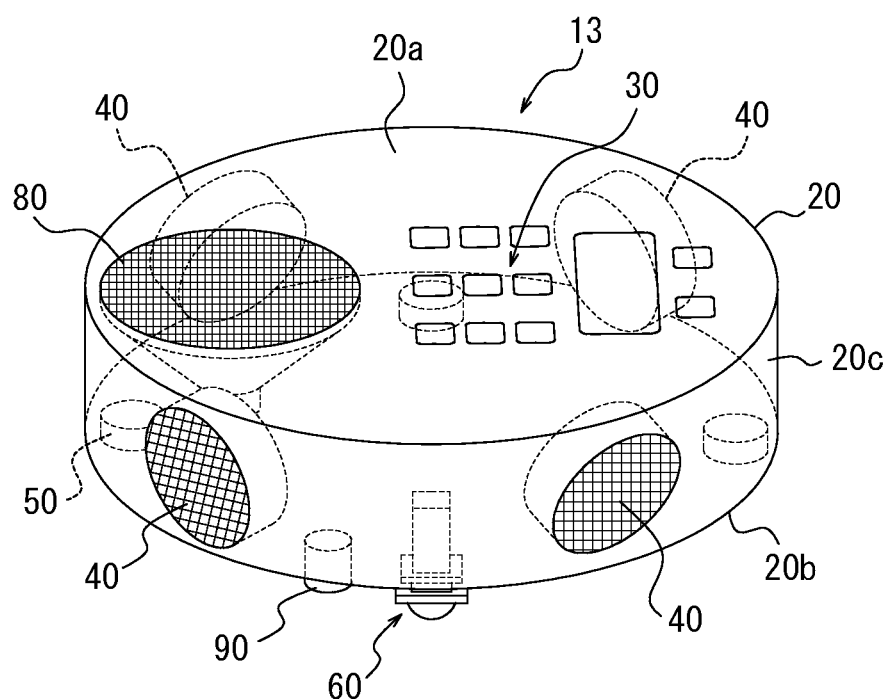
FIG. 16 is a perspective view illustrating a schematic configuration of an audio apparatus according to a fourth embodiment.

FIG. 16 is a perspective view illustrating a schematic structure of an audio apparatus according to a fourth embodiment. An audio apparatus 13 according to the present embodiment is composed of the audio apparatus 11 according to the second embodiment further including a speaker 80 and a detection unit 90. The other structures are similar to the second embodiment, and the same components are provided with the same reference numerals and descriptions thereof will be omitted. The speaker 80 is a sound output device for outputting the audio signal and constituted by using, for example, a small dynamic speaker having excellent frequency characteristics in a high sound area, a piezoelectric speaker, a capacitance speaker, or the like. The speaker 80 is disposed in the housing 20 in a manner outputting the received voice from the upper surface 20a of the housing 20.

Figure 17:
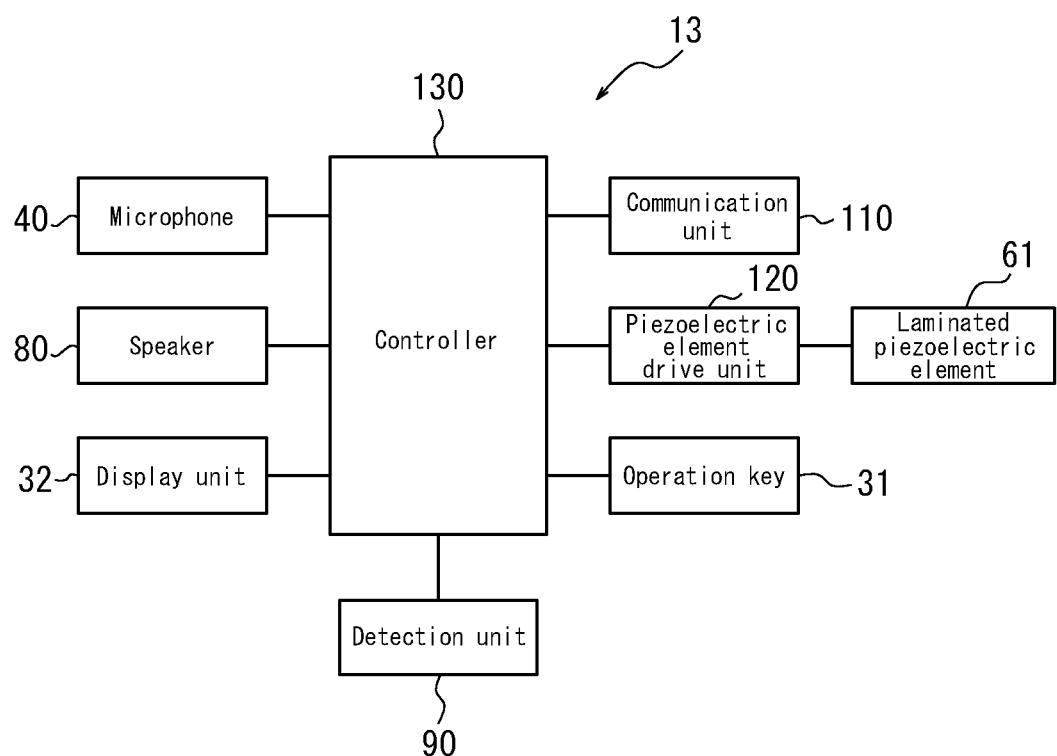
FIG. 17 is a functional block diagram of a section of the audio apparatus of FIG. 16.

The detection unit 90 is disposed on the bottom surface 20b of the housing 20 and detects whether the piezoelectric vibration unit 60 is in contact with the placing surface 200, that is, detects a contact state between the placing surface (the contact surface) 200 and the piezoelectric vibration unit 60. The detection unit 90 is constituted by using a device capable of detecting the contact state between the placing surface 200 and the piezoelectric vibration unit 60 such as, for example, an infrared sensor, an ultrasonic sensor, a proximity sensor, a mechanical switch, a camera, a pressure sensor, or the like. The detection unit 90 may be constituted by using the piezoelectric vibration unit 60 by using an output thereof as the sensor. The speaker 80 and the detection unit 90, as illustrated in a functional block diagram in FIG. 17, are connected to the controller 130.

Figure 18:
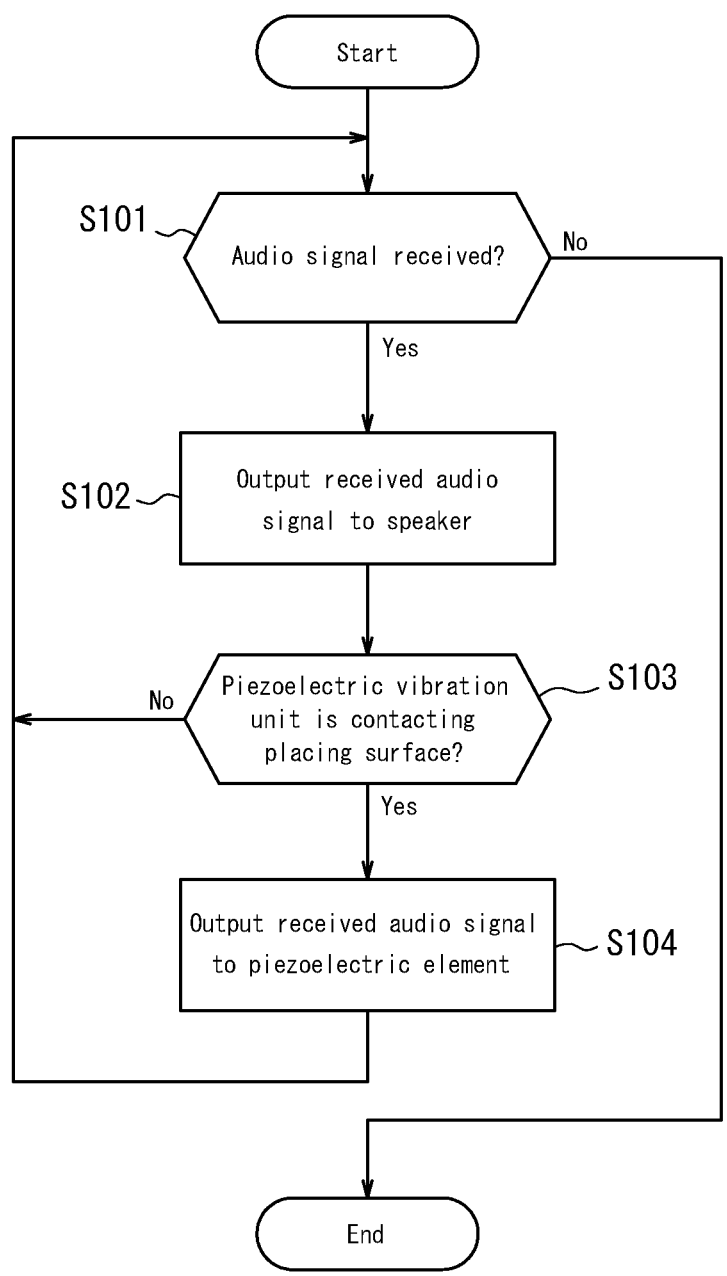
FIG. 18 is a flowchart illustrating an example of an operation of the audio apparatus of FIG. 16.

FIG. 18 is a flowchart illustrating an example of an operation of the audio apparatus 13 according to the present embodiment. First, the controller 130 checks whether there is the audio signal (step S101). When there is no audio signal (No), the controller 130 ends this flow without applying the audio signals to the laminated piezoelectric element 61 and the speaker 80. When there is the audio signal (Yes), the controller 130 outputs the audio signal to the speaker 80 (step S102).

Next, the controller 130 checks whether the detection unit 90 is detecting the contact between the piezoelectric vibration unit 60 and the placing surface 200 (step S103). When the detection unit 90 is not detecting the contact between the piezoelectric vibration unit 60 and the placing surface 200 (No), the controller 130 does not output the audio signal to the laminated piezoelectric element 61. In this case, the received voice is not generated from the placing surface 200 but output from the speaker 80 alone.

On the other hand, when the detection unit 90 is detecting the contact between the piezoelectric vibration unit 60 and the placing surface 200 (Yes), the controller 130 outputs the audio signal to the laminated piezoelectric element 61 via the piezoelectric element drive unit 120 (see FIG. 6) (step S104). In this case, the received voice is generated from both the speaker 80 and the placing surface 200. The controller 130, by repeating the series of operations in FIG. 18, based on the contact state between the piezoelectric vibration unit 60 and the placing surface 200, controls the output of the audio signals to the speaker 80 and the piezoelectric element 61.

As described above, when the piezoelectric vibration unit 60 is in contact with the placing surface 200 and the audio signal is output from both the placing surface 200 and the speaker 80, since the speaker 80 has excellent frequency characteristics in the high sound area and the placing surface 200 has excellent frequency characteristics in a relatively low sound area, a sound with excellent frequency characteristics overall across the low sound area to the high sound area may be output. Also, the speaker 80 having the excellent frequency characteristics in the high sound area can be small in size, allowing a reduction in size and weight of the entire audio apparatus.

Although according to the present embodiment, when the piezoelectric vibration unit 60 is in contact with the placing surface 200, the audio signals are output from both the placing surface 200 and the speaker 80, the audio signal may be output from the placing surface 200 alone. Also, when the audio signals are output from both the placing surface 200 and the speaker 80, the sound output from the placing surface 200 is detected and the frequency characteristics of the audio signal to be applied to the speaker 80 may be controlled in a manner compensating for the lack of frequency characteristics of the output sound. Or, the frequency characteristics of the sound signal to be applied to the laminated piezoelectric element 61 may be corrected in a manner compensating for the lack of the frequency characteristics of the speaker 80.

Fifth Embodiment

Figure 19:
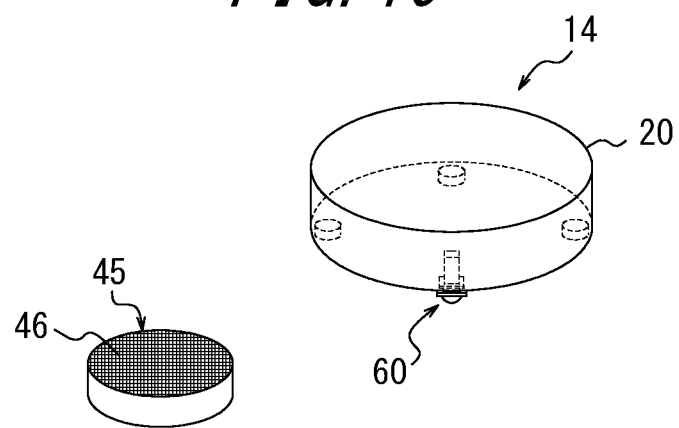
FIG. 19 is a perspective view illustrating a schematic configuration of an audio system according to a fifth embodiment.

FIG. 19 is a perspective view illustrating a schematic configuration of an audio system according to a fifth embodiment. The audio system according to the present embodiment includes a microphone unit 45 and an audio apparatus 14 separate from each other. The audio apparatus 14 constitutes a speaker unit and includes the housing 20 and the piezoelectric vibration unit 60 retained in the housing 20. The piezoelectric vibration unit 60 has the configuration similar to that in the above embodiments and retained by the housing 20 in a similar manner.

Figure 20:
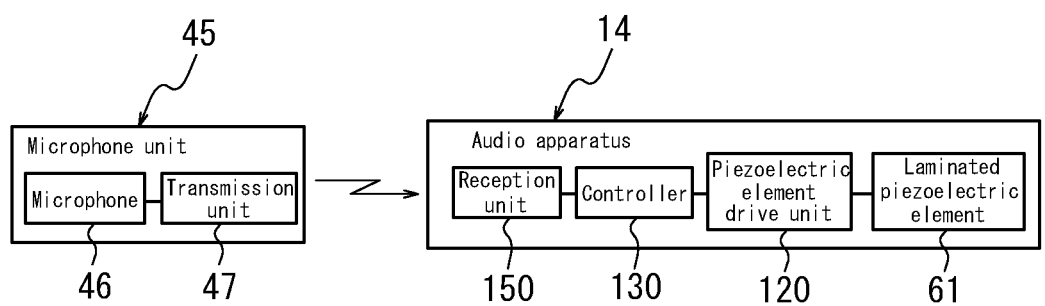
FIG. 20 is a functional block diagram of a section of the audio system of FIG. 19.

FIG. 20 is a block diagram of a section of the audio system according to the present embodiment. The microphone unit 45 includes a microphone 46 for picking up the sound and outputting the audio signal and a transmission unit 47 for wirelessly transmitting the audio signal from the microphone 46. The audio apparatus 14 includes a reception unit 150 for receiving the audio signal wirelessly transmitted from the transmission unit 47 of the microphone unit 45, the piezoelectric element drive unit 120 for driving the laminated piezoelectric element 61 constituting the piezoelectric vibration unit 60, and the controller 130.

In the audio system according to the present embodiment, the microphone unit 45 picks up the sound by using the microphone 46 and wirelessly transmits the audio signal from the transmission unit 47. The audio signal transmitted from the microphone unit 45 is received by the reception unit 150 of the audio apparatus 14, input to the controller 130, and then applied to the laminated piezoelectric element 61 by the controller 130 via the piezoelectric element drive unit 120. Thereby, the contact surface having the audio apparatus 14 placed thereon and in contact with the piezoelectric vibration unit 60 vibrates generating a reproduced sound.

According to the present embodiment, similarly to the above embodiments, the audio apparatus 14 may generate sounds having a small volume difference over a wide range via the surface of the audio apparatus 14 in contact with the contact surface. Also, since the audio signal is wirelessly transmitted from the microphone unit 45 to the audio apparatus 14, the microphone unit 45, within a range receivable of the audio signal from the audio apparatus 14, may be placed anywhere remote from the audio apparatus 14. Therefore, since, for example, the microphone unit 45 and the audio apparatus 14 may be placed on different placing surfaces, or placed even in different rooms, more free using modes of the audio system are available and versatility thereof may be improved. Note that the numbers of the microphone 45 and the audio apparatus 14 are not limited to one but may be more than one.

Sixth Embodiment

Figure 21A:
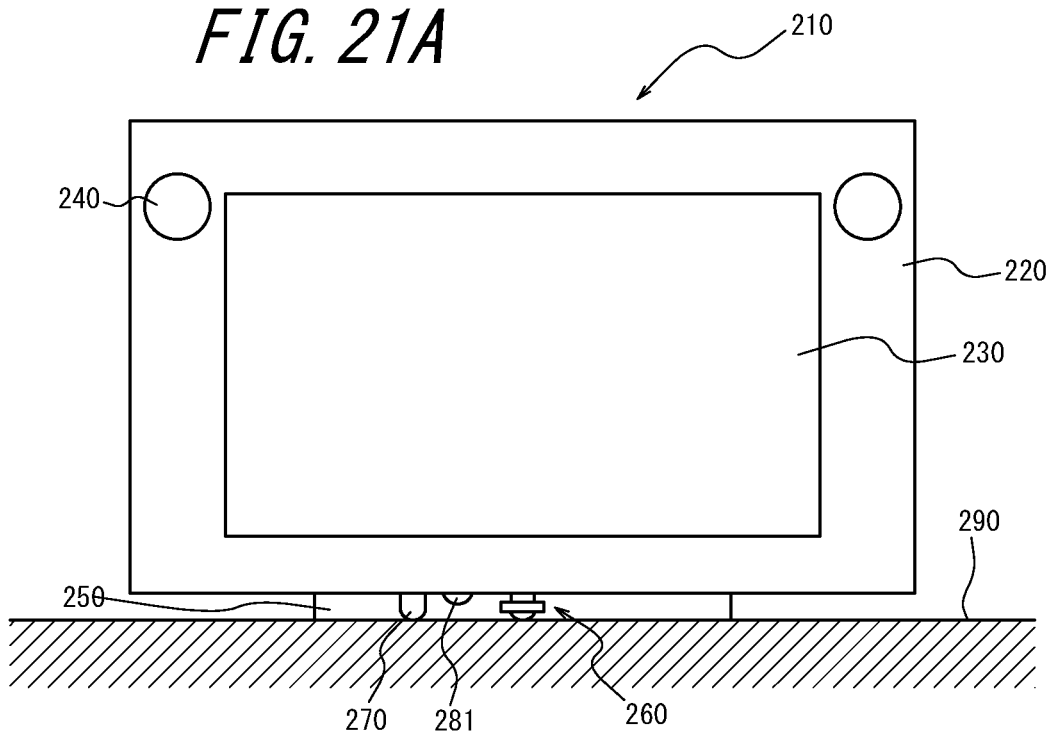
FIG. 21A is an elevation view illustrating a schematic configuration of an image display apparatus according to a sixth embodiment.
Figure 21B:
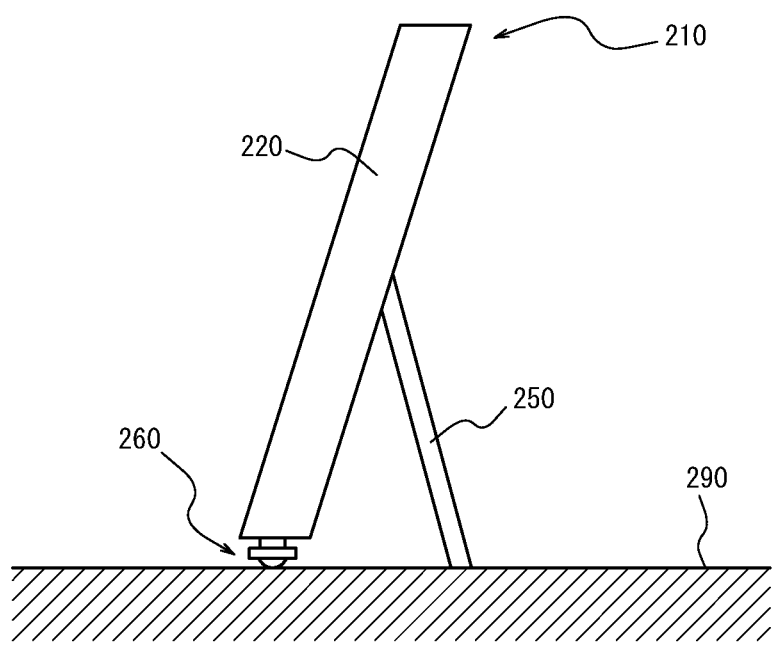
FIG. 21B is a side view of the image display apparatus of FIG. 21A.

FIGS. 21A and 21B are an elevation view and a side view, respectively, those illustrating a schematic structure of an image display apparatus according to a sixth embodiment. The image display apparatus according to the present embodiment is a TV 210 of what is called a stand type that includes a housing 220, a display unit 230, a speaker 240, a support member 250, a piezoelectric vibration unit 260, a detection unit 270, and a microphone 281. The TV 210 applies a load to the piezoelectric vibration unit 260. The housing 220 has a substantially rectangular external shape. The display unit 230 is retained in the housing 220. The TV 210 is placed on a placing surface 290 of a desk or the like that is horizontal. The desk is an example of the contact object, and the placing surface 290 is an example of the contact surface (the placing surface) with which the TV 210 is in contact.

As illustrated in FIG. 21B, the TV 210 in normal use is supported on the placing surface 290 by the support member 250 provided on a rear side for supporting the piezoelectric vibration unit 260 and the housing 220. The support member 250 is preferably provided in such a manner that an inclination angle thereof is adjustable with respect to the housing 220.

The display unit 230 is a thin display device such as, for example, a liquid crystal display, a plasma display, an organic EL display, or an inorganic EL display. The speaker 240 is, for example, a sound output device such as the dynamic speaker or a capacitor speaker.

The detection unit 270 detects whether the piezoelectric vibration unit 260 is in contact with the placing surface 290, that is, detects a contact state between the placing surface (the contact surface) 290 and the piezoelectric vibration unit 260. The detection unit 270, similarly to the detection unit 90 according to the fourth embodiment, is constituted by using the device capable of detecting the contact state between the piezoelectric vibration unit 260 the placing surface 290 such as, for example, the infrared sensor, the ultrasonic sensor, the proximity sensor, the mechanical switch, the camera, the pressure sensor, or the like. The detection unit 270 may be constituted by using the piezoelectric vibration unit 260 by using an output thereof as the sensor.

The microphone 281, together with a memory unit described later, constitutes a recording unit for recording the frequency characteristics of the sound generated from the contact surface (the placing surface 290) of the desk or the like in contact with the piezoelectric vibration unit 260. The recording unit obtains the sound generated from the contact surface by using the microphone 281 and stores the sound in the memory unit. The memory unit is arranged in the housing 220.

Figure 22:
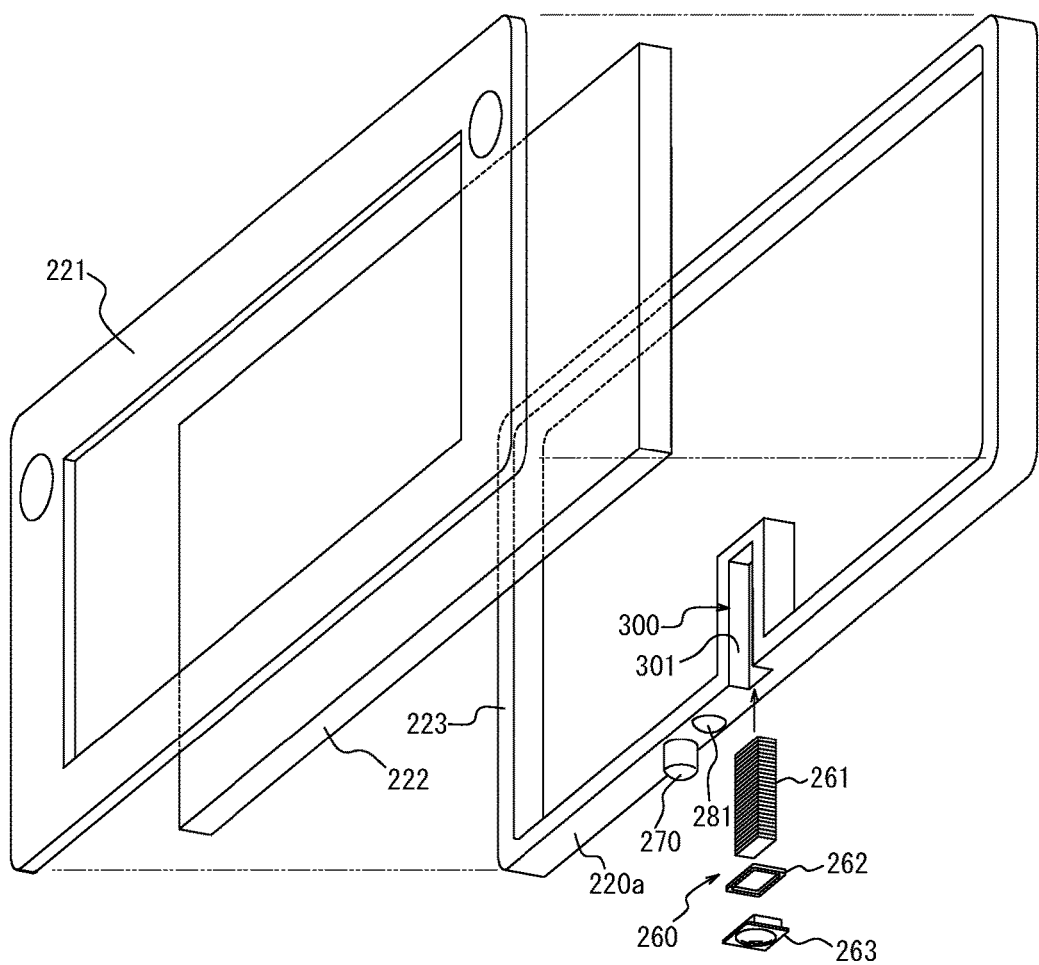
FIG. 22 is a schematic perspective view of a section illustrated in an exploded view of a front side of a housing of FIG. 21A.

FIG. 22 is a schematic perspective view of a section illustrated in an exploded view of a front side of the housing 220 of FIG. 21A. The housing 220 includes a front bezel 221 and a rear cover 223 those retaining, therebetween, a display panel module 222 constituting the display unit 230. The front bezel 221 is an exterior cover on a front side of the TV 210. The display panel module 222 is exposed to the front side through an opening of the front bezel 221. The display panel module 222, when, for example, the display unit 230 is the liquid crystal display, includes a liquid crystal panel and a backlight unit. A rear side of the display panel module 222 is formed with a flat plate-shaped panel chassis made of a metal such as aluminum or iron. The panel chassis is provided with, on a rear side thereof, for example, an electric circuit board for displaying an image such as a control board, a drive board, a TV tuner substrate, and the like. The rear cover 223 protects the electric circuit board mounted on the panel chassis of the display panel module 222. The TV 210 according to the present embodiment is provided with a holder portion 300 for accommodating and retaining the piezoelectric vibration unit 260 on a bottom side of the housing 220. The piezoelectric vibration unit 260 is arranged at a portion of the housing opposite to the placing surface (the contact surface) 290. The holder portion 300 has a slit 301 with a uniform width extending, for example, in a direction substantially vertical to the TV 210 in use and opening to a bottom surface 220a of the rear cover 223 of the housing 220.

The piezoelectric vibration unit 260 includes a piezoelectric element 261, an O-ring 262, and a cap 263 that serves as the insulating cover member, and has a configuration similar to the piezoelectric vibration unit 60 according to the first embodiment. Therefore, in this embodiment also, the piezoelectric element 261 is constituted by using the laminated piezoelectric element of the stack type.

Figure 23:
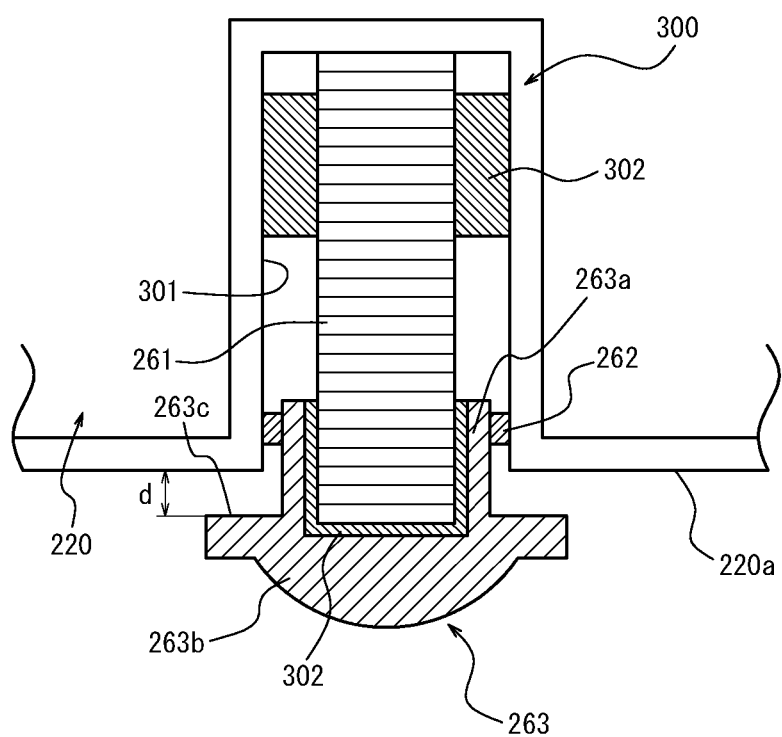
FIG. 23 is a partially enlarged cross-sectional view of a piezoelectric vibration unit of FIG. 21A.

The laminated piezoelectric element 261, as illustrated in a partially enlarged cross-sectional view of FIG. 23, has one lateral end portion having the first lead connection portion and the second lead connection portion those described in the first embodiment and fixed to the slit 301 of the holder portion 300 of the housing 220 via adhesive 302 (for example, epoxy resin). The other end portion of the laminated piezoelectric element 261 is capped with the cap 63 and fixed by the adhesive 302.

The cap 263 includes an entry portion 263a and a protrusion portion 263b. When the cap 263 is attached to the laminated piezoelectric element 261, the entry portion 263a is positioned inside the slit 301, and the protrusion portion 263b protrudes from the housing 220. The O-ring 262 is provided to a circumference of the entry portion 263a positioned inside the slit 301. When the piezoelectric vibration unit 260 is attached to the holder portion 300 and the front bezel 221 is attached to the housing 220, the protrusion portion 263b of the cap 263 protrudes from the bottom surface 220a of the housing 220. The protrusion portion 263b of the cap 263 has a facing surface 263c opposite to the bottom surface 220a of the housing 220. As illustrated in FIG. 23, when the laminated piezoelectric element 261 has no voltage applied thereto and thus is not extending and contracting, the facing surface 263c is spaced apart from the bottom surface 220a by the distance d.

Figure 24:
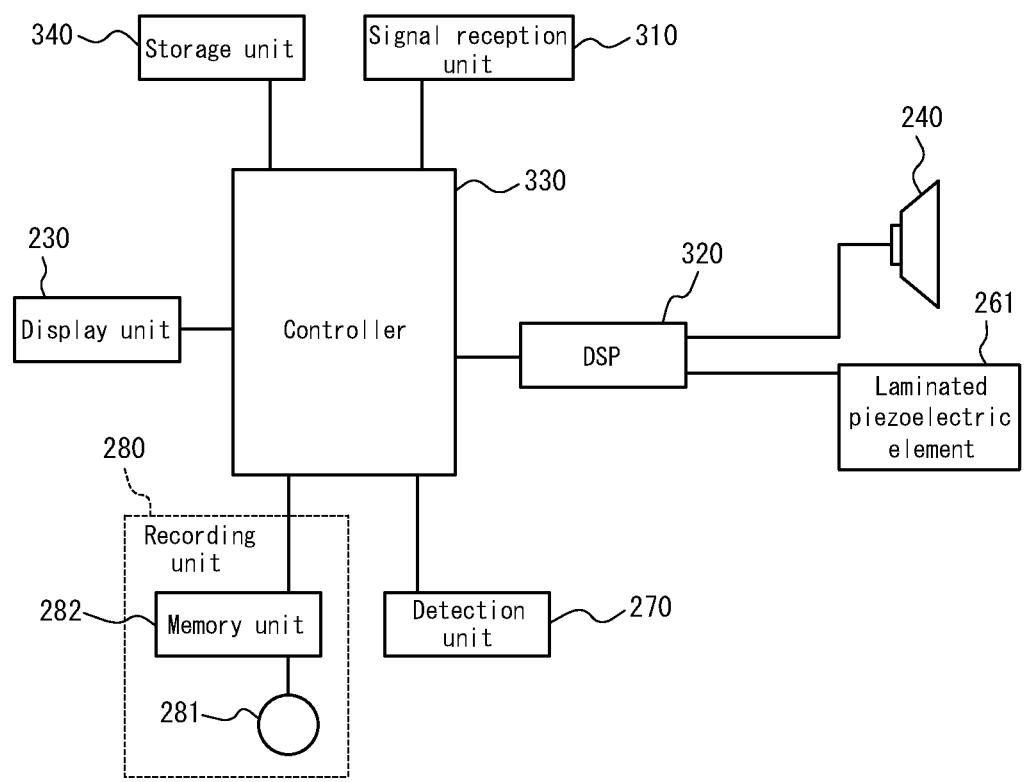
FIG. 24 is a functional block diagram of a section of a TV of FIG. 21A.

FIG. 24 is a functional block diagram of a section of the TV 210 according to the present embodiment. The TV 210 includes, in addition to the display unit 230, the speaker 240, the detection unit 270, the recording unit 280, and the laminated piezoelectric element 261 those described above, a signal reception unit 310, a DSP 320, a controller 330, and a storage unit 340. The display unit 230, the detection unit 270, the signal reception unit 310, and the storage unit 340 are connected to the controller 330. The recording unit 280, as described above, includes the microphone 281 and the memory unit 282. The memory unit 282 is connected to the controller 330. The speaker 240 and the laminated piezoelectric element 261 are connected to the controller 330 via the DSP 320. The DSP 320 may be built in the controller 330. The memory unit 282 and the storage unit 340 may be constituted by using one memory.

The signal reception unit 310 has a known structure and receives a broadcast signal such as a video signal and a sound signal that is transmitted in a wired or wireless manner and viewed on the TV 210. The controller 330 is a processor for controlling overall operations of the TV 210. The control unit 330 is one control unit in this embodiment but not limited to such a structure. For example, the controller 330 may be constituted by using a plurality of controllers for serving different functions. The controller 330, via the DSP 320, applies the sound signal to the laminated piezoelectric element 261 and the speaker 240. The sound signal may be based on music data stored in an internal memory or included in the broadcast signal.

The controller 330, based on the contact state between the piezoelectric vibration unit 260 and the placing surface 290 detected by the detection unit 270, controls the sound signals to be applied to the laminated piezoelectric element 261 and the speaker 240. For example, when the detection unit 270 detects that the piezoelectric vibration unit 260 and the placing surface 290 are in contact with each other, the controller 330 applies the sound signal to both the laminated piezoelectric element 261 and the speaker 240. In this case, the piezoelectric vibration unit 260 and the speaker 240 are driven at the same time. On the other hand, when the detection unit 270 detects that the piezoelectric vibration unit 260 and the placing surface 290 are not in contact with each other, the controller 330 applies the sound signal to the speaker 240 alone without applying the sound signal to the laminated piezoelectric element 261.

Figure 25:
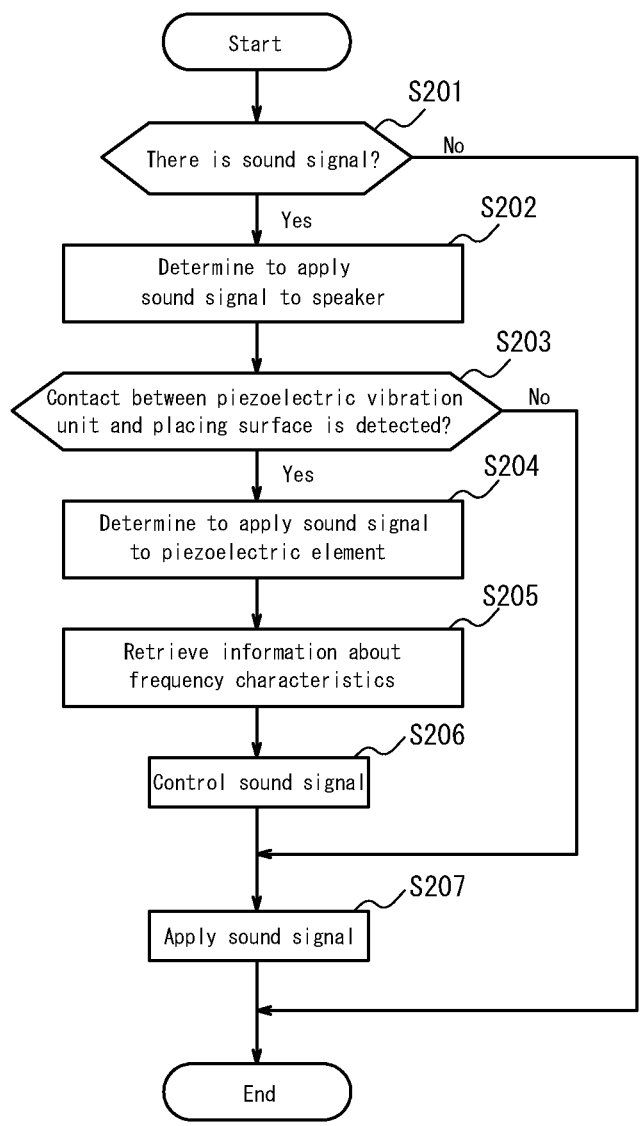
FIG. 25 is a flowchart illustrating an operation of a controller of FIG. 24.

FIG. 25 is a flowchart illustrating an operation of the controller 330 for applying the sound signal to the laminated piezoelectric element 261 and the speaker 240. First, the controller 330 checks whether there is the sound signal to be applied (step S201). When there is no sound signal to be applied (No at step S201), the controller 330 ends the flow without applying the sound signal to the laminated piezoelectric element 261 and the speaker 240. When there is the sound signal to be applied (Yes at step S201), the controller 330 determines to apply the sound signal to the speaker 240 (step S202). Next, the controller 330 checks whether the detection unit 270 is detecting the contact between the piezoelectric vibration unit 260 and the placing surface 290 (step S203). When the detection unit 270 is not detecting the contact between the piezoelectric vibration unit 260 and the placing surface 290 (No at step S203), the controller 330 applies the sound signal to the speaker 240 alone without applying the sound signal to the laminated piezoelectric element 261 (step S207). In this case, the sound is generated not from the placing surface 290 but from the speaker 240 alone.

On the other hand, when the detection unit 270 is detecting the contact between the piezoelectric vibration unit 260 and the placing surface 290 (Yes at step S203), the controller 330 determines to apply the sound signal to the laminated piezoelectric element 261 (step S204). Then, the controller 330 retrieves information about the frequency characteristics of the sound (step S205). The information about the frequency characteristics of the sound is, for example, information about the frequency characteristics of the sound generated from the speaker 240 stored in the storage unit 340. The controller 330, based on the information thus retrieved, controls the sound signals to be applied to, for example, the laminated piezoelectric element 261 (step S206) and applies the sound signal to the laminated piezoelectric element 261 and the speaker 240 (step S207). The control of the sound signal carried out by the controller 330 at step S206 will be described in detail later. In this way, the sound is generated from both the placing surface 290 and the speaker 240. The controller 330, while the TV 210 is on, repeats the series of operations in FIG. 25 and thereby, based on the contact state between the piezoelectric vibration unit 260 and the placing surface 290, controls the sound signals to be applied to the speaker 240 and the laminated piezoelectric element 261.

Figure 26A:
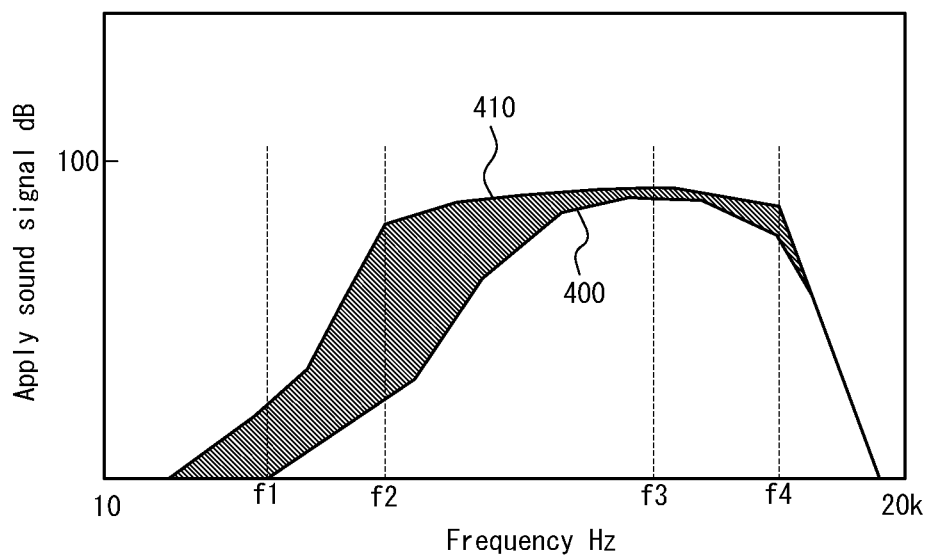
FIG. 26A is an explanatory view of an example of sound signal control according to a sixth embodiment.

Next, the control of the sound signal carried out by the controller 330 at step S206 will be described. The controller 330 controls the sound signal based on the information about the frequency characteristics of the speaker 240 retrieved from the storage unit 340. A region 400 in FIG. 26A represents an example of the frequency characteristics of the speaker 240 stored in the storage unit 340. As can be seen in FIG. 26A, similarly to a typical tendency of the conventional dynamic speaker, the speaker 240 has the frequency characteristic in which the sound pressure is low in a low frequency band. Therefore, when the sound is generated by using the speaker 240 alone, it is difficult for a user watching the TV 210 to hear a low-pitched sound. Especially in a frequency band at a frequency f1 or lower, the sound pressure is 0, and the speaker 240 cannot generate the sound at the frequency f1 or lower. Also, the speaker 240 has the frequency characteristics that form a convex curve with an apex around a frequency f3 (>f1). That is, when the speaker 240 alone is used to generate the sound, the generated sound around the frequency f3 is loud and, as the frequency becomes higher or lower than the frequency f3, a volume of the generated sound becomes smaller.

The controller 330, at step S206, controls the sound signal to be applied to the piezoelectric element 261 in a manner compensating for the lack of the sound pressure of the frequency characteristic of the speaker 240. The compensation for the lack of the sound pressure of the frequency characteristics includes, for example: increasing the sound pressure in a frequency band with a low sound pressure such that the sound in the frequency band is easily heard; increasing the sound pressure in the entire frequency band so as to increase the entire volume; and increasing the sound pressure in a specific frequency band so as to emphasize the sound in the specific frequency band. The controller 330, for example, by compensating for the lack of the sound pressure in such a manner that the frequency characteristics similar to that in the region 410 in FIG. 26A is exhibited, controls the sound signal to be applied to the piezoelectric element 261. The controller 330 applies the sound signal thus controlled to the piezoelectric element 261 at step S207. The control of the sound signal in this manner increases the sound pressure in the low frequency band. Also, in a frequency band from the frequency f2 (f1<f2<f3) to a frequency f4 (>f3), the sound pressure becomes substantially even, reducing a difference in intensity of the sound at each frequency generated from the TV 210.

The controller 330, at step S205, may retrieve the information about the frequency characteristics of the sound generated from the contact surface recorded by the recording unit 280 and, at step S206, control the sound signal to be applied to the speaker 240 based on the information thus retrieved. In this case, after the TV 210 is placed on the placing surface 290 and prior to actual use thereof, the controller 330 applies a pure tone sweep signal at a uniform level as the sound signal to the piezoelectric element 261 and vibrates the piezoelectric element 261, thereby generating the sound from the contact surface. The frequency characteristics of the generated sound is acquired by the microphone 281 of the recording unit 280 and recorded by the memory unit 282. Then, during the actual use, the controller 330 retrieves the information about the frequency characteristics stored and, based on this information, controls the sound signal to be applied to the speaker 240. For the image display apparatus such as the TV 210 according to the present embodiment that is unlikely to be moved onto another placing surface after being placed on the placing surface 290, after the frequency characteristics is recorded by the memory unit 282, the controller 330 may repeatedly retrieve the recorded frequency characteristics. On the other hand, for the image display apparatus such as a digital photo frame that is likely to be often moved onto other placing surfaces, every time the application of the sound signal to the piezoelectric element 261 is determined at step S204, the frequency characteristics may be obtained from the microphone 281 and recorded by the memory unit 282. In this case, the controller 330 retrieves the frequency characteristics that has been recorded by the memory unit 282 last time and, based on the retrieved information about the frequency characteristic, controls the sound signal to be applied to the speaker 240.

Figure 26B:
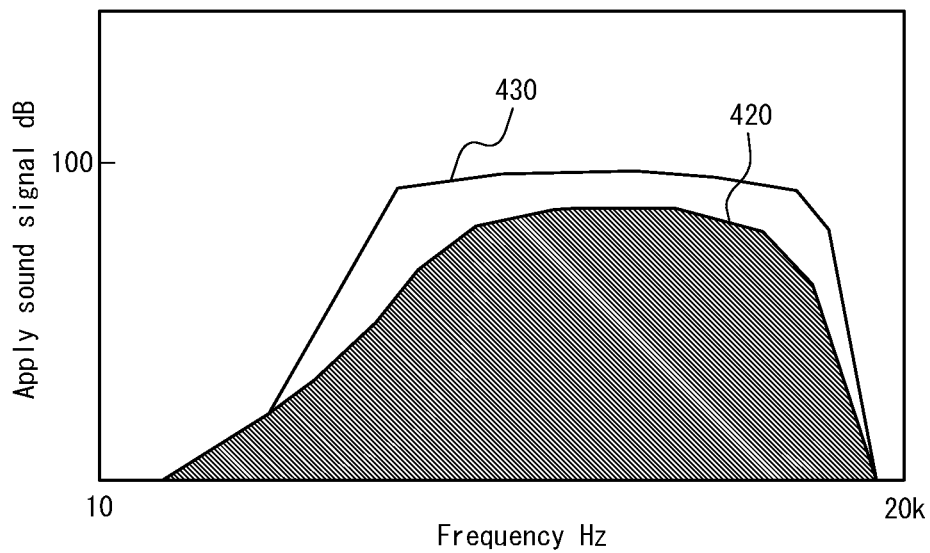
FIG. 26B is an explanatory view of another example of the sound signal control according to the sixth embodiment.

A range 420 in FIG. 26B represents an example of the frequency characteristics of the sound generated from the contact surface recorded by the recording unit 280. Referring to the recorded frequency characteristics, the controller 330 controls the sound signal to be applied to the speaker 240 in a manner compensating for the lack of the sound pressure, such that the frequency characteristics represented by a range 430 in FIG. 26B may be obtained. The controller 330 applies the sound signal thus controlled to the speaker 240 at step S207. The controller 330, in order to obtain a sound pressure of desired frequency characteristics, may control both the sound signal to be applied to the piezoelectric element 261 and the sound signal to be applied to the speaker 240.

The DSP 320, on the digital signal from the controller 330, carries out necessary signal processing such as equalizing processing, D/A conversion processing, boosting processing, filtering process and the like, and applies necessary sound signals to the speaker 240 and the piezoelectric element 261.

A maximum voltage of a reproduced sound signal applied to the laminated piezoelectric element 261 may be, for example, in the range of 10 Vpp to 50 Vpp but not limited thereto. The maximum voltage of the reproduced sound signal may be appropriately adjusted according to the weight of the TV 210 and functions of the speaker 240 and the laminated piezoelectric element 261. The sound signal applied to the laminated piezoelectric element 261 may have a biased DC voltage having the maximum voltage set therearound.

Not only the laminated piezoelectric element 261 but the piezoelectric elements generally have more power loss in proportion to the frequency. Therefore, the filtering process of the sound signal applied to the laminated piezoelectric element 261 carried out by the DSP 320 is set to have frequency characteristics to attenuate or cut at least a portion of a frequency component of approximately 10 kHz to 50 kHz or higher, or frequency characteristics to increase an attenuation ratio gradually or in stages. For example, the laminated piezoelectric element 281 has the frequency characteristics having the cut-off frequency at approximately 20 kHz similar to FIG. 8. The attenuation or cutting the high frequency component in this manner allows reduction in power consumption as well as suppression of heat generation by the laminated piezoelectric element 261.

Figure 27:
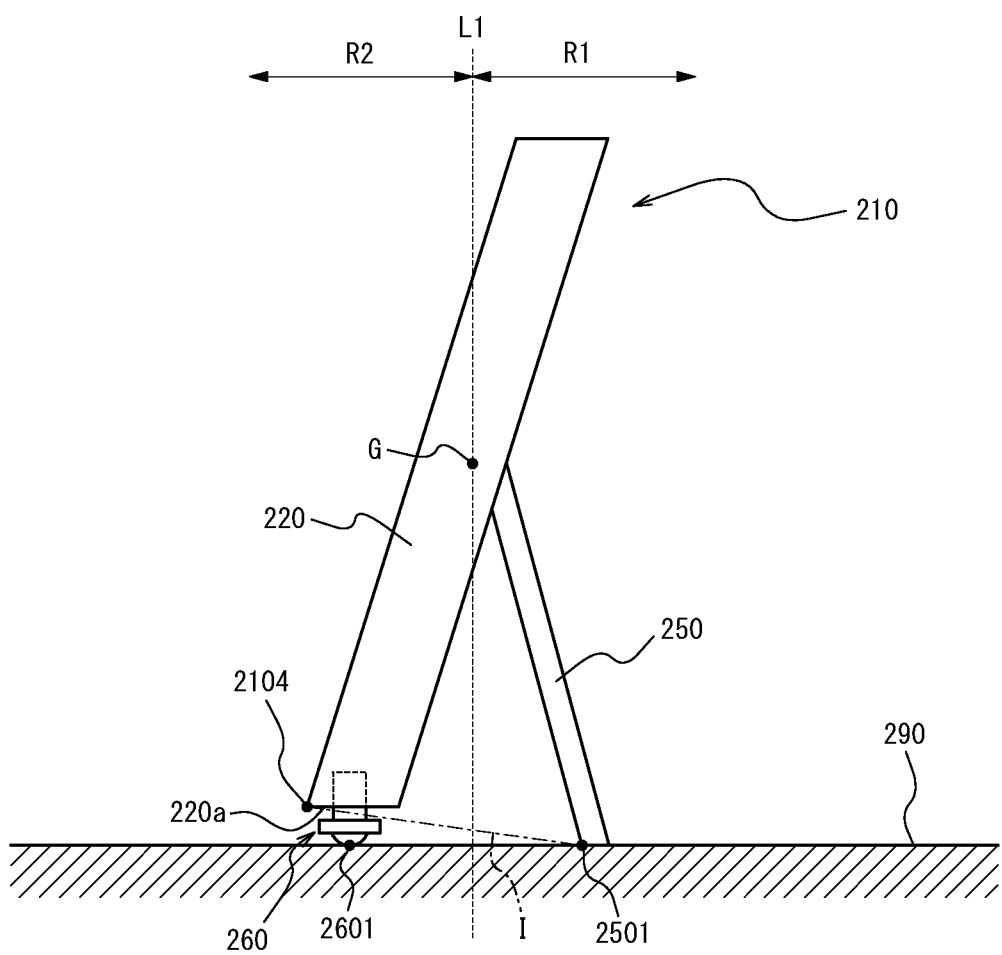
FIG. 27 is a diagram illustrating arrangements of a piezoelectric vibration unit and a support in a TV of FIG. 21A.

Next, with reference to FIG. 27, the arrangements of the piezoelectric vibration unit 260 and the support member 250 will be described. FIG. 27 illustrates a state in which the TV 210 is in use and placed on the placing surface 290 of the desk or the like that is horizontal. As illustrated in FIG. 27, the TV 210 is supported on the placing surface 290 by the piezoelectric vibration unit 260 and the support member 250. The point G represents a center of gravity of the TV 210. In FIG. 27, the support member 250 includes a lowermost portion 2501. The lowermost portion 2501 is a portion of the support member 250 that contacts the placing surface 290 when the housing 220 is placed with the bottom surface 220*a* facing down on the placing surface 290 of the desk or the like that is horizontal.

The piezoelectric vibration unit 260 includes a lowermost portion 2601. The lowermost portion 2601 is a portion of the piezoelectric vibration unit 260 that contacts the placing surface 290 when the housing 220 is placed with the bottom surface 220*a* facing down on the placing surface 290 of the desk or the like that is horizontal. The lowermost portion 2601 is, for example, a tip of the cap 263.

The TV 210 includes a lowermost portion 2104. The lowermost portion 2104 is a portion that contacts the placing surface 290 when the TV 210 is placed with the bottom surface 220*a* facing down on the placing surface 290 of the desk or the like that is horizontal, assuming that there is no piezoelectric vibration unit 260. The lowermost portion 2104 of the TV 210 is, for example, an edge of the housing 220 but not limited thereto. When the bottom surface 220*a* is provided with a protrusion portion protruding therefrom, the protrusion portion may serve as the lowermost portion 2104 of the TV 210.

In FIG. 27, a dotted line L1 represents a line (a virtual line) passing through the center of gravity G of the TV 210 and perpendicular to the placing surface 290 when the TV 210 is placed with the bottom surface 220*a* facing down on the placing surface 290 of the desk or the like that is horizontal. A dashed line I is a line (a virtual line) connecting between the lowermost portion 2501 of the support member 250 and the lowermost portion 2104 of the TV 210, assuming that there is no piezoelectric vibration unit 260.

In FIG. 27, a region R1 is one of regions of the TV 210 separated by the line L1, and a region R2 is the other. The support member 250 is provided in the region R1 and contacts the placing surface 290. The bottom surface 220*a* of the housing 220 having the piezoelectric vibration unit 260 is positioned in the region R2.

Preferably, the piezoelectric vibration unit 260 is positioned as close to the dotted line L1 as possible within the region R2. The housing 220 having the piezoelectric vibration unit 260 is preferably supported as close to be vertical to the placing surface 290 as possible. Thereby, the load applied to the piezoelectric vibration unit 260 becomes heavier than that when the piezoelectric vibration unit 260 is positioned remote from the line L1 within the region R2.

Preferably, the support member 250, within the range R1, is positioned as remote from the dotted line L1 as possible. Thereby, when the piezoelectric vibration unit 260 is positioned as close to the dotted line L1 as possible, a sufficient distance may be ensured between the support member 250 and the piezoelectric vibration unit 260, allowing stable placement of the TV 210 on the placing surface 290.

Preferably, the lowermost portion 2601 of the piezoelectric vibration unit 260, when the laminated piezoelectric element 261 extends maximum from the non-extending/contracting state thereof with no voltage applied thereto, or at the time of maximum amplitude of the laminated piezoelectric element 261, is positioned between the dashed line I and the placing surface 290. That is, the lowermost portion 2601, when the laminated piezoelectric element 261 extends maximum from the non-extending/contracting state thereof with no voltage applied thereto, or at the time of maximum amplitude of the laminated piezoelectric element 261, preferably protrudes from the dashed line I toward the placing surface 290. Thereby, the piezoelectric vibration unit 260 may appropriately vibrate the placing surface 290.

Preferably, the lowermost portion 2601 of the piezoelectric vibration unit 260, when the laminated piezoelectric element 261 contracts maximum from the non-extending/contracting state thereof with no voltage applied thereto, or at the time of minimum amplitude of the laminated piezoelectric element 261, is positioned between the dashed line I and the placing surface 290. That is, the lowermost portion 2601, when the laminated piezoelectric element 261 contracts maximum from the non-extending/contracting state thereof with no voltage applied thereto, or at the time of minimum amplitude of the laminated piezoelectric element 261, preferably protrudes from the dashed line I toward the placing surface 290. Thereby, the lowermost portion 2104 of the TV 210 becomes less likely to contact the placing surface 290 and, for example, depending on a type of coating of the housing 220, the coating becomes less likely to come off. Also, the abnormal noise is less likely to be generated between the lowermost portion 2104 and the placing surface 290.

Figure 28A:
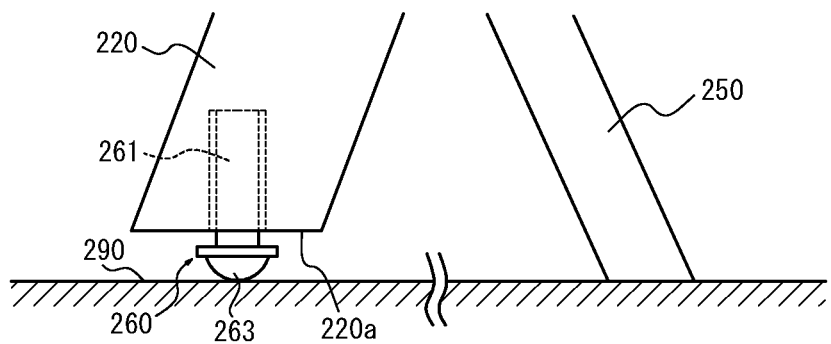
FIG. 28A is a schematic diagram explaining an operation of the piezoelectric vibration unit in the TV of FIG. 21A.
Figure 28B:
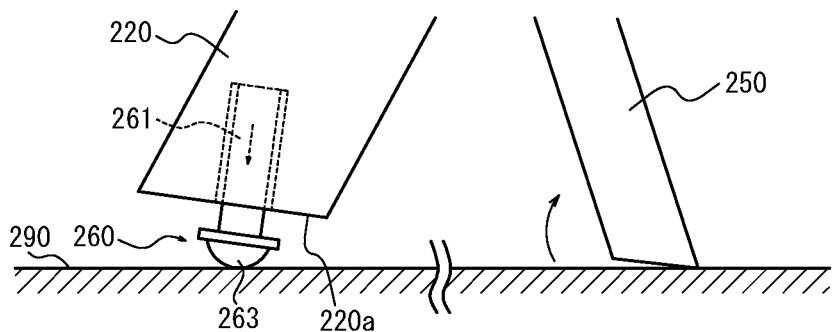
FIG. 28B is a schematic diagram explaining the operation of the piezoelectric vibration unit in the TV of FIG. 21A.
Figure 28C:
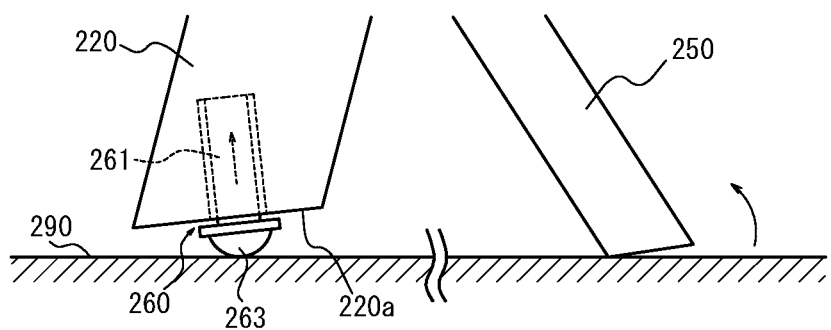
FIG. 28C is a schematic diagram explaining the operation of the piezoelectric vibration unit in the TV of FIG. 21A.

FIGS. 28A, 28B, and 28C are schematic diagrams explaining an operation to generate the sound carried out by the TV 210 according to the present embodiment. When the piezoelectric vibration unit 260 of the TV 210 generates the sound from the placing surface 290, the TV 210, as illustrated in FIG. 28A, is placed with the bottom surface 220a of the housing 220 facing down in such a manner that the cap 263 of the piezoelectric vibration unit 260 and the support member 250 contact the placing surface (the contact surface) 290 of the desk or the like. Thereby, the weight of the TV 210 is applied as the load to the piezoelectric vibration unit 260. In a state illustrated in FIG. 28A, the laminated piezoelectric element 261 has no voltage applied thereto and thus is not extending and contracting.

In this state, when the laminated piezoelectric element 261 of the piezoelectric vibration unit 260 is driven upon the reproduction sound signal, the laminated piezoelectric element 261, as illustrated in FIGS. 28B and 28C, uses the portion of the support member 250 in contact with the placing surface (the contact surface) 290 as the support and vibrates extending and contracting according to the reproduction sound signal, during which the cap 263 stays in contact with the placing surface (the contact surface) 290. A difference between a length of the laminated piezoelectric element 261 at the time of maximum extension and a length thereof at the time of maximum contraction is, for example, 0.05 μm to 50 μm. Thereby, the extending and contracting vibration of the laminated piezoelectric element 261 is delivered to the placing surface 290 via the cap 263, and thus the placing surface 290 vibrates and generates a sound serving as a vibration speaker. When the difference between the length of the laminated piezoelectric element 261 at maximum extend and the length thereof at maximum contraction is smaller than 0.05 μm, the placing surface 290 may possibly not be vibrated appropriately. On the other hand, when the difference is greater than 50 μm, the placing surface 290 vibrates too much, possibly rattling the TV 210.

As described above, the tip of the cap 263, at the time of maximum extension of the laminated piezoelectric element 261, preferably positions between a line (the dotted line I in FIG. 27) connecting the lowermost portion 2501 of the support member 250 and the lowermost portion 2104 of the TV 210, assuming that there is no piezoelectric vibration unit 260. Also, the tip of the cap 263, at the time of maximum contraction of the laminated piezoelectric element 261, preferably positions between the virtual line and the placing surface 290.

Also preferably, the distance d between the bottom surface 220a and the facing surface 263c of the cap 263 illustrated in FIG. 23 is longer than a displacement amount of the laminated piezoelectric element 261 from the non-extending/contracting state thereof with no voltage applied thereto to the maximum contraction state. Thereby, when the laminated piezoelectric element 261 contracts maximum (a state illustrated in FIG. 28C), the bottom surface 220a of the housing 220 and the cap 263 becomes less likely to come into contact with each other. As a result, the cap 263 becomes less likely to come off the piezoelectric element 261.

A position of the piezoelectric element 260 on the bottom surface 220a, a length of the laminated piezoelectric element 261 in the lamination direction, a size of the cap 263 and the like are appropriately determined in a manner satisfying the above conditions.

According to the image display apparatus of the present embodiment, since the piezoelectric element is used as the vibration source and the sound is generated from the placing surface (the contact surface) 290, the image display apparatus may generate the sound with better frequency characteristics than that of the sound generated by the conventional image display apparatus with similar cubic volume and weight that generates the sound from the dynamic speaker alone. Also, since the piezoelectric element enables reproduction of the sound in the low frequency band in which excellent frequency characteristics may be hardly obtained with a small dynamic speaker, there is no need to provide a large dynamic speaker to the image display apparatus, allowing reduction in size and weight of the image display apparatus. Especially when excellent frequency characteristics may be obtained with the piezoelectric element alone, there is no need to provide a speaker, allowing significant reduction in the size and the weight of the image display apparatus. Further, since the image display apparatus of the present embodiment generates the sound from the placing surface (the contact surface) 290, the sound diffusivity is higher than that of the conventional image display apparatus that generates the sound from the dynamic speaker alone. Therefore, the conventional image display apparatus has difficulty in delivering the sound to a user positioned elsewhere than in front of the speaker in comparison to the user positioned in front of the speaker. However, the image display apparatus according to the present embodiment may deliver a homogeneous sound regardless of the position of the user.

Also, the image display apparatus according to the present embodiment employs the laminated piezoelectric element 261 of the stack type as the piezoelectric element, causes the laminated piezoelectric element 261 to vibrate extending and contracting in the lamination direction upon the reproduced sound signal, and delivers the extending and contracting vibration to the placing surface (the contact surface) 290. Therefore, excellent vibration transmission efficiency in the extension contraction direction (a deformation direction) to the placing surface (the contact surface) 290 may be obtained, and the placing surface (the contact surface) 290 may be efficiently vibrated. Further, since the laminated piezoelectric element 261 contacts the placing surface (the contact surface) 290 via the cap 263, the laminated piezoelectric element 261 may be prevented from being damaged. Also, when the TV 210 is in use and the cap 263 of the piezoelectric vibration unit 260 contacts the placing surface (the contact surface) 290, since the weight of the TV 210 is applied as the load to the cap 263, the cap 263 may reliably contacts the placing surface (the contact surface) 290 and efficiently deliver the extending and contracting vibration of the piezoelectric vibration unit 260 to the placing surface (the contact surface) 290.

Also, since the image display apparatus according to the present embodiment may directly deliver the vibration of, mainly, the laminated piezoelectric element to the placing surface (the contact surface), unlike conventional techniques those deliver the vibration of the laminated piezoelectric element to another elastic body, sound generation does not depend on a maximum frequency at which the another elastic body may vibrate. Note that the maximum frequency at which the another elastic body may vibrate is a reciprocal of the shortest time from deformation of the another elastic body caused by the piezoelectric element to a restored state of the another elastic body allowing next deformation thereof. In view of this, the image display apparatus according to the present embodiment preferably has rigidity (flexural strength) to a degree not to be deformed in a curving manner by the deformation of the piezoelectric element.

Seventh Embodiment

FIGS. 29A and 29B are an elevation view and a side view, respectively, those illustrating a schematic structure of an image display apparatus according to a seventh embodiment. The image display apparatus according to the present embodiment is the TV 210 of what is called the stand type. The following is a description of aspects of this TV 210 different from that of the sixth embodiment, omitting aspects the same as those of the TV 210 of the sixth embodiment.

As illustrated in FIG. 29, the housing 220 includes the support member 250 on a rear side thereof via a movable unit 250. An inclination angle of the housing 220 may be adjusted with the movable unit 251. The support member 250 includes a flat plate-like member 252 which contacts the placing surface (the contact surface) 290 and a columnar member 253 for supporting the housing 220. The flat plate-like member 252 may include an elastic member 254 on a bottom surface 252a. The elastic member 254 is made of, for example, rubber, silicone, polyurethanes, or the like.

The TV 210 according to the present embodiment includes a holder portion 300 for accommodating and retaining the piezoelectric vibration unit 260 on the bottom surface 252a of the flat plate-like member 252. The holder portion 300 has a slit 301 with an even width extending substantially perpendicular to the bottom surface 252a and opening to the bottom surface 252a. In order to apply a sufficient load to the piezoelectric vibration unit 260, the piezoelectric vibration unit 260, on the bottom surface 252a, is preferably placed close to a line passing through the center of gravity of the TV 210 and perpendicular to the placing surface 290. For example, the piezoelectric vibration unit 260 is preferably placed on the line passing through the center of gravity of the TV 210 and perpendicular to the placing surface 290.

The elastic member 254, when the flat plate-like member 252 is placed with the bottom surface 252a facing down on the placing surface 290 of the desk or the like that is horizontal, receives the weight of the TV 210 including the movable unit 251 and the support member 250 and is elastically deformed. That is, the elastic member 254 contracts in a direction perpendicular to the placing surface 290 due to the weight of the TV 210. An elastic deformation amount of the elastic member 254 when the laminated piezoelectric element 261 is not extending and contracting having no voltage applied thereto is preferably greater than a displacement amount of the laminated piezoelectric element from the no-extending/contracting state thereof with no voltage applied thereto to the maximum extension state. Thereby, at the time of maximum extension of the laminated piezoelectric element 261, the elastic member 254 is less likely to separate from the placing surface 290, allowing a stable placement of the TV 210 on the placing surface 290.

Eighth Embodiment

Figure 30:
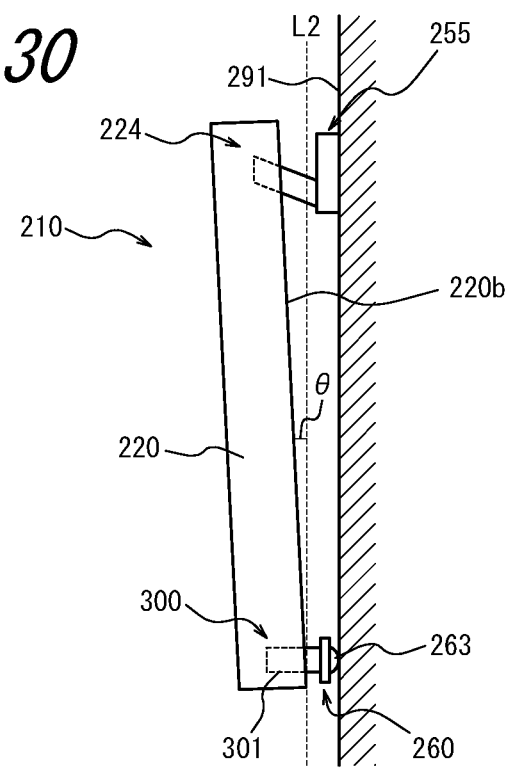
FIG. 30 is a side view illustrating a schematic configuration of an image display apparatus according to an eighth embodiment.

FIG. 30 is a side view illustrating a schematic structure of an image display apparatus according to an eighth embodiment. The image display apparatus according to the present embodiment is a TV 210 of what is called a wall-mount type. The following is a description of aspects of this TV 210 different from that of the sixth embodiment, omitting aspects the same as those of the TV 210 of the sixth embodiment.

The TV 210 illustrated in FIG. 30 includes a groove 224 for hook engagement in an upper area of a rear surface 220b of the housing 220 and, when the groove 224 is hung on a hook 255 attached to a wall surface 291, held on the wall surface 291. The rear surface 220b of the housing 220 also includes the holder portion 300 for accommodating and retaining the piezoelectric vibration unit 260. The holder portion 300 includes the slit 301 with an even width extending along a thickness direction of the TV 210 and opening to the rear surface 220b.

Figure 31:
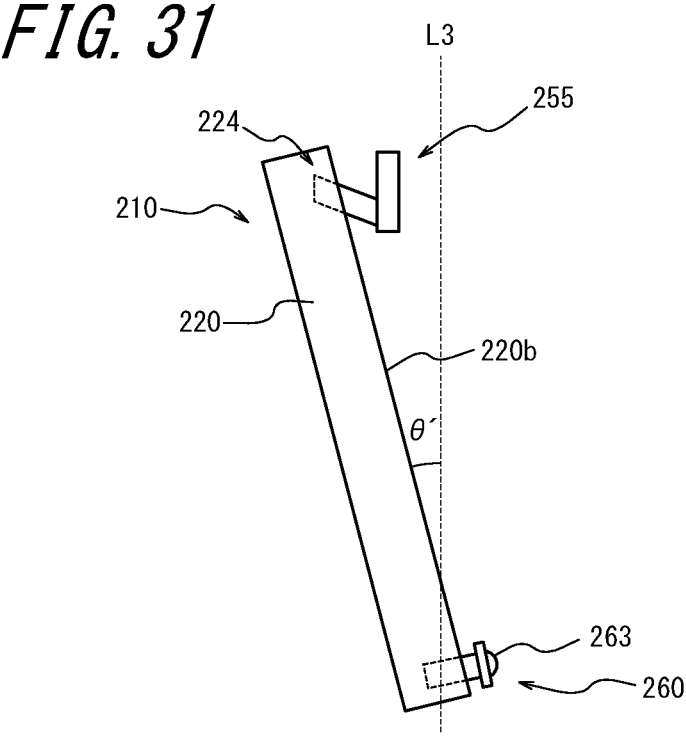
FIG. 31 is a side view of the image display apparatus according to the eighth embodiment when assuming that there is no wall surface.

In order to deliver the vibration of the piezoelectric vibration unit 260 to the wall surface (the contact surface) 291 and generate the sound from the wall surface (the contact surface) 291, the TV 210 needs to apply the load to the piezoelectric vibration unit 260. FIG. 31 is a side view illustrating a state of the TV 210 assuming that there is no wall surface (contact surface) 291. FIG. 31 illustrates a state in which, although the TV 210 is supposed to be held at the groove 224 by the hook 255, there is no wall surface (contact surface) 291 and thus the piezoelectric vibration unit 260 is not supported on the wall surface 291 by the cap 263. In FIG. 31, therefore, the TV 210 is held by the hook 255 alone. An angle between a vertical line L2 and the rear surface 220b of the housing 220 formed when there is the wall surface (contact surface) 291 (as illustrated in FIG. 30) is represented by θ, and an angle between a vertical line L3 and the rear surface 220b of the housing 220 formed when assuming that there is no wall surface (contact surface) 291 (as illustrated in FIG. 31) is represented by θ'. In order to apply the load to the piezoelectric vibration unit 260 when the TV 210 is in use, at least the θ' needs to be greater than the θ. Also, in order to apply a heavier load to the piezoelectric vibration unit 260, the θ' is preferably a wider angle. A position of the piezoelectric element 260 on the rear surface 220b, the length of the laminated piezoelectric element 261 in the lamination direction, the size of the cap 263, the center of gravity of the TV 210, an attaching position and a shape of the hook 255 and the like are appropriately determined in a manner satisfying the above conditions.

Ninth Embodiment

Figure 32A:
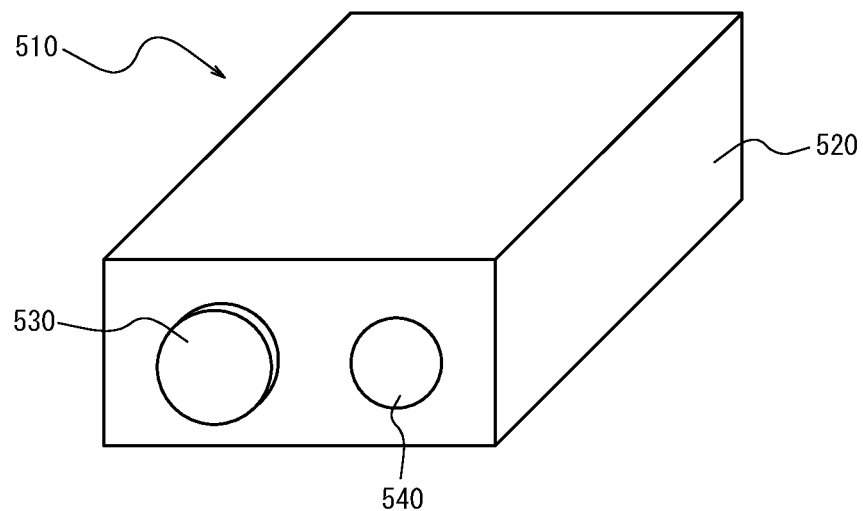
FIG. 32A is an external perspective view illustrating a schematic configuration of an image projection apparatus according to a ninth embodiment.
Figure 32B:
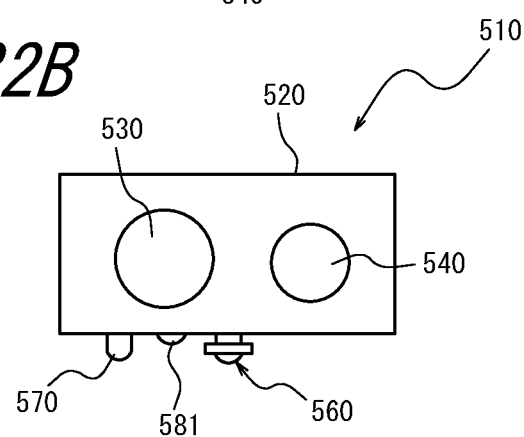
FIG. 32B is an elevation view of the image projection apparatus of FIG. 32A.
Figure 32C:
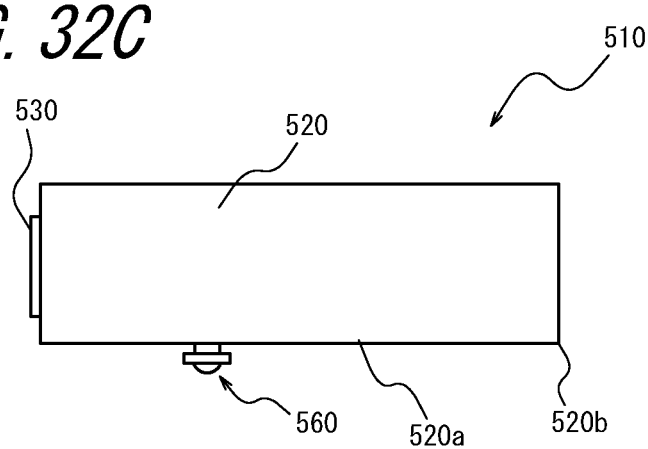
FIG. 32C is a side view of the image projection apparatus of FIG. 32A.

FIGS. 32A, 32B, and 32C are an external perspective view, an elevation view, and a side view, respectively, those illustrating a schematic structure of an image projection apparatus according to a ninth embodiment. The image projection apparatus according to the present embodiment is a projector 510 of what is called a stand type and includes a housing 520, a projection unit 530, a speaker 540, a piezoelectric vibration unit 560, a detection unit 570, and a microphone 581. The projector 510, for use, is placed on a placing surface 590 that is horizontal such as the desk. At this time, the projector 510 is supported by the piezoelectric vibration unit 560 and a rear bottom portion 520b of the housing 520 and applies a load to the piezoelectric vibration unit 560. The projector 510, on a rear surface thereof, includes various signal input terminals such as a USB terminal for connecting to a personal computer, a video terminal for signal input, a VGA (Video Graphic Array) terminal, and the like. The housing 520 has an external shape of substantial rectangular parallelepiped. The projection unit 530 is retained on the housing 520. The desk is an example of the contact object, and the placing surface 590 is an example of the contact surface (the placing surface 590) in contact with the projector 510.

The projection unit 530 is a projection lens for displaying a magnified image of an image display element on a projection plane such as a screen and the like. The speaker 540 is a sound output device such as, for example, the dynamic speaker, the capacitor speaker, and the like.

The detection unit 570 detects whether the piezoelectric vibration unit 560 is in contact with the placing surface 590, that is, a contact state between the placing surface (the contact surface) 590 and the piezoelectric vibration unit 560. The detection unit 570, similarly to the detection unit 90 of the fourth embodiment, is constituted by using the device capable of detecting the contact state between the piezoelectric vibration unit 560 and the placing surface 590 such as, for example, the infrared sensor, the ultrasonic sensor, the proximity sensor, the mechanical switch, the camera, the pressure sensor, or the like. The detection unit 570 may be constituted by using the piezoelectric vibration unit 560 by using an output thereof as the sensor.

The microphone 581, together with a memory unit described later, constitutes a recording unit for recording the frequency characteristics of the sound generated from the contact surface (the placing surface 590) of the desk in contact with the piezoelectric vibration unit 560. The recording unit obtains the sound generated from the contact surface by using the microphone 581 and stores the sound in the memory unit. The memory unit is arranged in the housing 520.

Figure 33:
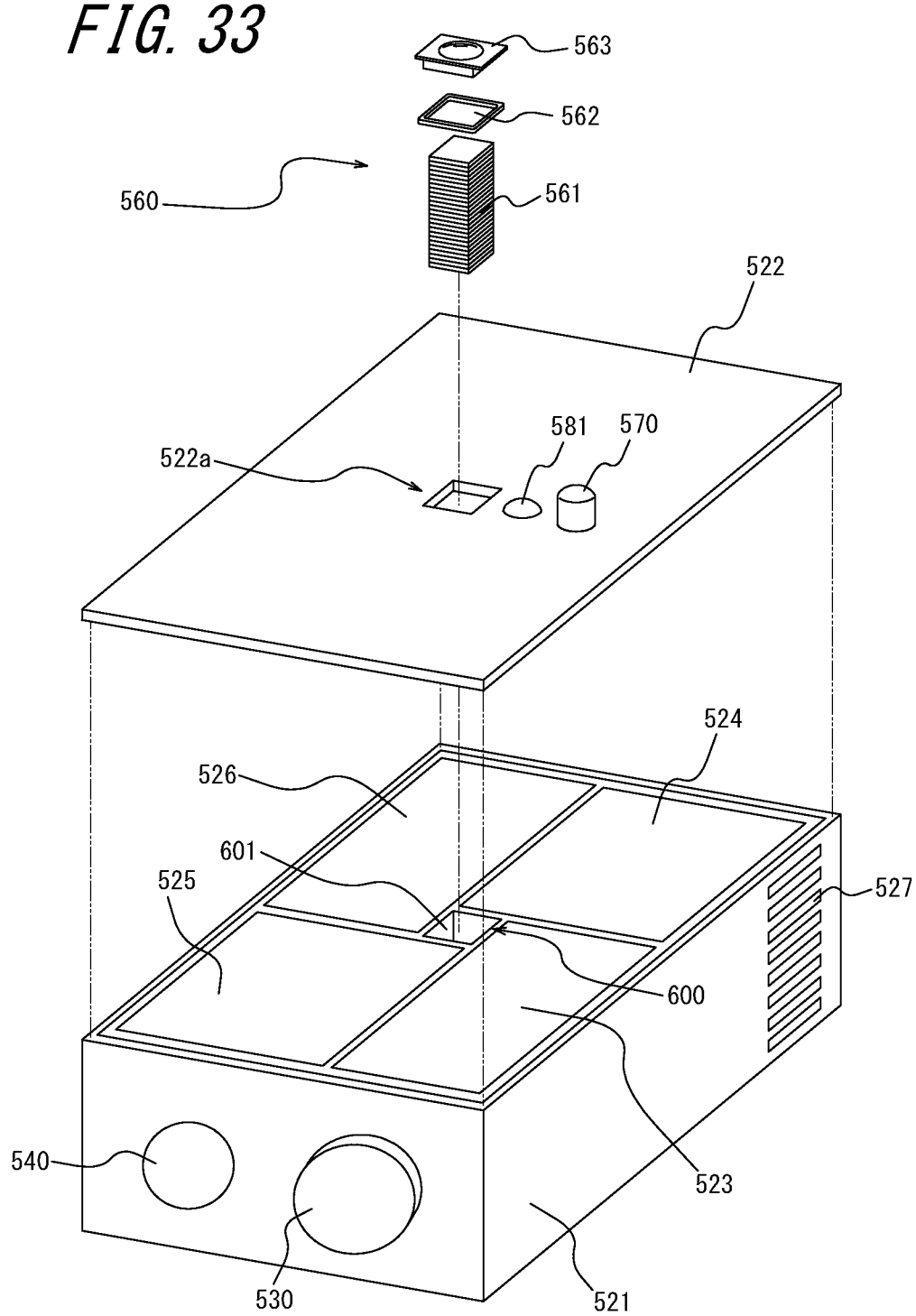
FIG. 33 is a schematic perspective view of a section illustrated in an exploded view of a bottom side of the image projection apparatus of FIG. 32A.

FIG. 33 is a schematic perspective view of a section illustrated in an exploded view of a bottom side of the housing 520 of FIG. 32. The housing 520 includes a body casing 521 and a bottom cover 522. The body casing 521 is an external cover of the projector 510 and contains, for example, an image projection system 523, a cooling mechanism 524, an electronic circuit board 525, a power supply unit 526, and the like. The image projection mechanism 523 includes a light source and the image display element. As the image display element, for example, the liquid crystal is used when the projector 510 is of an LCD (Liquid-Crystal Display) type, or DMD (Digital Micromirror Device) is used when the projector 510 is of a DLP (Digital Light Processing) type. The light source, when driven by the power supply unit 526, emits projection light to the image display element and thus displays an image on the screen through the projection unit 530. The cooling mechanism 524 is, for example, a cooling fan for cooling down the image projection mechanism 523 and exhausts heat from an exhaust vent 527. The electronic circuit board 525 controls each mechanism of the projector 510. The projector 510 according to the present embodiment, on the bottom side of the housing 520, includes a holder portion 600 for accommodating and retaining the piezoelectric vibration unit 560. The piezoelectric vibration unit 560 is arranged at a portion of the housing opposite to the placing surface (the contact surface) 590. The holder portion 600 has a slit 601 with an even width extending in a direction substantially perpendicular to the bottom cover 522 of the projector 510 and opening to the bottom cover of the housing 520. Also, the bottom cover 522 includes a hole 522a that allows the piezoelectric vibration unit 560 to contact the placing surface (contact surface) 590.

The piezoelectric vibration unit 560 includes a piezoelectric element 561, an O-ring 562, and a cap 563 that serves as the insulating cover member, and has a structure similar to the piezoelectric vibration unit 60 described in the first embodiment. In the present embodiment also, the piezoelectric element 561 is constituted by using the laminated piezoelectric element of the stack type.

Figure 34:
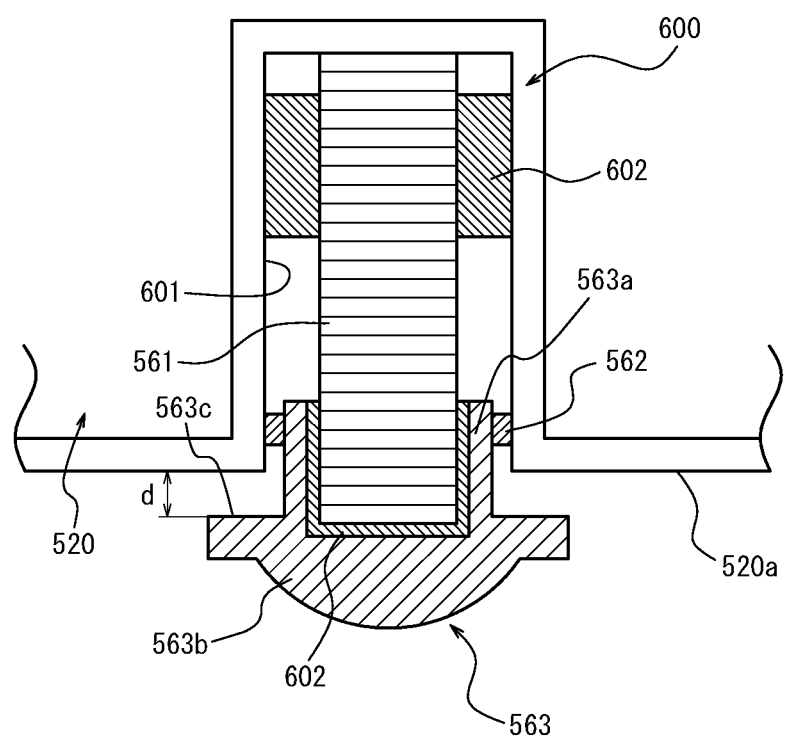
FIG. 34 is a partially enlarged cross-sectional view of a piezoelectric vibration unit of FIG. 32B.

The laminated piezoelectric element 561, as illustrated in a partial enlarged cross-sectional view of FIG. 34, includes one lateral end portion having the first lead connection unit and the second lead connection unit described in the first embodiment fixed to the slit 601 of the support portion 600 of the housing 520 via adhesive 602 (for example, the epoxy resin). The other end portion of the laminated piezoelectric element 561 is capped with a cap 563 and fixed by the adhesive 602.

The cap 563 includes an entry portion 563a and a protrusion portion 563b. When the cap 563 is attached to the laminated piezoelectric element 561, the entry portion 563a is positioned inside the slit 601, and the protrusion portion 563b protrudes from the housing 520. The O-ring 562 is provided to a circumference of the entry portion 563a positioned inside the slit 601. When the piezoelectric vibration unit 560 is attached to the holder portion 600 and the bottom cover 522 is attached to the housing 520, the protrusion portion 563b of the cap 563 protrudes from the bottom surface 520a. The protrusion portion 563b of the cap 563 has a facing surface 563c opposite to a bottom surface 520a of the housing 520. As illustrated in FIG. 34, when the laminated piezoelectric element 561 has no voltage applied thereto and thus is not extending and contracting, the facing surface 563c is spaced apart from the bottom surface 520a by the distance d.

Figure 35:
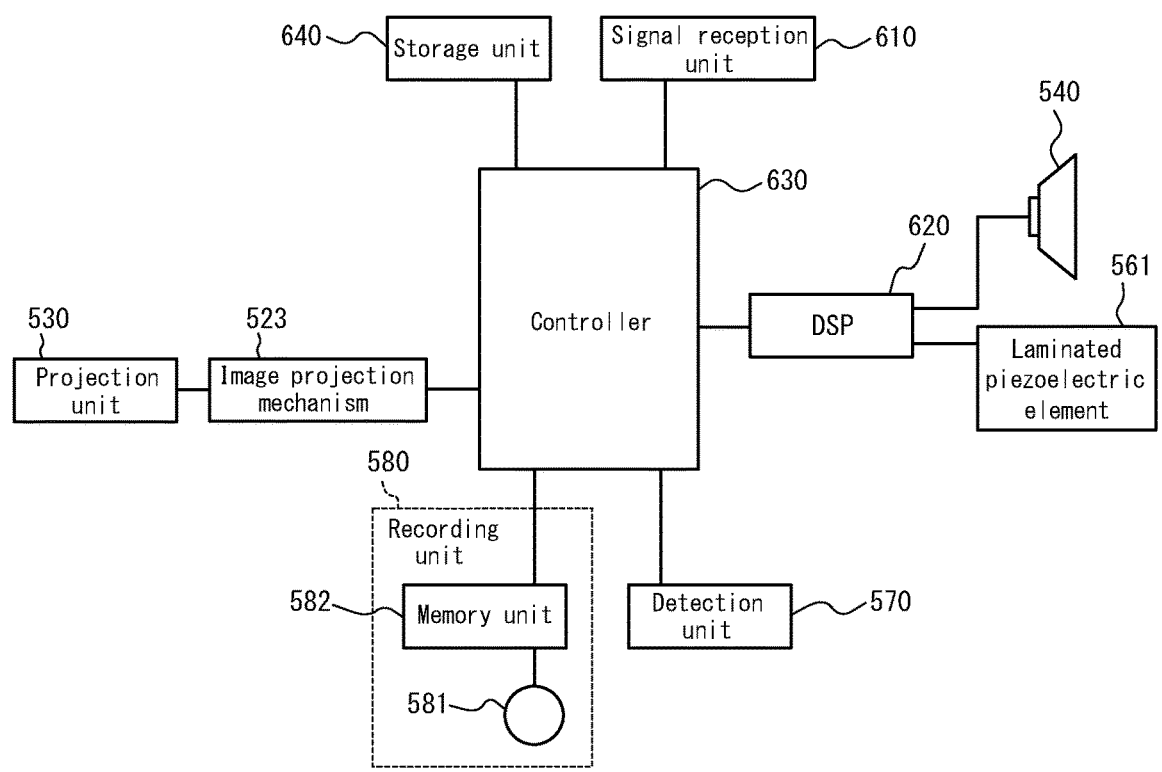
FIG. 35 is a functional block diagram of a section of the image projection apparatus of FIG. 32A.

FIG. 35 is a functional block diagram of a section of the projector 510 according to the present embodiment. The projector includes, in addition to the image projection mechanism 523, the projection unit 530, the speaker 540, the detection unit 570, the recording unit 580, and the laminated piezoelectric element 561 those described above, a signal input unit 610, a DSP 620, a controller 630, and a storage unit 640. The image projection mechanism 523, the detection unit 570, the signal input unit 610, and the storage unit 640 are connected to the controller 630. The storage unit 580 includes the microphone 581 and the memory unit 582 as described above. The memory unit 582 is connected to the controller 630. The projection unit 530 is connected to the controller 630 via the image projection mechanism 523. The speaker 540 and the laminated piezoelectric element 561 are connected to the controller 630 via the DSP 620. The DSP 620 may be built in the controller 630. The memory unit 582 and the storage unit 640 may be constituted by using one memory.

The signal input unit 610 has a known structure and, from various signal input terminals, inputs a signal such as the video signal and the sound signal to be viewed by using the projector 510. The controller 630 is a processor for controlling overall operations of the projector 510. The controller 630 is structured as one control unit in this embodiment but not limited to such a structure. For example, the controller 630 may be constituted by using a plurality of controllers for serving different functions. The controller 630, via the DSP 620, applies the sound signals to the laminated piezoelectric element 661 and the speaker 640. The sound signal may be based on the music data stored in the internal memory or included in the input signal.

The controller 630, based on the contact state between the piezoelectric vibration unit 560 and the placing surface 590 detected by the detection unit 570, controls the sound signals to be applied to the laminated piezoelectric element 561 and the speaker 540. For example, when the detection unit 570 detects that the piezoelectric vibration unit 560 and the placing surface 590 are in contact with each other, the controller 630 applies the sound signals to the laminated piezoelectric element 561 and the speaker 540. In this case, the piezoelectric vibration unit 560 and the speaker 540 are driven at the same time. On the other hand, when the detection unit 570 detects that the piezoelectric vibration unit 560 and the placing surface 590 are not in contact with each other, the controller 630 applies the sound signal to the speaker 540 alone without applying the sound signal to the laminated piezoelectric element 561.

Figure 36:
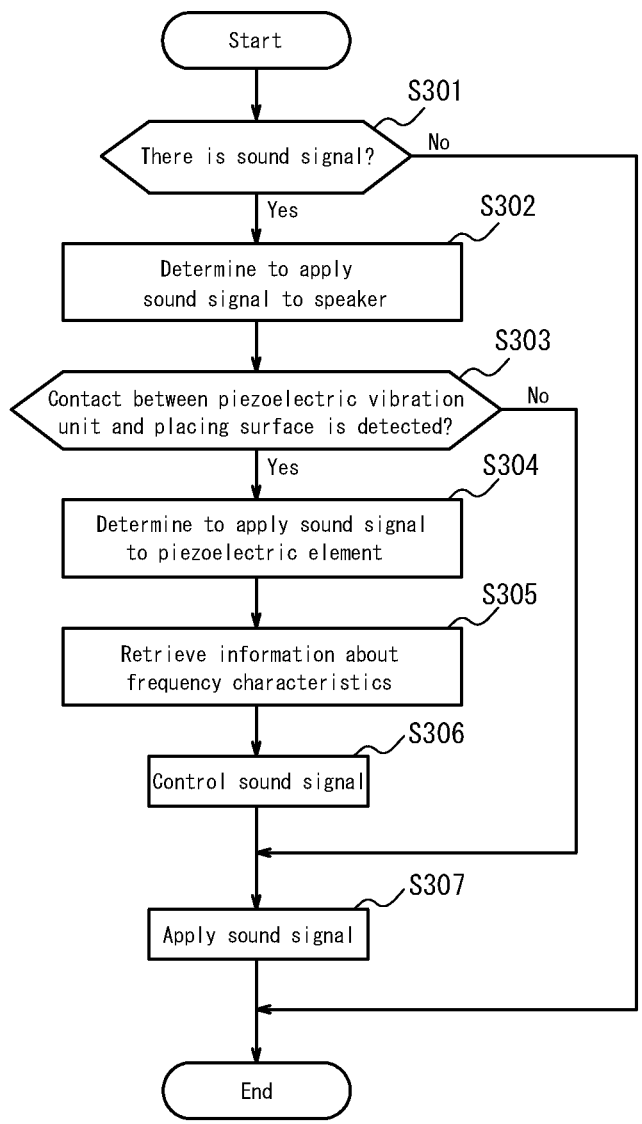
FIG. 36 is a flowchart illustrating an operation of a controller of FIG. 35.

FIG. 36 is a flowchart illustrating an operation of the controller 630 for applying the sound signals to the laminated piezoelectric element 561 and the speaker 540. First, the controller 630 checks whether there is the sound signal to be applied (step S301). When there is no sound signal to be applied (No at step S301), the controller 630 ends the flow without applying the sound signal to the laminated piezoelectric element 561 and the speaker 540. When there is the sound signal to be applied (Yes at step S301), the controller 630 determines to apply the sound signal to the speaker 540 (step S302). Next, the controller 630 checks whether the detection unit 570 is detecting the contact between the piezoelectric vibration unit 560 and the placing surface 590 (step S303). When the detection unit 570 is not detecting the contact between the piezoelectric vibration unit 560 and the placing surface 590 (No at step S303), the controller 630 applies the sound signal to the speaker 540 alone without applying the sound signal to the laminated piezoelectric element 561 (step S307). In this case, the sound is generated not from the placing surface 590 but from the speaker 540.

On the other hand, when the detection unit 570 is detecting the contact between the piezoelectric vibration unit 560 and the placing surface 590 (Yes at step S303), the controller 630 determines to apply the sound signal to the laminated piezoelectric element 561 (step S304). Then, the controller 630 retrieves information about the frequency characteristics of the sound (step S305). The information about the frequency characteristics of the sound is, for example, information about the frequency characteristics of the sound generated from the speaker 540 stored in the storage unit 640. The controller 630, based on the information thus retrieved, controls the sound signal applied to, for example, the laminated piezoelectric element 561 (step S306) and applies the sound signals to the laminated piezoelectric element 561 and the speaker 540 (step S307). The control of the sound signal carried out by the controller 630 at step S306 will be described in detail later. In this way, the sound is generated from both the placing surface 590 and the speaker 540. The controller 630, while the projector 510 is on, repeats the series of operations in FIG. 36 and thereby, based on the contact state between the piezoelectric vibration unit 560 and the placing surface 590, controls the sound signals to be applied to the speaker 540 and the laminated piezoelectric element 561.

Figure 37A:
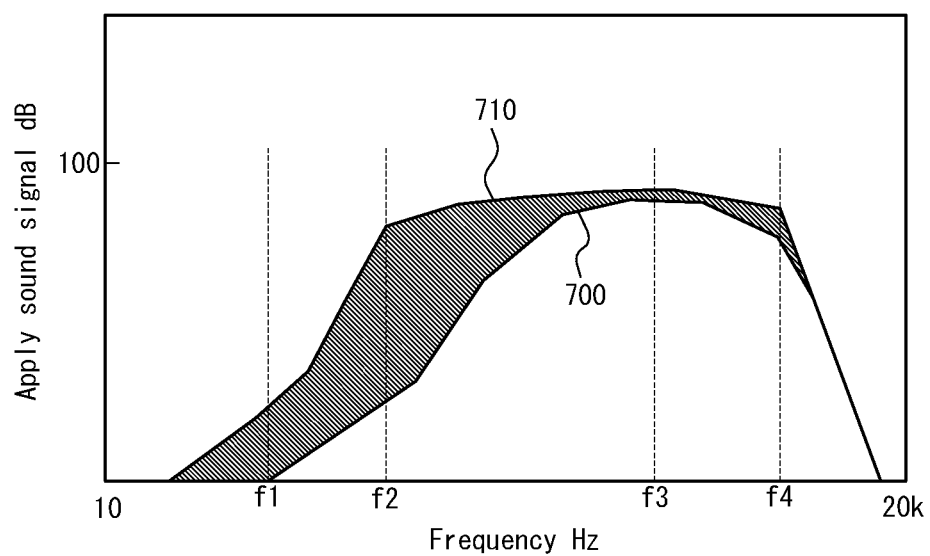
FIG. 37A is an explanatory view of an example of sound signal control according to a ninth embodiment.

Next, the control of the sound signal carried out by the controller 630 at step S306 will be described. The controller 630 controls the sound signal based on the information about the frequency characteristics of the speaker 540 retrieved from the storage unit 640. A region 700 in FIG. 37A represents an example of the frequency characteristics of the speaker 540 stored in the storage unit 640. As can be seen in FIG. 37A, similarly to the typical tendency of the conventional dynamic speaker, the speaker 540 has the frequency characteristics in which the sound pressure is low in the low frequency band. Therefore, when the sound is generated by using the speaker 540 alone, it is difficult for the user viewing the image projected by the projector 510 to hear the low-pitched sound. Especially in a frequency band at the frequency f1 or lower, the sound pressure is 0, and the speaker 240 is unable to generate the sound at the frequency f1 or lower. Also, the speaker 540 has the frequency characteristics that form the convex curve with the apex around the frequency f3 (>f1). That is, when the speaker 540 alone generates the sound, the generated sound around the frequency f3 is loud and, as the frequency becomes higher or lower than the frequency f3, the volume of the generated sound becomes smaller.

The controller 630, at step S306, controls the sound signal to be applied to the piezoelectric element 561 in a manner compensating for the lack of the sound pressure of the frequency characteristic of the speaker 540. The compensation for the lack of the sound pressure of the frequency characteristics includes, for example: increasing the sound pressure in a frequency band with a low sound pressure such that the sound in the frequency band is easily heard; increasing the sound pressure in the entire frequency band so as to increase the entire volume; and increasing the sound pressure in a specific frequency band so as to emphasize the sound in the specific frequency band. The controller 630, for example, by compensating for the lack of the sound pressure so as to exhibit the frequency characteristics similar to the region 710 in FIG. 37A, controls the sound signal to be applied to the piezoelectric element 561. The controller 630 applies the sound signal thus controlled to the piezoelectric element 561 at step S307. The control of the sound signal in this manner increases the sound pressure in the low frequency band. Also, in the frequency band from the frequency f2 (f1<f2<f3) to the frequency f4 (>f3), the sound pressure becomes substantially even, reducing a difference in sound intensity of each frequency generated from the projector 510.

The controller 630, at step S305, may retrieve the information about the frequency characteristics of the sound generated from the contact surface recorded by the recording unit 580 and, at step S306, control the sound signal to be applied to the speaker 540 based on the information thus retrieved. In this case, after the projector 510 is placed on the placing surface 590 and prior to actual use thereof, the controller 630 applies the pure tone sweep signal at an even level as the sound signal to the piezoelectric element 561 and vibrates the piezoelectric element 561, thereby generating the sound from the contact surface. The frequency characteristics of the generated sound is acquired by the microphone 581 of the recording unit 580 and recorded in the memory unit 582. Then, during actual use, the controller 630 retrieves the information about the frequency characteristics recorded and controls the sound signal to be applied to the speaker 540 based on this information.

Figure 37B:
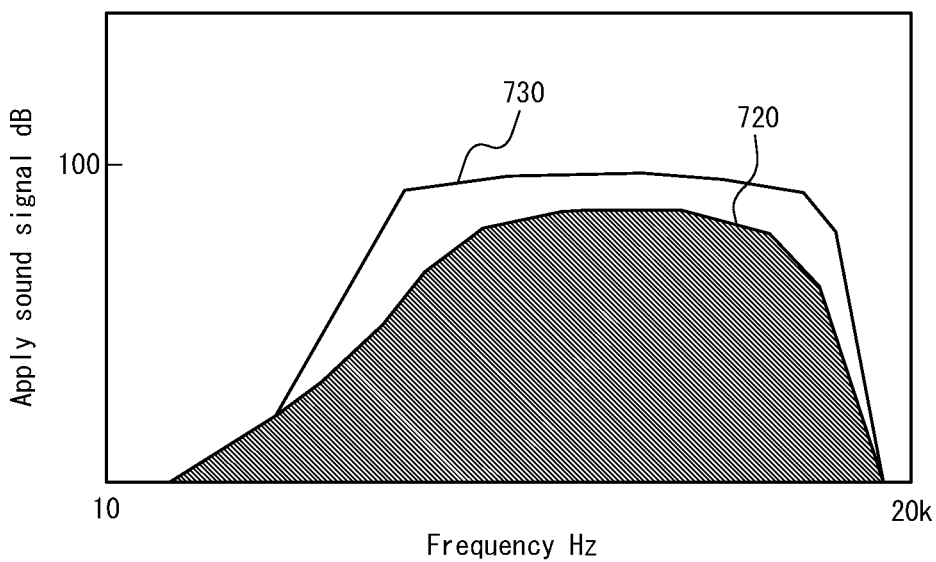
FIG. 37B is an explanatory view of another example of the sound signal control according to the ninth embodiment.

A range 720 in FIG. 37B represents an example of the frequency characteristics of the sound generated from the contact surface recorded by the recording unit 580. Based on the recorded frequency characteristics, the controller 630 controls the sound signal to be applied to the speaker 540 by, for example, compensating for the lack of the sound pressure, so as to be able to obtain the frequency characteristics represented by a range 730 in FIG. 37B. The controller 630 applies the sound signal thus controlled to the speaker 540 at step S307. The controller 330, in order to obtain a sound pressure of desired frequency characteristics, may control both the sound signal to be applied to the piezoelectric element 561 and the sound signal to be applied to the speaker 540.

The DSP 620, on the digital signal from the controller 630, carries out necessary signal processing such as the equalizing processing, the D/A conversion processing, the boosting processing, the filtering process and the like, and applies a necessary sound signal to the speaker 540 and the piezoelectric element 561.

A maximum voltage of a reproduced sound signal applied to the laminated piezoelectric element 561 may be, for example, in the range of 10 Vpp to 50 Vpp but not limited thereto. The maximum voltage of the reproduced sound signal may be appropriately adjusted according to the weight of the projector 510 and functions of the speaker 540 and the laminated piezoelectric element 561. The sound signal applied to the laminated piezoelectric element 561 may have the biased DC voltage having the maximum voltage set therearound.

The filtering process for the sound signal applied to the laminated piezoelectric element 561 carried out by the DSP 620 is set to have the frequency characteristics to attenuate or cut at least a portion of the frequency component of approximately 10 kHz to 50 kHz or higher, or frequency characteristics to increase the attenuation ratio gradually or in stages. For example, the laminated piezoelectric element 561 has the frequency characteristics having the cut-off frequency at approximately 20 kHz similarly to FIG. 8. Attenuation or cutting the high frequency component in this manner allows reduction in power consumption as well as suppression of heat generation by the laminated piezoelectric element 561.

Figure 38:
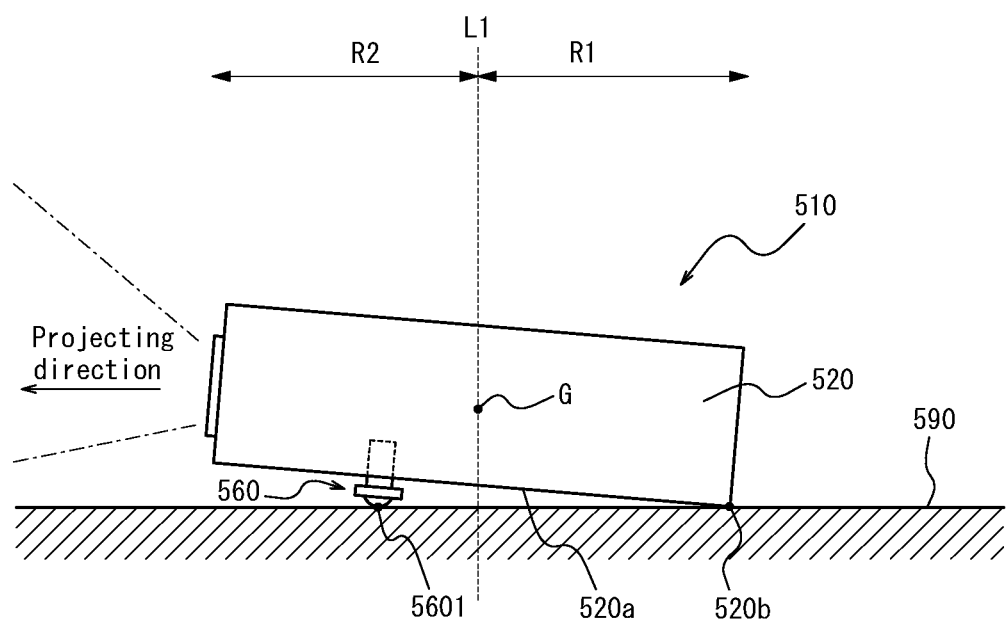
FIG. 38 is a diagram illustrating an arrangement of a piezoelectric vibration unit in the image projection apparatus of FIG. 32A.

Next, with reference to FIG. 38, the arrangement of the piezoelectric vibration unit 560 will be described. FIG. 38 illustrates a state in which the projector 510 is in use and placed on the placing surface 590 of the desk or the like that is horizontal. As illustrated in FIG. 38, the projector 510 is supported on the placing surface 590 by the piezoelectric vibration unit 560 and the rear bottom portion 520b of the housing 520. A point G represents the center of gravity of the projector 510. In FIG. 38, the piezoelectric vibration unit 560 includes a lowermost portion 5601. The lowermost portion 5601 is a portion of the piezoelectric vibration unit 560 that contacts the placing surface 590 when the housing 520 is placed with the bottom surface 520a facing down on the placing surface 590 of the desk or the like that is horizontal. The lowermost portion 5601 is, for example, a tip of the cap 563.

In FIG. 38, the dotted line L1 is a line (a virtual line) that is passing through the center of gravity G of the projector 510 and perpendicular to the placing surface 590 when the projector 510 is placed with the bottom surface 520a facing down on the placing surface 590 of the desk or the like that is horizontal. A region R1 is a rear region of the projector 510 when the dotted line L1 separates the projector 510. A region R2 is a front region of the projector 510. A rear bottom portion 520b, within the region R1, contacts the placing surface 590. The piezoelectric vibration unit 560 is provided on the bottom surface 520a in the region R2.

Preferably, the piezoelectric vibration unit 560 is provided at a position within a predetermined distance from the dotted line L1 on the bottom surface 520a in the region R2. More preferably, the piezoelectric vibration unit 560 is provided as close to the dotted line L1 as possible. Preferably, the predetermined distance is a distance (a first distance) where the sound pressure decreases by 5% or less in comparison to the sound pressure of the sound generated from the placing surface (the contact surface) 590 when the piezoelectric vibration unit 560 is positioned on the dotted line L1. Thereby, the load applied to the piezoelectric vibration unit 560 becomes greater than that when the piezoelectric vibration unit 560 is provided at a position remote from the dotted line L1 on the bottom surface 520a in the region R2. The predetermined distance may be a distance (a second distance) where the sound pressure decreases by 10% or less when the sound pressure is high, or a distance (a third distance) where the sound pressure decreases by 20% or less when the sound pressure is sufficiently high.

Preferably, the rear bottom portion 520b is positioned as remote from the dotted line L as possible in the region R1. That is, the gravity G preferably positions more forwardly in the projector 10. In this way, when the piezoelectric vibration unit 560 is positioned as close to the dotted line L1 as possible, a sufficient distance may be ensured between the rear bottom portion 520b and the piezoelectric vibration unit 560. Accordingly, the projector 510 may be stably placed on the placing surface 590, allowing the display of the projected image in a more stable manner.

Figure 39A:
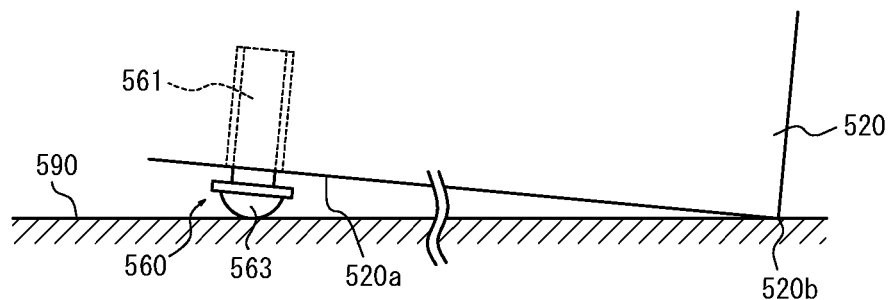
FIG. 39A is a schematic diagram explaining an operation of the piezoelectric vibration unit in the image projection apparatus of FIG. 38.
Figure 39B:
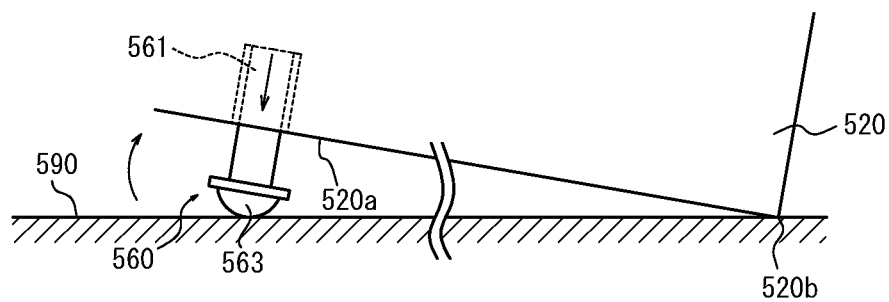
FIG. 39B is a schematic diagram explaining the operation of the piezoelectric vibration unit in the image projection apparatus of FIG. 38.
Figure 39C:
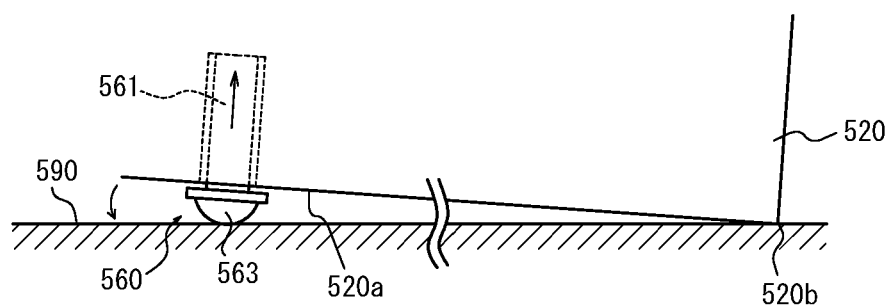
FIG. 39C is a schematic diagram explaining the operation of the piezoelectric vibration unit in the image projection apparatus of FIG. 38.

FIGS. 39A, 39B, and 39C are schematic diagrams for explaining an operation of the projector 510 to generate the sound. In order for the piezoelectric vibration unit 560 of the projector 510 to cause the placing surface 590 to generate the sound, the projector 510, as illustrated in FIG. 39A, is placed in such a manner that the bottom surface 520a of the housing 520 faces down and the cap 563 of the piezoelectric vibration unit 560 and the rear bottom portion 520b contact the placing surface (the contact surface) 590 of the desk or the like. Thereby, the weight of the projector is applied as the load to the piezoelectric vibration unit 560. In a state illustrated in FIG. 39A, the laminated piezoelectric element 561 has no voltage applied thereto and thus is not extending and contracting.

In this state, when the laminated piezoelectric element 561 of the piezoelectric vibration unit 560 is driven upon the reproduction sound signal, the laminated piezoelectric element 561, as illustrated in FIGS. 39B and 39C, by using the rear bottom portion 520b as the support, vibrates extending and contracting according to the reproduction sound signal, during which the cap 563 stays in contact with the placing surface (the contact surface) 590. A difference between a length of the laminated piezoelectric element 561 at the time of maximum extension and a length thereof at the time of maximum contraction is, for example, 0.05 μm to 50 μm. Thereby, the extending and contracting vibration of the laminated piezoelectric element 561 is delivered to the placing surface 590 via the cap 563, and the placing surface 590 vibrates and generates a sound serving as the vibration speaker. When the difference between the length of the laminated piezoelectric element 561 at the time of maximum extension and the length thereof at the time of maximum contraction is smaller than 0.05 μm, the placing surface 590 may possibly not be vibrated appropriately. On the other hand, when the difference is greater than 50 μm, the placing surface 590 vibrates too much, possibly rattling the projector 510.

The distance d between the bottom surface 520a and the facing surface 563c of the cap 563 illustrated in FIG. 34 is preferably longer than a displacement amount of the laminated piezoelectric element 561 from the no-extending/contracting state thereof to the maximum contraction state. Thereby, at the time of maximum contraction of the laminated piezoelectric element 561 (a state illustrated in FIG. 39C), the bottom surface 520a of the housing 520 and the cap 563 are less likely to contact each other. As a result, the cap 563 is less likely to come off the piezoelectric element 561.

A position of the piezoelectric element 560 on the bottom surface 520a, a length of the laminated piezoelectric element 561 in the lamination direction, a size of the cap 563 and the like are appropriately determined in a manner satisfying the above conditions.

According to the image projection apparatus of the present embodiment, since the piezoelectric element is used as the vibration source and the sound is generated from the placing surface (the contact surface) 590, the image projection apparatus may generate the sound with better frequency characteristics than that of the sound generated by the conventional image projection apparatus with similar cubic volume and weight that generates the sound from the dynamic speaker alone. Also, since the piezoelectric element enables reproduction of the sound in the low frequency band in which excellent frequency characteristics may be hardly obtained with a small dynamic speaker, there is no need to provide a large dynamic speaker to the image projection apparatus, allowing the reduction in size and weight of the image projection apparatus. Especially when excellent frequency characteristics may be obtained with the piezoelectric element alone, there is no need to provide a speaker. Therefore, the image projection apparatus may be significantly small and thin. Further, since the image projection apparatus of the present embodiment generates the sound from the placing surface (the contact surface) 590, the sound diffusivity becomes higher than the conventional image projection apparatus that generates the sound from the dynamic speaker alone. Therefore, the conventional image projection apparatus has difficulty in delivering the sound to a user positioned elsewhere than in front of the speaker in comparison to the user positioned in front of the speaker. However, the image projection apparatus according to the present embodiment may generate a homogeneous sound regardless of the position of the user.

Also, the image projection apparatus according to the present embodiment uses the laminated piezoelectric element 561 of the stack type as the piezoelectric element, causes the laminated piezoelectric element 561 to vibrate extending and contracting in the lamination direction upon the reproduction sound signal, and delivers the extending and contracting vibration to the placing surface (the contact surface) 590. Therefore, excellent vibration transmission efficiency in the extending and contraction direction (the deformation direction) to the placing surface (the contact surface) 590 may be obtained, and the placing surface (the contact surface) 290 may be efficiently vibrated. Further, since the laminated piezoelectric element 261 contacts the placing surface (the contact surface) 290 via the cap 563, the laminated piezoelectric element 561 may be prevented from being damaged. Also, in use of the projector 510, when the cap 563 of the piezoelectric vibration unit 560 contacts the placing surface (the contact surface) 590, since the weight of the projector 510 is applied as the load to the cap 563, the cap 563 may reliably contacts the placing surface (the contact surface) 590, whereby the extending and contracting vibration of the piezoelectric vibration unit 560 may be efficiently delivered to the placing surface (the contact surface) 590.

Also, since the image projection apparatus according to the present embodiment may directly deliver the vibration of, mainly, the laminated piezoelectric element to the placing surface (the contact surface), unlike the conventional techniques those deliver the vibration of the laminated piezoelectric element to another elastic body, sound generation does not need to depend on a maximum frequency at which the another elastic body may vibrate. Note that the maximum frequency at which the another elastic body may vibrate is the reciprocal of the shortest time from deformation of the another elastic body caused by the piezoelectric element the restored state of the another elastic body allowing next deformation thereof. In view of this, the image projection apparatus according to the present embodiment preferably has rigidity (flexural strength) to a degree not to be deformed in a curving manner by the deformation of the piezoelectric element.

Tenth Embodiment

Figure 40A:
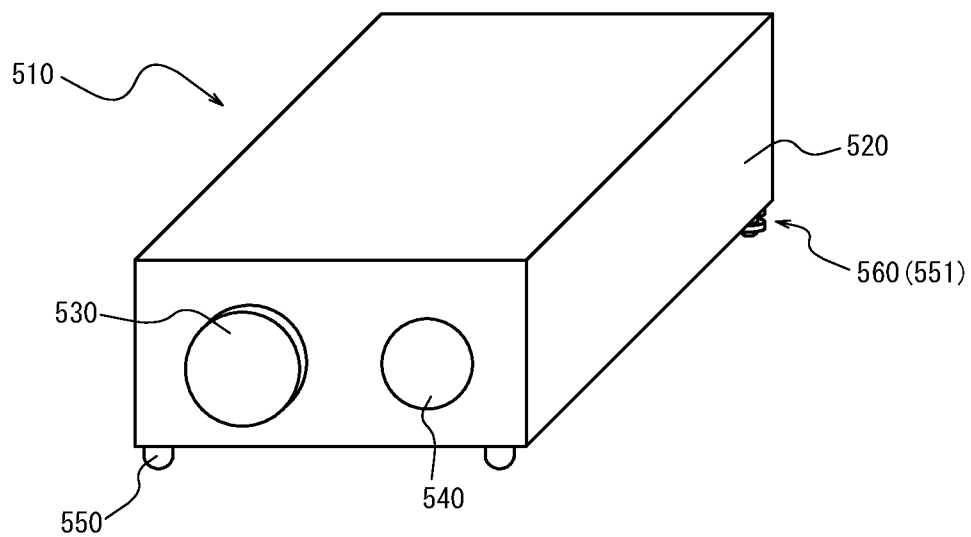
FIG. 40A is an external perspective view illustrating an image projection apparatus according to a tenth embodiment.
Figure 40B:
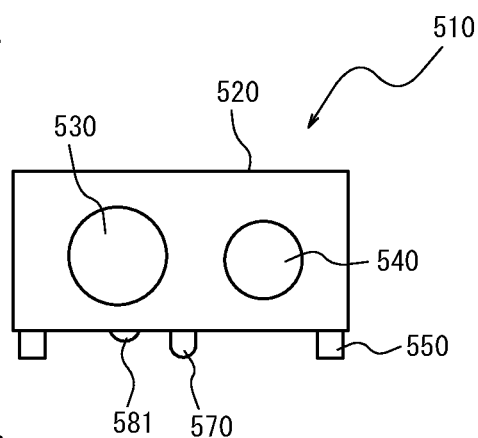
FIG. 40B is an elevation view of the image projection apparatus of FIG. 40A.
Figure 40C:
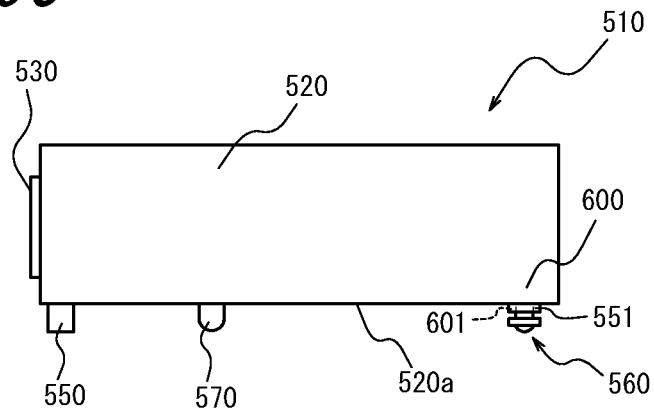
FIG. 40C is a side view of the image projection apparatus of FIG. 40A.

FIGS. 40A, 40B, and 40C are an external perspective view, an elevation view, and a side view, respectively, those illustrating a schematic structure of an image projection apparatus according to a tenth embodiment. The image projection apparatus according to the present embodiment is a projector 510 of what is called the stand type similar to the ninth embodiment. The following is a description of aspects of this projector 510 different from that of the ninth embodiment, omitting aspects the same as those of the projector 510 of the ninth embodiment.

As illustrated in FIG. 40, the housing 520 includes two front support portions 550 on a front side having the projection plane positioned thereon, and two rear support portions 551 on a rear side opposite to the front side. The front support portions 550 and the rear support portions 551 contact the placing surface 590 and support the housing 520. An inclination angle of the housing 520 is adjustable by adjusting a height of the front supports 550. The front support portion 550 and the rear support portion 551 may be provided with an elastic member on bottoms thereof. The elastic member is made of, for example, rubber, silicone, polyurethanes, or the like. Although in the present embodiment there are two front support portions 550 and two rear support portions 551, the numbers of the front support portions and rear support portions are not limited thereto; there may be one front support portion 550 and two rear support portions 551, or two front support portions 550 and one rear support portion 551.

The projector 510 according to the present embodiment, on the bottom of the rear support portion 551, includes the holder portion 600 for accommodating and retaining the piezoelectric vibration unit 560. The piezoelectric vibration unit 560 may be provided to either one of, or both of, the two rear support portions 551. The holder portion 600 has a slit 601 with an even width extending along a direction substantially perpendicular to the bottom surface and opening to the bottom surface.

The elastic member, when the projector 510 is placed with the bottom surface 520a facing down on the placing surface 590 of the desk or the like that is horizontal, receives the weight of the projector 510 as the load and is elastically deformed. That is, the elastic member contracts in a direction perpendicular to the placing surface 590 due to the weight of the projector 510. An elastic deformation amount of the elastic member, when the laminated piezoelectric element 561 has no voltage applied thereto and thus is not extending and contracting, is preferably greater than the displacement amount of the laminated piezoelectric element 561 from the no-extending/contracting state thereof with no voltage applied thereto to the maximum extension state. Thereby, at the time of maximum extension of the laminated piezoelectric element 561, the elastic member is less likely to separate from the placing surface 590, allowing a stable placement of the projector 510 on the placing surface 590.

Figure 41:
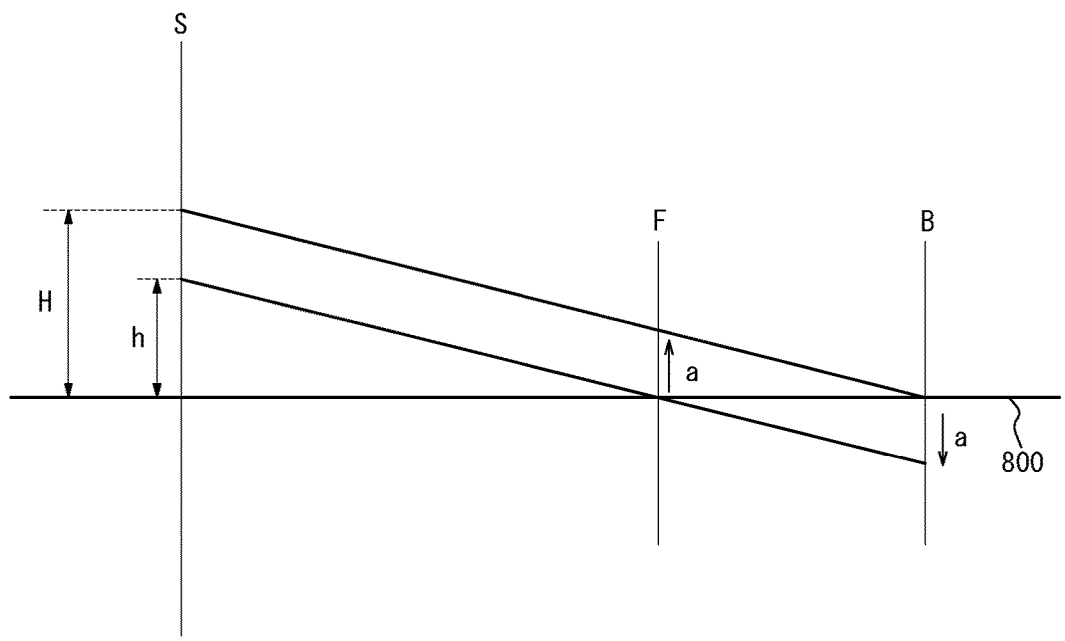
FIG. 41 is a diagram illustrating a comparison of the blurring of a projected image of the image projection apparatus according to the tenth embodiment.

According to the present embodiment, the piezoelectric vibration unit 560 may be arranged on the bottom of the front support portion 550 but is preferably arranged at the rear support portion 551 in order to suppress the blurring of the projected image. Here, the reason why arranging the piezoelectric vibration unit 60 at the rear support portion 551 rather than at the front support portion 550 reduces the blurring of the projected image will be described with reference to FIG. 41. In FIG. 41, S represents a position of the projection plane on which the image is displayed, F represents the position of the front support portion 550, and B represents the position of the rear support portion 551. The position F is located between the position S and the position B. Vibration amplitude of the projector 510 caused by the vibration of the piezoelectric vibration unit 560 is represented by a. In FIG. 41, in order to show the blurring of the projected image in the same direction, a direction of the vibration caused when the piezoelectric vibration unit 560 is positioned at the front support portion 550 and a direction of the vibration caused when the piezoelectric vibration unit 560 is positioned at the rear support portion 551 are indicated opposite to each other. That is, FIG. 41 illustrates, with respect to a reference position 800 when the piezoelectric vibration unit 560 is not vibrating, upward displacement of the front support portion 550 by the amplitude a from the reference position 800 due to extension of the piezoelectric element 561 and downward displacement of the rear support portion 551 by the amplitude a from the reference position 800 due to the contraction of the piezoelectric element 561. When the piezoelectric vibration unit 560 is positioned at the front support portion 550, the projected image is upwardly displaced by a height H by using the rear support portion 551 as the support. On the other hand, when the piezoelectric vibration unit 560 is positioned at the rear support portion 551, the projected image is upwardly displaced by a height h by using the front support portion 550 as the support. As is apparent from FIG. 41, with the same amplitude a of these support portions, the displacement H of the projected image caused when the piezoelectric vibration unit 560 is positioned at the front support portion 550 is greater than the displacement h caused when the piezoelectric vibration unit 560 is positioned at the rear support portion 551. Therefore, the piezoelectric vibration unit 560 is preferably positioned at the rear support portion 551 rather than at the front support portion 550, thereby the projected image less blurs and the image is easy to see.

Eleventh Embodiment

Figure 42:
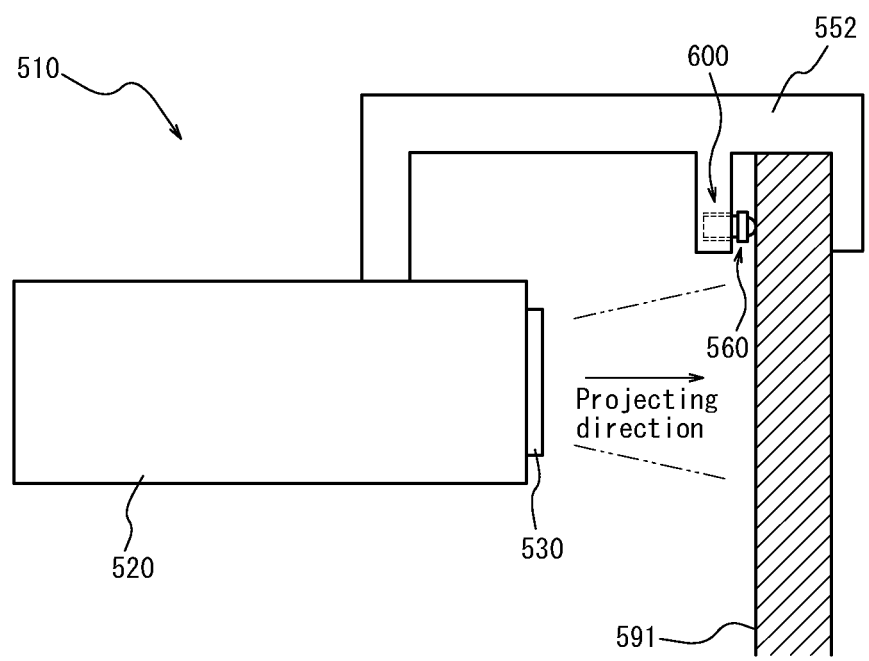
FIG. 42 is a side view illustrating a schematic configuration of an image projection apparatus according to an eleventh embodiment.

FIG. 42 is a side view illustrating a schematic structure of an image projection apparatus according to an eleventh embodiment. The image projection apparatus according to the present embodiment is the projector 510 of what is called a wall-mount type. The following is a description of aspects of this projector 510 different from that of the ninth embodiment, omitting aspects the same as those of the projector 510 of the ninth embodiment.

The projector 510 illustrated in FIG. 42 includes, on the housing 520, a support portion 552 in an arm shape extending forwardly of the projector 510. A distal end of the support portion 552 takes a hook shape and, when the distal end is attached to a wall surface 591 such as a whiteboard or the like, the projector 510 is held on the wall surface 591. A contact area of the support portion 552 in contact with the wall surface 591 includes the holder portion 600 for accommodating and retaining the piezoelectric vibration unit 560. The holder portion 600 has the slit 601 with a uniform width extending extends a direction perpendicular to the wall surface 591 when the projector 510 is in use and opening to the contact area of the support portion 552 in contact with the wall surface 591. Since the support portion 552 supports the projector 510, the load of the projector 510 is applied to a piezoelectric element portion 560 via the support portion 552, and the sound is generated from the wall surface (the contact surface) 591. In this way, since the sound may be provided to the user viewing the wall surface such as the whiteboard from the wall surface the user is viewing, the user may have a sense of presence similar to that obtained from what is called a panel speaker that generates the sound from a display panel.

Figure 43A:
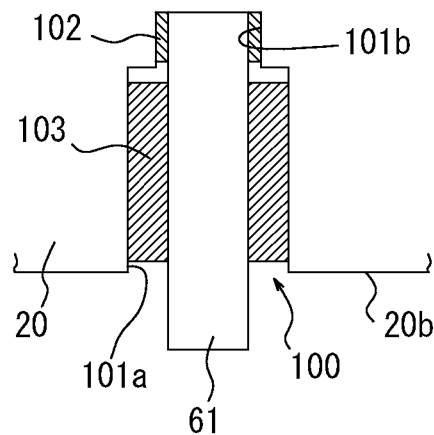
FIG. 43A is a diagram illustrating an example of variations of a holding manner of the piezoelectric vibration unit.
Figure 43B:
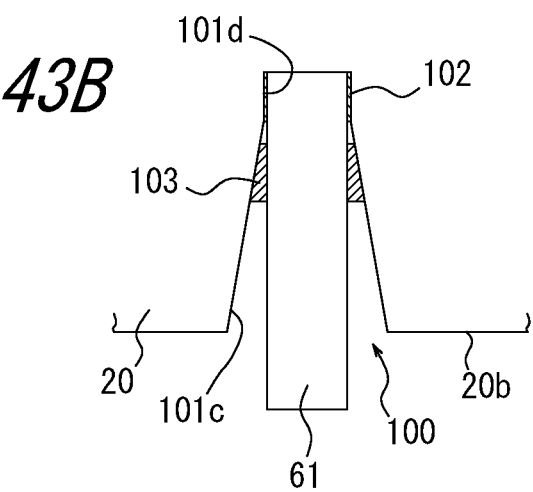
FIG. 43B is a diagram illustrating another example of the variations of the holding manner of the piezoelectric vibration unit.
Figure 43C:
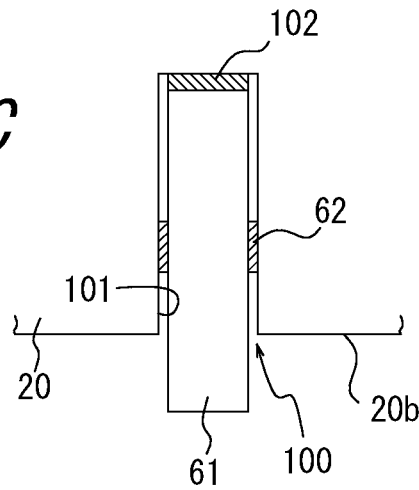
FIG. 43C is a diagram illustrating yet another example of the variations of the holding manner of the piezoelectric vibration unit.

The disclosure herein is not limited to the above embodiments but may be varied or modified in a number of manners. For example, in the first to fifth embodiments described above, the structure to fix the piezoelectric vibration unit 60 to the holder portion 100 is not limited to that illustrated in FIG. 5. The piezoelectric vibration unit 60 may be retained by the holder portion 100 in manners as illustrated in FIGS. 43A to 43C, for example. The holder portion 100 illustrated in FIG. 43A includes a wide slit 101a opening to the bottom surface 20b and a narrow slit 101b contiguous to the slit 101a. The laminated piezoelectric element 61 has one end positioned within the narrow slit 101b and a lateral side fixed to the slit 101b via the adhesive 102. A gap between the wide slit 101a and the laminated piezoelectric element 61 is filled with a filler 103 such as silicone, gel or the like which does not interfere with extension and contraction of the laminated piezoelectric element 61. When the piezoelectric vibration unit 60 is retained by the holder portion 100 in this manner, without the necessity to use a waterproof packing such as the O-ring, the audio apparatus 10 may be more reliably waterproofed. Further, when a portion of the laminated piezoelectric element 61 protruding from the bottom surface 20b is capped with an insulating cap, the laminated piezoelectric element 61 may be reliably insulated.

The holder portion 100 illustrated in FIG. 43B includes a tapered slit 101c which becomes wider toward the bottom surface 20b and a narrow slit 101d contiguous to the tapered slit 101c. The laminated piezoelectric element 61 has one end positioned within the narrow slit 101d and a lateral side fixed to the slit 101d via the adhesive 102. A gap between the tapered slit 101c and the laminated piezoelectric element 61 is filled with the filler 103 such as silicone, gel or the like which does not interfere with extension and contraction of the laminated piezoelectric element 61. This configuration offers an advantage to be able to obtain an effect similar to that of the holder portion 100 of FIG. 43A and, further, an advantage to facilitate attachment of the laminated piezoelectric element 61 to the holder portion 100.

The holder portion 100 illustrated in FIG. 43C includes the slit 101 with a uniform width, and the laminated piezoelectric element 61 has one end surface fixed to the slit 101 via the adhesive 102. The O-ring 62 is provided to an appropriate position on the laminated piezoelectric element 61 inside the slit 101. The laminated piezoelectric element 61 retained in this manner is advantageous in terms of wiring a lead wire especially when the laminated piezoelectric element 61 has the lead connection portions formed on the side electrodes as illustrated in FIG. 4.

Figure 44:
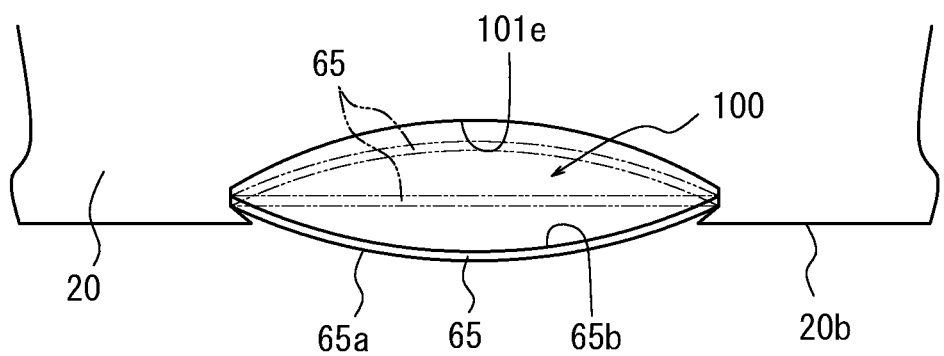
FIG. 44 is a diagram illustrating a schematic configuration of a section illustrating an example of variations of the piezoelectric vibration unit.

Also, the piezoelectric element is not limited to the laminated piezoelectric element of the stacked type described above but may be a unimorph, a bimorph, or a multilayer bimorph element. FIG. 44 is a diagram illustrating a schematic structure of a section using the bimorph. A bimorph 65 has an elongated rectangular shape with one surface 65a exposed to the bottom surface 20b of the housing 20 and both longitudinal ends supported by the holder portion 100. The holder portion 100 includes an opening portion 101e that supports the bimorph 65 and has a curved internal surface facing a rear surface 65b of the bimorph 65. With this structure, when the housing 20 is placed such that the bimorph 65 contacts the placing surface and the bimorph 65 is driven upon the audio signal, the bimorph 65 vibrates in a bending (curving) manner. Thereby, the vibration of the bimorph 65 is delivered to the placing surface (the contact surface), and the placing surface (the contact surface) generates a reproduced sound functioning as the vibration speaker. Note that the surface 65a of the bimorph 65 may have a coating layer made of polyurethane or the like formed thereon.

Further, in FIG. 7, an LPF having characteristics similar to the LPF 123 may be provided between the signal processor circuit 121 and the booster circuit 122. In FIG. 7, also, the equalizer or the like of the signal processor circuit 121 may have the function of the LPF 123 so as to allow omission of the LPF 123.

Further, although in the first to fifth embodiments described above the contact object is the table and the contact surface is the placing surface of the table that is horizontal, the contact surface is not limited thereto.

Also, in the sixth embodiment, the piezoelectric vibration unit 260 may be arranged on a surface where the support portion 250 contacts the placing surface 290. That is, the piezoelectric vibration unit 260 may be arranged at a portion of the support member 250 opposite to the placing surface (the contact surface) 290. In the eighth embodiment, also, the TV 210, without using the hook 255, may be directly secured to the wall surface (the contact surface) 291 by a screw or the like. In the sixth to eighth embodiments, also, the speaker 240, the detecting unit 270, the recording unit 280, and the storage unit 340 may be omitted as appropriate. In the sixth embodiment, further, depending on the shape of the TV 210, i.e., when the housing 220 has, for example, a box-shape, the support member 250 may be omitted.

Further, although the image display apparatus is the TV 210 in the sixth to eighth embodiments described above, the image display apparatus is not limited thereto. The disclosure herein may be implemented by any image display apparatus capable of displaying a still image or a video image and, simultaneously, generating the sound such as, for example, the personal computer, an LCD monitor, a digital photo frame, a videophone apparatus, and the like.

In ninth embodiment, for example, the piezoelectric vibration unit 560 may be arranged in the region R1 in FIG. 38. That is, the piezoelectric vibration unit 560 is arranged behind the center of gravity G of the projector 510. In this case, the projector 510 is supported by the piezoelectric vibration unit 560 and the front bottom portion of the housing 520. In the ninth to eleventh embodiments described above, also, the speaker 540, the detection unit 570, the recording unit 580, and the storage unit 640 may be omitted as appropriate.

Also, although the image projection apparatus in the ninth to eleventh embodiments described above is the projector 510 having one projection unit, the image projection apparatus is not limited thereto. The disclosure herein may be implemented by any image projection apparatus capable of displaying the still image or the video image and, simultaneously, generating the sound such as, for example, a planetarium projector or the like having a plurality of projection units.

Also, the modification examples illustrated in FIGS. 43A to 43C and FIG. 44 are applicable also to the above sixth to eleventh embodiments. Further, in the above embodiments and in the modification examples of FIGS. 43A to 43C, the cap of the piezoelectric vibration unit may be omitted such that the piezoelectric vibration unit, at the end surface thereof, contacts the contact surface directly, or via a vibration delivering member made of an insulating member or the like.

Further, although in the sixth to eleventh embodiments described above the desk or the wall surface serve as the contact object, and the placing surface of the desk or the like that is horizontal or the vertical wall serve as the contact surface, the disclosure herein is not limited thereto. The contact surface does not need to be a horizontal or vertical surface. Another contact object may be, for example, a partition for separating a space.

REFERENCE SIGNS LIST

10, 11, 12, 13, 14 audio apparatus
20 housing
40 microphone
45 microphone unit
46 microphone
47 transmission unit
60 piezoelectric vibration unit 61 laminated piezoelectric element (piezoelectric element)
63 cap
70 damper
80 speaker
90 detection unit
110 communication unit
120 piezoelectric element drive unit
130 controller
150 reception unit
200 placing surface (contact surface)
210 TV (image display apparatus)
220 housing
230 display unit
240 speaker
250 support member
260 piezoelectric vibration unit
261 laminated piezoelectric element (piezoelectric element)
263 cap
270 detection unit
280 recording unit
281 microphone
282 memory unit
290 placing surface (contact surface)
291 wall surface (contact surface)
330 controller
340 storage unit
510 projector (image projection apparatus)
520 housing
30 projection unit
40 speaker
50 front support
51 rear support portion
52 support
60 piezoelectric vibration unit
61 laminated piezoelectric element (piezoelectric element)
63 cap
70 detection unit
80 recording unit
81 microphone
82 memory unit
90 placing surface (contact surface)
91 wall surface (contact surface)
130 controller
140 storage unit

The invention claimed is:

1. An audio apparatus comprising:
a housing;
a piezoelectric vibration unit having a piezoelectric element provided to the housing; and
a communication unit configured to receive an audio signal,
wherein, when a received audio signal is applied to the piezoelectric element while a load of the audio apparatus is applied to the piezoelectric vibration unit, the piezoelectric element is deformed causing deformation of the piezoelectric vibration unit, whereby a contact surface in contact with the audio apparatus is vibrated generating a sound, and
wherein, in said deformation of the piezoelectric vibration unit, the piezoelectric vibration unit projects outwardly from the housing and retracts inwardly into the housing in response to the received audio signal.

2. The audio apparatus according to claim 1, wherein
the piezoelectric vibration unit is arranged at a portion of the housing opposite to the contact surface.

3. The audio apparatus according to claim 1, further comprising a microphone configured to pick up a sound and outputting the audio signal, wherein
the communication unit is configured to transmit the audio signal output from the microphone.

4. The audio apparatus according to claim 3, wherein
the microphone is retained in the housing via a damper configured to reduce a vibration caused by the deformation of the piezoelectric vibration unit.

5. The audio apparatus according to claim 3, wherein
a vibration direction of the piezoelectric element and a vibration direction of the microphone intersect with each other.

6. The audio apparatus according to claim 3, wherein
the microphone is disposed separately from the housing.

7. The audio apparatus according to claim 3, wherein
the communication unit is configured to receive the audio signal from another audio apparatus.

8. The audio apparatus according to claim 1, further comprising:
a speaker provided to the housing and configured to amplify the received audio signal;
a detection unit configured to detect a contact state between the contact surface and the piezoelectric vibration unit; and
a controller configured to control the speaker and the piezoelectric vibration unit based on the contact state detected by the detection unit.

9. The audio apparatus according to claim 1, wherein the piezoelectric element is a laminated piezoelectric element which is deformable by extending and contracting along a lamination direction.

10. The audio apparatus according to claim 1, wherein
the piezoelectric vibration unit is provided with a cover member configured to deliver the vibration caused by the deformation of the piezoelectric element to the contact surface and thereby vibrating the contact surface.

11. The audio apparatus according to claim 1, wherein
the contact surface is a placing surface having the audio apparatus placed thereon.

12. The audio apparatus according to claim 1, wherein
a part of a weight of the audio apparatus is applied on the piezoelectric element against outward projection of the piezoelectric vibration unit from the housing.

13. The audio apparatus according to claim 1, wherein
the piezoelectric element is a lamination structure of a plurality of layers stacked one on top another along a lamination direction, and
the piezoelectric element is configured to extend and contract along the lamination direction crossing the plurality of layers of the piezoelectric element, the lamination direction also crossing the contact surface.

* * * * *